(12) United States Patent
Uchibayashi et al.

(10) Patent No.: US 7,151,856 B2
(45) Date of Patent: Dec. 19, 2006

(54) PICTURE CODING APPARATUS AND PICTURE CODING METHOD

(75) Inventors: Kyoko Uchibayashi, Hirakata (JP); Shinya Kadono, Nishinomiya (JP); Jun Takahashi, Yawata (JP); Takahiro Nishi, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 835 days.

(21) Appl. No.: 10/420,806

(22) Filed: Apr. 23, 2003

(65) Prior Publication Data
US 2003/0202706 A1   Oct. 30, 2003

(30) Foreign Application Priority Data
Apr. 25, 2002 (JP) ............................. 2002-124749
Apr. 25, 2002 (JP) ............................. 2002-124750

(51) Int. Cl.
*G06K 9/36* (2006.01)

(52) U.S. Cl. ...................... 382/236; 382/239; 382/246; 382/250; 375/240.2; 375/240.16; 375/240.22

(58) Field of Classification Search ................ 382/232, 382/233, 236, 238, 239, 240, 246, 251; 375/240.2, 375/240.03, 240.27, 240.22, 240.16
See application file for complete search history.

(56) References Cited

U.S. PATENT DOCUMENTS 6,748,020 B1 * 6/2004 Eifrig et al. ........... 375/240.26

2002/0122598 A1 * 9/2002 Ribas-Corbera et al. .... 382/239
2003/0063806 A1 * 4/2003 Kim et al. ................. 382/236

FOREIGN PATENT DOCUMENTS

| JP | 2000-308047 | 11/2000 |
|----|-------------|---------|
| JP | 2001-025015 | 1/2001  |

* cited by examiner

*Primary Examiner*—Jingge Wu
*Assistant Examiner*—Ali Bayat
(74) *Attorney, Agent, or Firm*—Wenderoth, Lind & Ponack, L.L.P.

(57) ABSTRACT

A frame group target bits number calculating unit (31) reads the total number of bits on frame group basis allocatable to residual frames from a storing unit (36), updates subtracting the number of generated bits used to code a preceding frame, and transmits to a next frame target bits number calculating unit (32). The next frame target bits number calculating unit (32) calculates the target number of bits to be allocated to a next frame based on the received total number of bits and the number of residual frames with considering a frame rate value, Rf. An average frame bits number calculating unit (33) calculates the average number of bits allocated to preceding frames. A calculating unit (34) multiplies the calculated average number of bits by a predetermined coefficient, compares the resulting value with above target number of bits, selects the greater number and transmits it to a quantization step calculating unit (35).

41 Claims, 37 Drawing Sheets

Fig. 4

| | 1 | 2 | 3 | 4 | 5 | 6 | 7 | 8 | 9 | 10 | 11 | 12 | 13 | — | 27 | 28 | 29 | 30 |
|---|---|---|---|---|---|---|---|---|---|---|---|---|---|---|---|---|---|---|
| Input picture frame number (1701) | 1 | — | 2 | — | 3 | — | 4 | — | 5 | — | × | — | 6 | ⋯ | (13) | — | (14) | — |
| Frame group frame number (1702) | | | | | | | | | | | | | | | | | | |
| The number of generated bits, Nn (131) | 400 | — | 230 | — | 250 | — | 300 | — | 220 | — | × | — | 244 | ⋯ | | | | |
| Frame group target bits number (1703) | 3600 | | | | | | | | | | | | | | | | | |

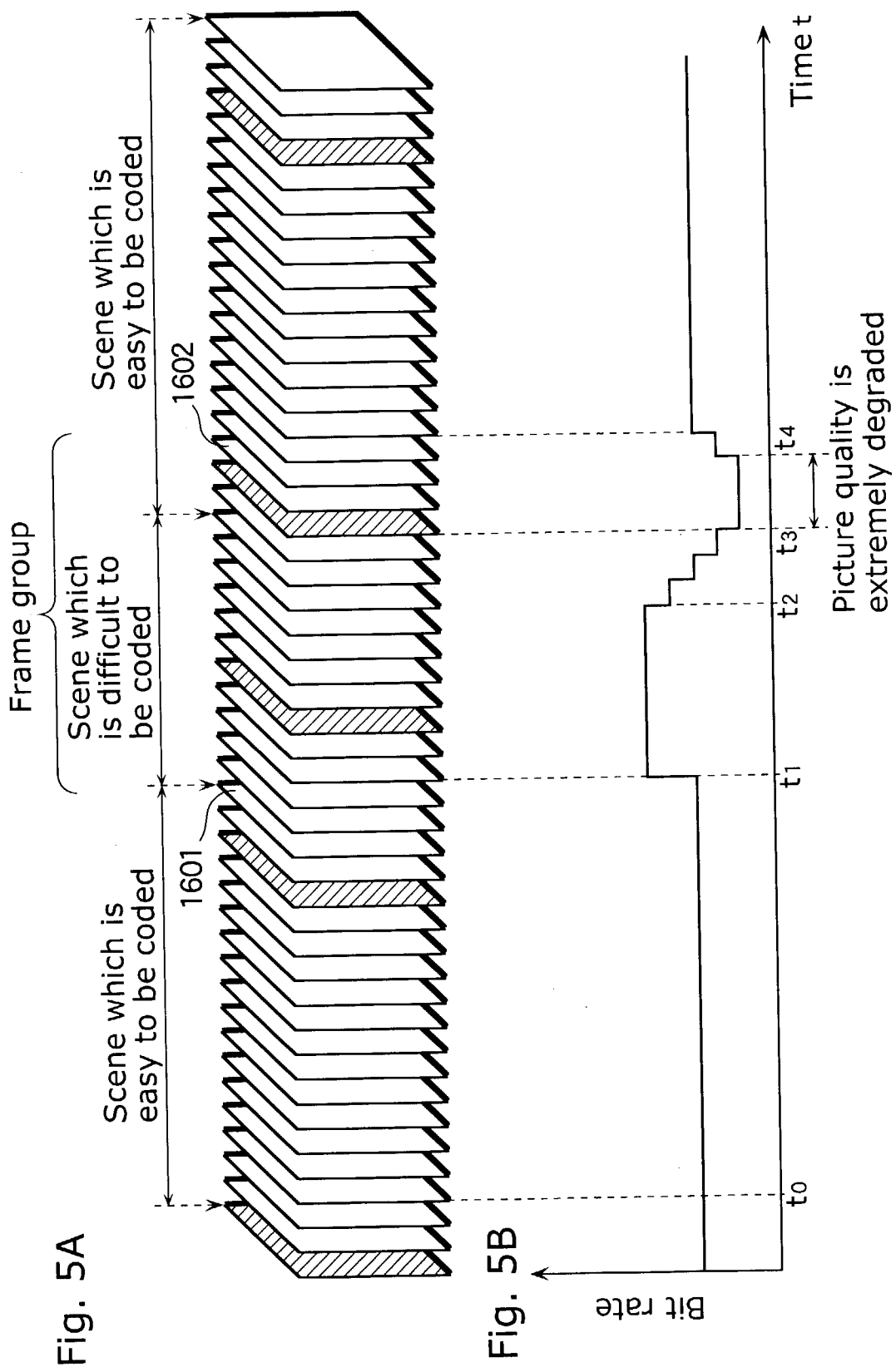

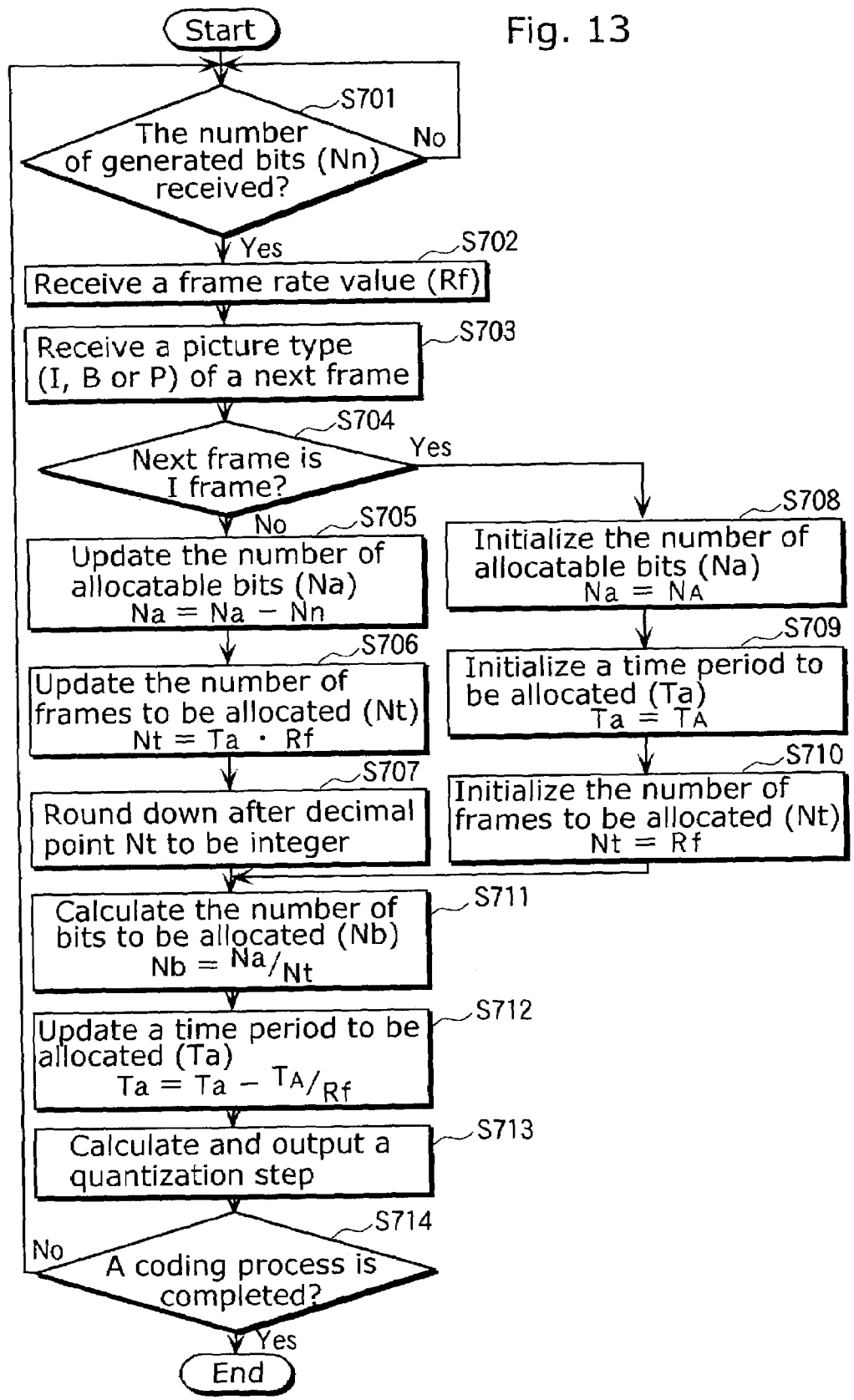

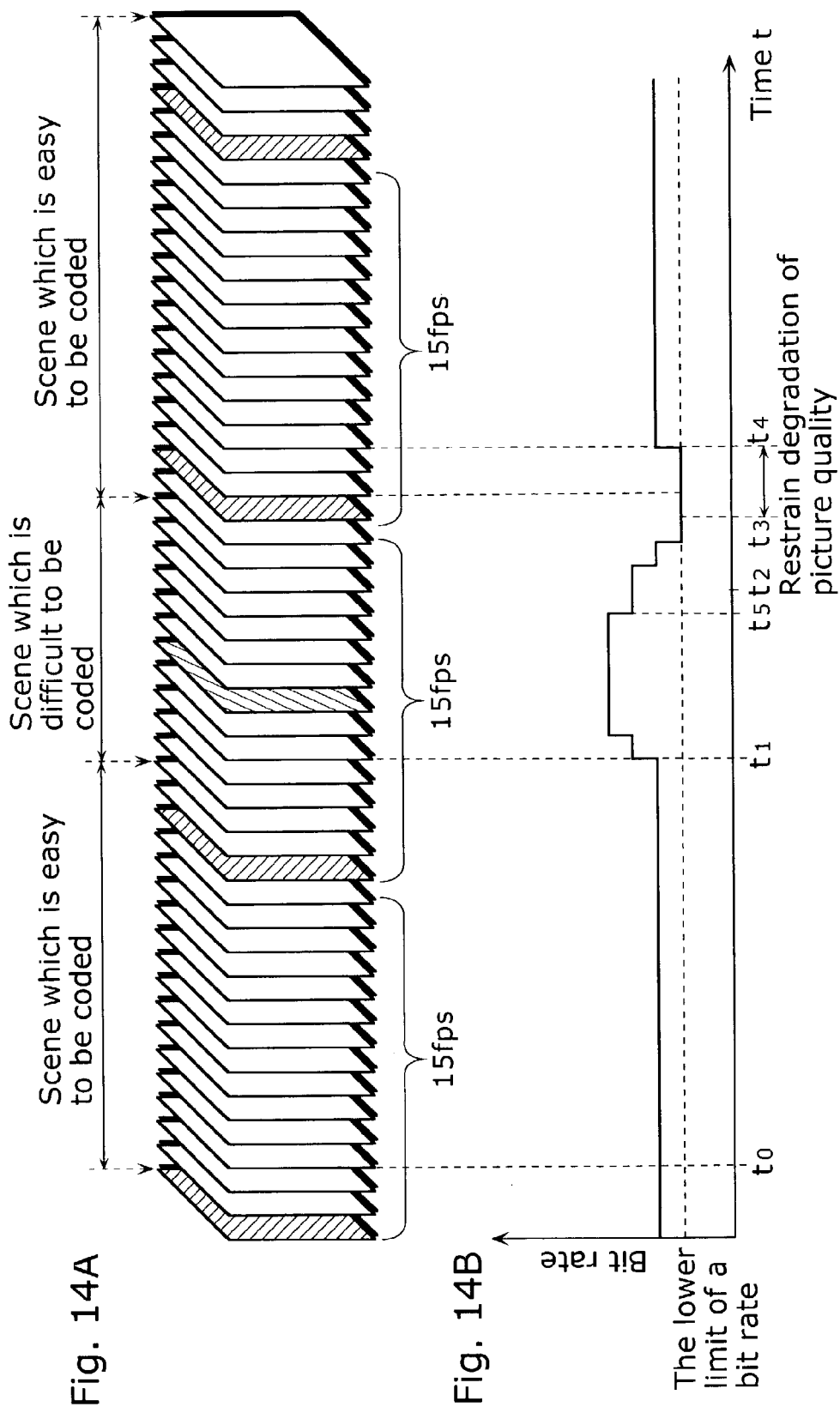

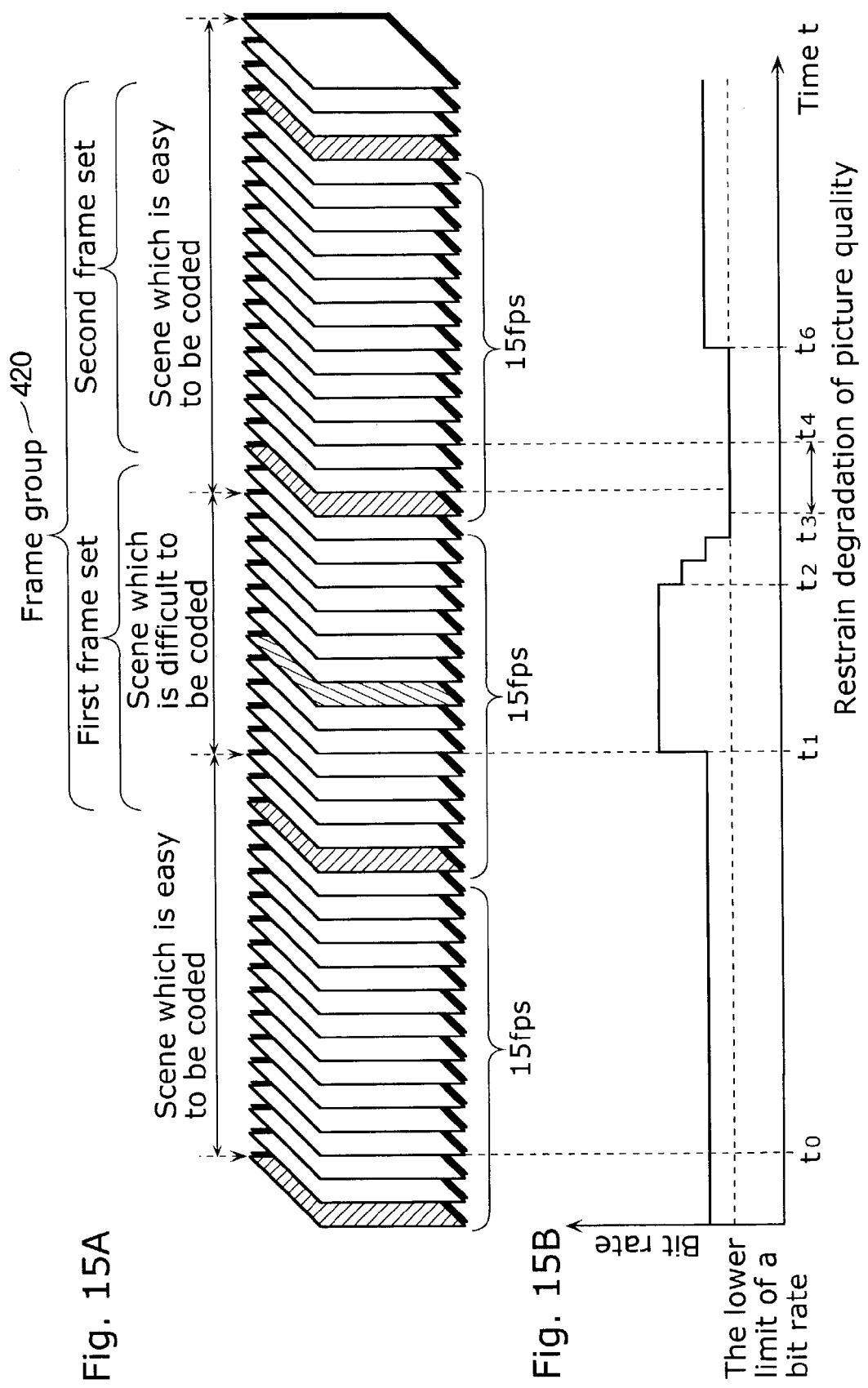

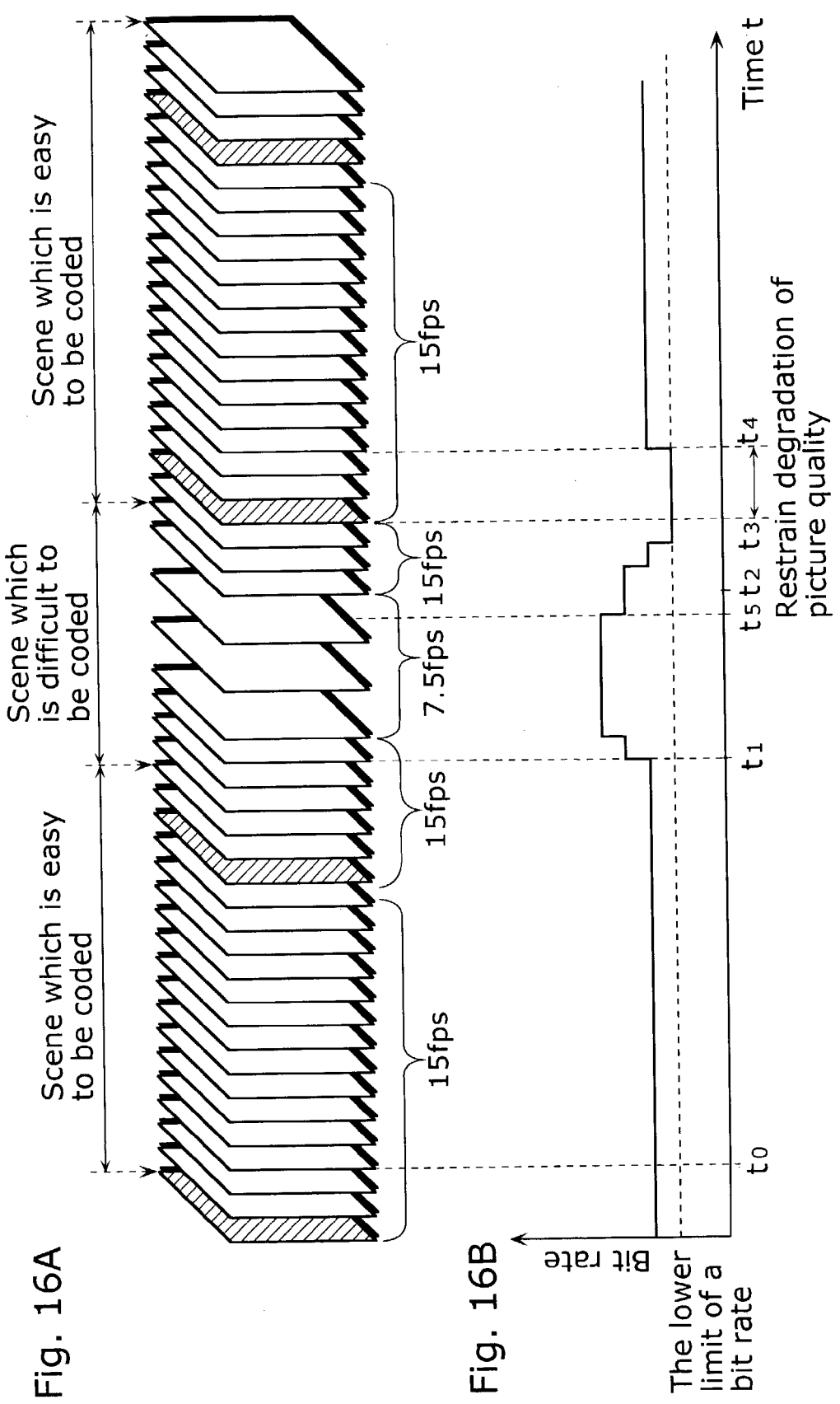

Fig. 17

| | | | | | | | | | | | | | | | |
|---|---|---|---|---|---|---|---|---|---|---|---|---|---|---|---|
| 1701 | Input picture frame number | 1 | 2 | 3 | 4 | 5 | 6 | 7 | 8 | 9 | 10 | 11 | 12 | 13 | ... | 27 | 28 | 29 | 30 |
| 1102 | Frame group frame number | 1 | — | 2 | — | 3 | — | 4 | — | 5 | — | × | — | 6 | ... | (14) | — | (15) | — |
| 131 | The number of generated bits, Nn | 400 | — | 230 | — | 250 | — | 300 | — | 236 | — | × | — | 436 | ... | — | — | (10) | — |
| 1703 | Frame group target bits number | 3600 | | | | | | | | | | | | | | |

Average optimum frame rate

Quantization step predictive value

Free area in a buffer

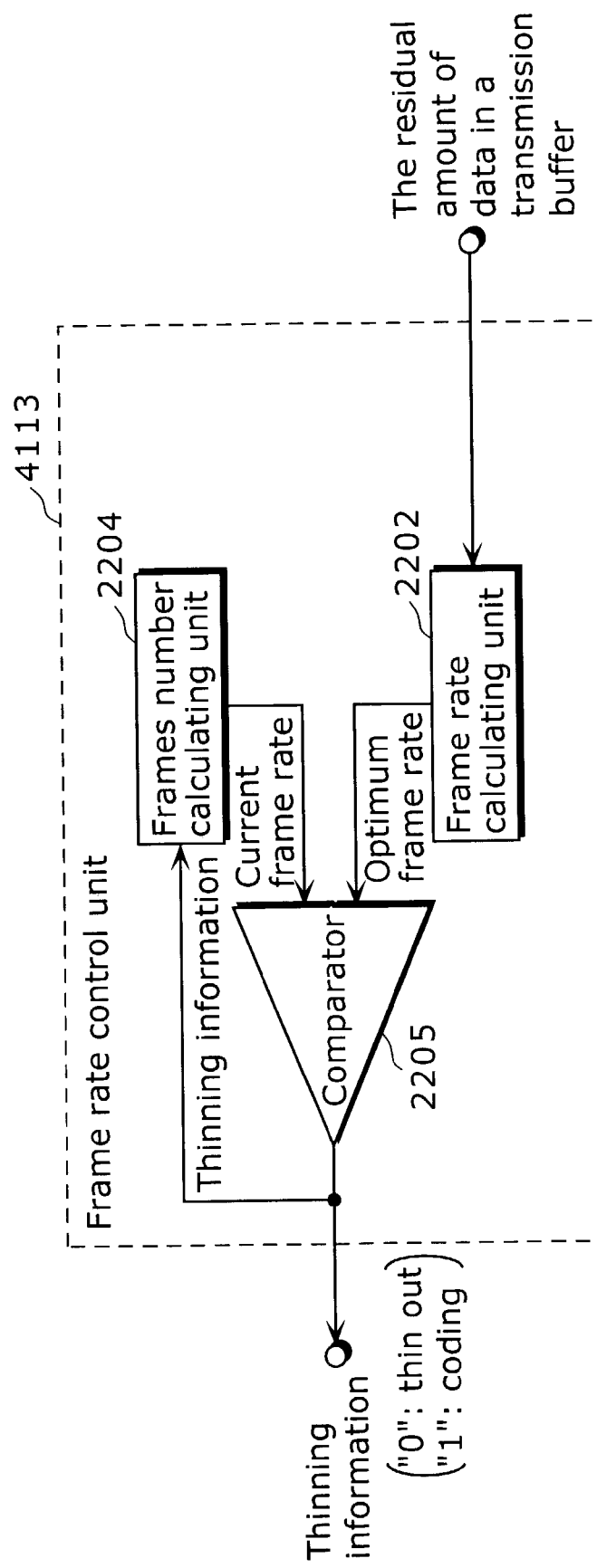

PICTURE CODING APPARATUS AND PICTURE CODING METHOD

BACKGROUND OF THE INVENTION (1) Field of the Invention

The present invention relates to picture coding techniques and picture decoding techniques, and particularly to picture coding techniques using a variable bit rate method and a variable frame rate method.

(2) Description of the Related Art

A variable bit rate method is one of conventional methods in compliance with picture coding technique, such as the MPEG (Moving Picture Expert Group) standard, for controlling a bit rate. This is a control method that tolerates local fluctuations of the bit rate caused by complexity of a picture to be coded and keeps the number of bits generated within a specified time period (1 second, for instance) constant mainly in order to observe constraints on capacity of a buffer memory for storing coded data and time for video recording on a recording medium. To control the number of bits to be allocated according to a scene, the number of bits of a scene which is difficult to be coded is increased (bit rate becomes higher) and the number of bits of a scene which is easy to be coded is decreased (bit rate becomes lower). In other words, this method encodes pictures so as to reproduce high-quality pictures, while the number of bits generated within a specified time period is maintained at a constant rate (within limited capacity of a buffer memory and limited recording time). (Refer to Japanese Patent Application Laid-Open No. 2001-25015)

A picture coding apparatus using the existing variable bit rate method, as mentioned above, is explained referring to FIG. 1 illustrating a picture coding apparatus 100. The picture coding apparatus 100 is comprised of an orthogonal transforming unit 105, a quantization unit 106, a variable length coding unit 107, an inverse quantization unit 108, an inverse orthogonal transforming unit 109, a frame memory 102, a motion estimation unit 103, a motion compensation unit 104 and a bit rate control unit 110.

The orthogonal transforming unit 105 performs discrete cosine transform (DCT) of a received frame signal to be coded 101 (picture signal data) per macroblock unit and generates DCT coefficients and outputs them to the quantization unit 106. Regarding a frame of I (Intra coded) picture, DCT operation is performed in an inter picture coding mode. Regarding a frame of P (Predictive coded) picture, DCT operation is performed in a forward prediction coding mode based on a preceding I picture or P picture. Regarding a frame of B (Bi-directional) picture, DCT operation is performed in a bi-directional prediction coding mode based on a preceding or following I picture or P picture.

The quantization unit 106 quantizes DCT coefficients inputted from the orthogonal transforming unit 105 per macroblock by quantization step received from the bit rate control unit 110 (a quantization parameter may be used) and outputs them to the variable length coding unit 107 and the inverse quantization unit 108. The variable length coding unit 107 performs variable length coding and multiplexing of the quantized DCT coefficients inputted from the quantization unit 106 and outputs them to an output buffer (not shown in this figure).

The inverse quantization unit 108 performs inverse quantization operation of the quantized DCT coefficients received from the quantization unit 106 and outputs them to the inverse orthogonal transforming unit 109. The inverse orthogonal transforming unit 109 reproduces picture signal data by performing inverse orthogonal transforming operation based on the inverse orthogonal transformed DCT coefficients inputted from the inverse quantization unit 108 and outputs them to the frame memory 102.

The frame memory 102 adds decoded picture signal data of an I picture or a P picture to the motion compensation data generated by the motion compensation unit 104 and stores the resulting data. The motion estimation unit 103 estimates motion vectors from a reference picture stored in the frame memory 102 and outputs the data showing the motion vectors to the motion compensation unit 104.

The motion compensation unit 104 generates motion compensation data (reference picture data) based on reference picture stored in the frame memory 102 for coding P pictures or B pictures and the data indicating motion vectors inputted from the motion estimation unit 103. The bit rate control unit 110 receives the generated number of bits from the variable length coding unit 107, determines the quantization step based on the generated number of bits, and transmits the quantization step to the quantization unit 106.

An overall control unit 140 is a part, which controls the picture coding apparatus 100 entirely, such as a microcomputer equipped with ROM and RAM. The overall control unit 140 controls timing of each process based on signals such as control signals.

FIG. 2 is a block diagram showing functional configuration related to the bit rate control unit 110 of the conventional picture coding apparatus 100. As FIG. 2 shows, the bit rate control unit 110 is comprised of a frame group target bits number calculating unit 111, a next frame target bits number calculating unit 112 and a quantization step calculating unit 113.

The frame group target bits number calculating unit 111 receives the number of generated bits, Nn 131, from the variable length coding unit 107 and stores it in an internal memory (not shown in this figure). At this operation, the frame group target bits number calculating unit 111 counts the number of receiving the number of generated bits, Nn 131 (that is, the number of coded frames). In addition, the frame group target bits number calculating unit 111 calculates the number of allocatable bits in frame unit for frames which are not yet coded, and transmits the resulting number to the next frame target bits number calculating unit 112 and sequentially updates of the number of allocatable bits, mentioned above, using the number of bits, Nn 131, generated from actual coding. "The frame group" mentioned here means a group of frames coded within a specified time period.

The next frame target bits number calculating unit 112 calculates the target number of bits to be allocated to a next frame based on the number of bits allocatable in every frame group received from the frame group target bits number calculating unit 111, and transmits the resulting target number to the quantization step calculating unit 113. Above target value is calculated by dividing the number of bits allocatable in every frame group at a specific time by the number of residual frames.

The quantization step calculating unit 113 calculates a quantization step 141 (a quantization parameter can be used) based on the target number of bits to be allocated to a next frame received from the next frame target bits number calculating unit 112, and outputs the resulting value to the quantization unit 106.

FIG. 3 is a flowchart showing process flow related to the overall control unit 140 and the control unit 110 of the conventional picture coding apparatus 100.

First, when the number of generated bits, Nn 131, is received at the bit rate control unit 110 (S1401), the overall control unit 140 judges if a frame to be coded next is the first frame of a frame group (S1402). In this case, if a next frame is the first frame of the frame group (Yes in S1402), the bit rate control unit 110 initializes the number of allocatable bits, Na, a time period to be allocated, Ta, and the number of frames to be allocated, Nt (S1405~1407). "NA" mentioned here is an initial value of the number of bits to allocate to every frame group. "TA" is a period of whole frame group. "Rf" is a frame rate for coding used by the picture coding apparatus 100.

On the other hand, if a next frame is not the first frame of the frame group (No in S1402), the bit rate control unit 110 updates the number of allocatable bits, Na, and a time period to be allocated, Ta (S1403~1404).

Next, the bit rate control unit 110 calculates the number of bits to be allocated, Nb, based on the number of allocatable bits, Na, and a frame to be allocated, Nt (S1408), and decrements the number of a frames to be allocated, Nt (S1409).

After that, the bit rate control unit 110 judges if a frame to be coded needs to be thinned out, and if it is necessary, the bit rate control unit 110 informs the overall control unit 140 (Yes in S1410). On the other hand, if thinning is not necessary (No in S1410), a quantization step is calculated and outputted to the quantization unit 110 (S1411).

The overall control unit 140 and the bit rate control unit 110 repeat above process until coding process is completed (S1401~1412).

FIG. 4 shows an actual example of a calculation method for calculating the number of bits to be allocated, Nb, in the conventional bit rate control unit 110. In this case, the number of generated bits, Nn 131, and the number of bits to be allocated, Nb, should match for convenience sake.

It should be assumed that a picture signal data inputted by 30 [fps] (a frame signal to be coded 101) is coded at the frame rate of 15 [fps] and a frame group comprises 15 frames is essentially generated per second in the example of FIG. 4.

In this example, the frame signal to be coded 101 to be inputted is indicated as "an input picture frame number 1701" and a coded frame signal 121 is indicated as "a frame group frame number 1702". A symbol "x" in columns of the frame group frame number 1702 and the number of generated bits, Nn 131, in FIG. 4 shows that coding is not performed for a corresponding frame of the input picture frame number 1701 but "thinning" is performed.

The number of generated bits, Nn, corresponding to an input picture frame number "9" (that is, a frame group frame number "5"), for example, is ((3600−1180)/11=220 bits) since the total number of bits already allocated to four frames is 1180 bits and the number of residual frames are "11".

On the other hand, since an input picture frame number "11" is thinned out and the total number of bits already allocated is 1400 bits and the number of residual frames is "9", the number of generated bits corresponding to an input picture frame number "13" (that is, a frame group frame number "6") is ((3600−1400)/9=244 bits [truncated after decimal point]).

For information, the number "(14)" in the column of a frame group frame number 1702 corresponding to an input picture frame number "29" in FIG. 4 is a value of the last frame group frame number 1702 predicted at the point when an input picture frame number 1701 is "13".

As described above, the conventional picture coding apparatus 100 allocates a bit to a following frame to be coded.

However, successive (complex) frames which are difficult to be coded result in the greater number of bits generated for coding even if a value of a quantization step is changed to a larger value (in this case, a value of a bit rate becomes greater). As a result, the number of bits to be allocated to frames following successive frames which are difficult to be coded is decreased in order to keep the number of bits generated within a specified time period (a group of frame) constant. Therefore a quantization step for coding the following frames should be bigger and picture quality of those frames is extremely degraded. This is the first problem. (In this case, a bit rate becomes significantly lower.)

FIG. 5 is a diagram showing the first problem of the conventional technology. It is defined that fifteen frames between a frame 1601 and a frame 1602 form a frame group and 3600 bits per frame group are allocated as a target value (as shown in FIG. 4 mentioned above). In this case, frames which are difficult to be coded are continued from a time period t1, and when a great number of bits are allocated for coding those frames, the number of bits to be allocated to the last half of a frame group becomes less and it is necessary to make a quantization step rough (this results in lower bit rate), however, picture quality is extremely degraded if a quantization step is roughened.

A quantization step between t3 and t4 becomes much coarse in FIG. 5 and it can be assumed that picture quality is degraded by the rough quantization step.

Furthermore, when the number of bits to be allocated becomes increasingly fewer and the frame rate should be changed at some midpoint in a frame group (that is, frames are thinned out), it is impossible to assign a great number of bits although the frame rate is lowered since the number of bits to be allocated to a frame is determined based on an initial frame rate even if the frame rate is changed. And it is necessary to lower the frame rate additionally or to make a quantization step rough additionally. This is the second problem.

FIG. 6 shows the second problem of the above conventional technology. FIG. 6 shows an example that a frame rate is gradually lowered since a great number of bits are allocated for coding frames which are hard to be coded, and the frame interval is getting bigger, and the motion of a picture becomes awkward, and thus the quality of the picture is degraded.

SUMMARY OF THE INVENTION

The present invention is conceived in viewing of the above problems and aims at preventing degradation of picture caused by the extremely insufficient number of bits to be allocated to residual frames even if there are consecutive frames which are difficult to be coded, and aims at providing a picture coding apparatus and its method that enable coding to reproduce high-quality picture in consideration of rate change of frames to be coded.

In order to achieve the above objects, the picture coding apparatus according to this invention for coding a picture signal inputted sequentially on a frame-by-frame basis comprises a frame rate receiving unit operable to receive frame rate information indicating a cycle of the coding, a total bits number specifying unit operable to specify the total number of bits allocatable to a frame group including a plurality of frames, a frames number specifying is unit operable to specify, based on the received frame rate information and the number of frames which are already coded, the number of frames which are not coded in the frame group, a target bits number calculating unit operable to calculate, based on the specified total number of bits and the specified number of frames, the target number of bits to be allocated to a frame to be coded next, a quantization step calculating unit operable to calculate, using the calculated target number of bits, a quantization step for the frame to be coded next, and a coding unit operable to quantize based on the calculated quantization step and to code based on the quantization.

Therefore, it is possible to allocate bits equally, preventing the number of bits to be allocated from being locally fluctuated, since the apparatus according to this invention calculates the number of bits to be allocated to a next frame based on the total number of bits allocated to a frame group and the number of bits already allocated, and it is possible to prevent quality of a picture from extremely degrading eventually.

In order to achieve the above objects, the picture coding apparatus according to this invention further comprises an average value calculating unit operable to calculate an average number of bits definitely allocated for coding one of the frames of the frame group, and a computing unit operable to perform predetermined computing for the calculated target number of bits and the average number of the bits, and to specify a new target number of bits, wherein the quantization step calculating unit calculates the quantization step using the target number of bits specified by the computing unit.

Therefore, it is possible to code depending on the change of a frame rate since the apparatus determines the number of bits to be allocated to be coded next, based on the number of frames not yet coded calculated from a received frame rate information and the number of bits allocatable to a frame group.

In order to achieve the above objects, the picture coding apparatus according to this invention further comprises a storing unit operable to store data which is already coded but not yet transmitted, and a frame rate calculating unit operable to calculate, based on the amount of the data stored in the storing unit, a frame rate for a frame to be coded next, wherein the frame rate receiving unit receives the calculated frame rate information.

Therefore, it is possible to perform coding with higher quality of a picture than conventional technology by coding with smaller quantization step, when there is enough room in a buffer, while maintaining a bit rate during a specified time period constant, and to restrain a sudden decline in a frame rate (a lot of frames are skipped without coding) when a scene is shifted to a complex scene, and to perform coding with smoother motion than conventional technology.

For information, in order to achieve the above objects, it is possible to realize the present invention as a picture coding method for having the characteristic structural units of the picture coding apparatus as steps or realize the present invention as a program inducing these steps. Moreover, the program can be stored on such as a ROM included in the picture coding apparatus as well as be distributed through a storage medium such as CD-ROM and a transmission medium such as a communication network.

FURTHER INFORMATION ABOUT TECHNICAL BACKGROUND TO THIS APPLICATION

Japanese Patent Application No. 2002-124749 filed Apr. 25, 2002:

Japanese Patent Application No. 2002-124750 filed Apr. 25, 2002, are incorporated herein by reference.

BRIEF DESCRIPTION OF THE DRAWINGS

These and other subjects, advantages and features of the invention will become apparent from the following description thereof taken in conjunction with the accompanying drawings that illustrate a specific embodiment of the invention. In the Drawings:

FIG. 4 is an illustration showing an actual example of a calculation method for calculating the number of bits to be allocated according to a conventional bit rate control unit.

FIG. 5A is a configuration example of a frame group to indicate the first problem of the conventional technology.

FIG. 5B is an example of bit rate to indicate the first problem of the conventional technology.

FIG. 13 is a flowchart showing a process flow in an overall control unit and a bit rate control unit of the picture coding apparatus according to the first embodiment.

FIG. 14A is an illustration showing a configuration example of a frame group when coding is performed using the picture coding apparatus according to the first embodiment.

FIG. 14B is an example showing change of bit rate when coding is performed using the picture coding apparatus according to the first embodiment.

FIG. 15A is an example showing state of each frame when a frame group is consisted of 2 frame sets.

FIG. 15B is an example showing state of bit rate fluctuations when a frame group comprises 2 frame sets.

FIG. 16A is an example showing state of each frame when a group of frame is consisted of 2 frame sets and a frame rate for coding is changed.

FIG. 16B is an example showing state of bit rate fluctuation when a group of frame comprises 2 frame sets and a frame rate for coding is changed.

FIG. 17 is an illustration showing an actual example of a calculation method for calculating the number of bits in a calculating unit.

FIG. 36 is a block diagram showing a functional configuration of the frame rate control unit according to the picture coding apparatus in FIG. 35.

DESCRIPTION OF THE PREFERRED EMBODIMENT(S)

The present embodiments of the present invention will be explained in detail below with reference to the figures. For information, same numerical references are employed and an explanation is omitted for configurations common to the conventional technology.

(First Embodiment)

Figure 7:
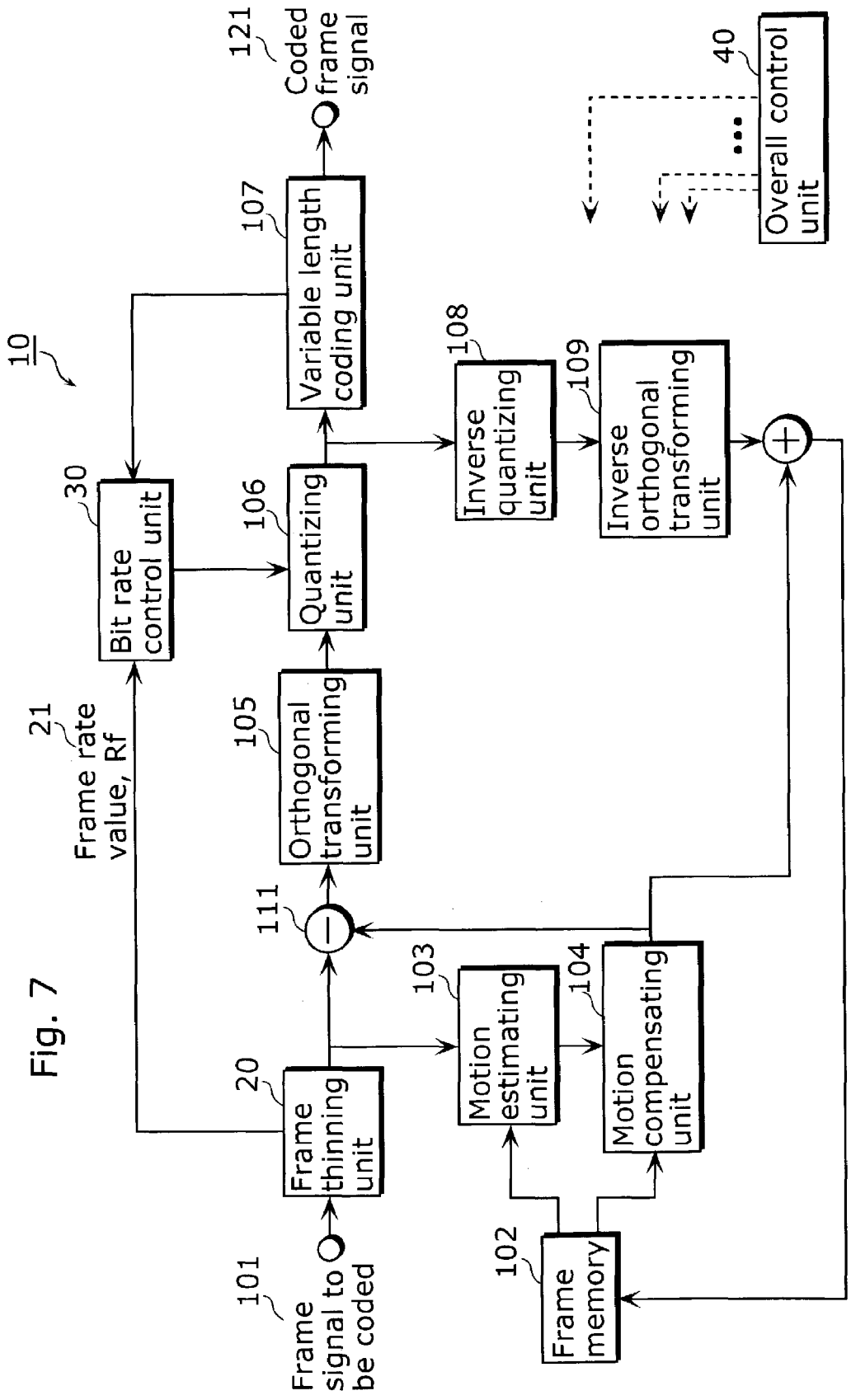
FIG. 7 is a block diagram showing functional configuration of a picture coding apparatus according to the first embodiment.

FIG. 7 is a block diagram showing a functional configuration of a picture coding apparatus 10 according to the first embodiment. The picture coding apparatus 10 enables coding for reproducing higher definition pictures by maintaining a bit rate during a specified time period (1 second, for instance) constant, and suppressing local fluctuations of a bit rate.

The picture coding apparatus 10 includes the frame memory 102, the motion estimating unit 103, the motion compensating unit 104, the orthogonal transforming unit 105, the quantizing unit 106, the variable length coding unit 107, the inverse quantizing unit 108, the inverse orthogonal transforming unit 109, the frame thinning unit 20, the rate control unit 30 and the overall control unit 40.

The frame thinning unit 20 determines if a frame is coded/not coded for a frame signal to be coded 101 inputted at a regular interval, and informs the rate control unit 30 of the frame rate value, Rf 21, at that time point.

The rate control unit 30 determines a quantization step (or a quantization parameter) for coding a next frame based on the number of generated bits received from the variable length coding unit 107 and the frame rate value, Rf 21, informed by the frame thinning unit 20, and transmits the determined value to the quantizing unit 106.

The overall control unit 40 is, for example, such as a microcomputer equipped with ROM and RAM, and controls the overall picture coding apparatus 10. For further details, the overall control unit 40 controls a processing timing of each unit based on control signals (broken lines of the overall control unit 40 in FIG. 7 show control signal lines). Moreover, the overall control unit 40 identifies a picture type (I frame, B frame and P frame) of the frame signal to be coded 101 inputted at a constant cycle, and informs the rate control unit 30 about the identification results.

Figure 8:
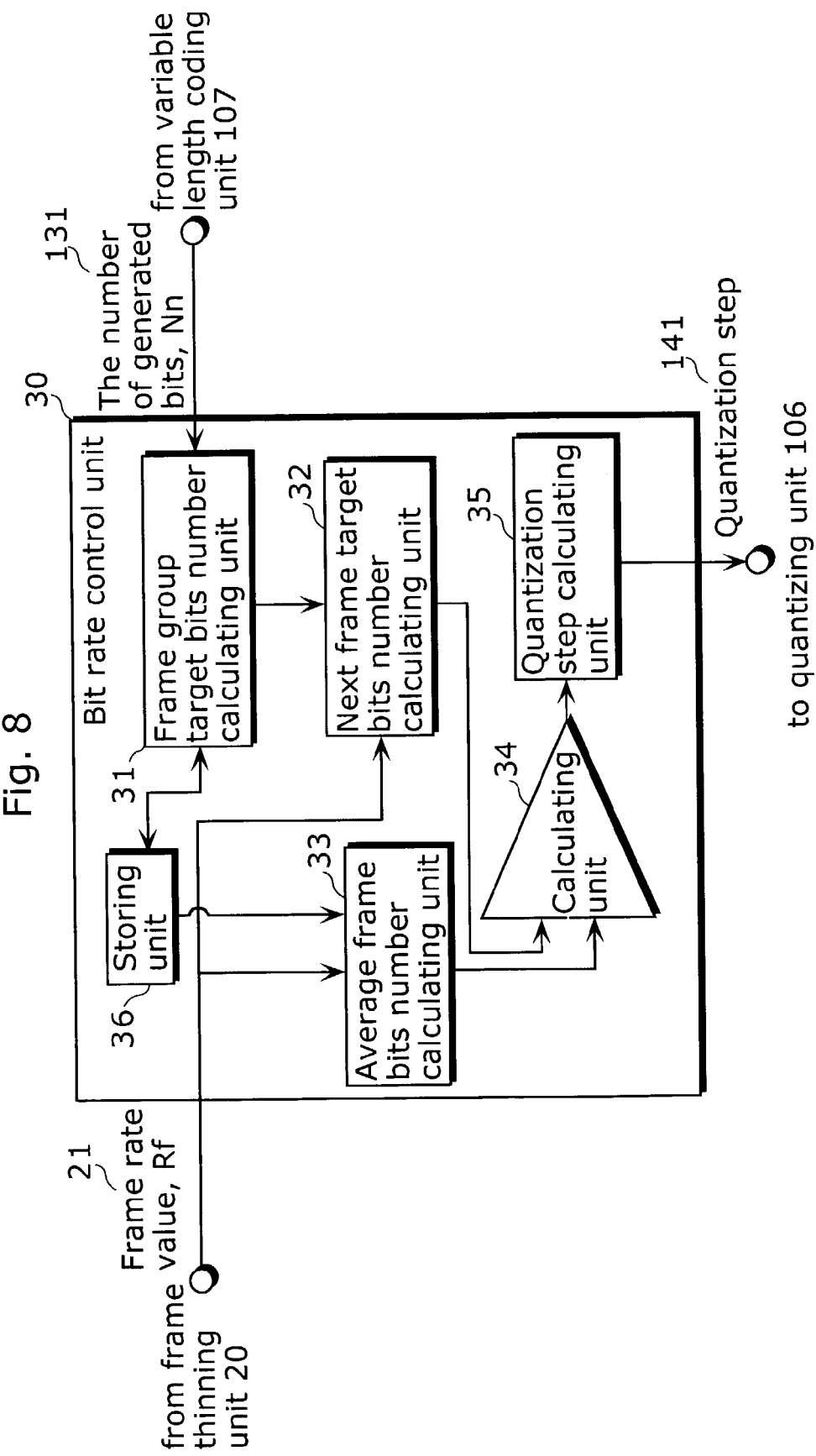
FIG. 8 is a block diagram showing detailed functional configuration of a bit rate control unit shown in FIG. 7.

FIG. 8 is a block diagram showing a detailed functional configuration of the bit rate control unit 30 in FIG. 7. The rate control unit 30 includes a frame group target bits number calculating unit 31, a next frame target bits number calculating unit 32, an average frame bits number calculating unit 33, a calculating unit 34, a quantization step calculating unit 35 and a storing unit 36.

The frame group target bits number calculating unit 31 sequentially calculates and updates the total number of bits allocatble to all residual frames to be coded on frame group basis. For further details, the frame group target bits number calculating unit 31 receives the number of generated bits, Nn 131, from the variable length coding unit 107, and stores it in the storing unit 36. Moreover, the frame group target bits number calculating unit 31 loads the total number of bits allocatable to frames between a frame next to be coded and the last frame of a group from the storing unit 36, and subtracts the number of generated bits, Nn 131, mentioned above, from the total number of bits, and transmits the value to the next frame target bits number calculating unit 32 and stores in the storing unit 36.

The next frame target bits number calculating unit 32 calculates the target number of bits to be allocated to a next frame with considering the number of residual frames to be coded based on the frame rate value, Rf 21, received from the frame thinning unit 20 and the total number of allocatable bits received from the frame group target bits number calculating unit 31.

The average frame bits number calculating unit 33 calculates average number of allocated bits based on the frame rate value, Rf 21, received from the frame thinning unit 20 and the number of bits allocated to preceding frames stored in the storing unit 36.

The calculating unit 34 calculates the number of bits by multiplying the number of bits calculated in the average frame bits number calculating unit 33 by a specified coefficient (0.8, for instance), compares the above resulting value with the target value of bits calculated in the next frame target bits number calculating unit 32, and selects the greater number of bits. In addition, the calculating unit 34 compares the selected number of bits with a predetermined lower limit, selects the greater number of bits (that is, selects the number of bits which is not below the lower limit), and transmits to the quantization step calculating unit 35. For information, above predetermined coefficient is not restricted to "0.8" but other values such as more than 0 but 1 or less may be used.

The quantization step calculating unit 35 calculates a value of a quantization step in which the number of bits received from the calculating unit 34 and the number of generated bits are the same.

The storing unit 36 stores the number of generated bits, Nn 131, resulted from coding each frame received from the variable length coding unit 107. Furthermore, the storing unit 36 updates the target number of bits in a frame group following control by the frame group target bits number calculating unit 31.

Figure 9:
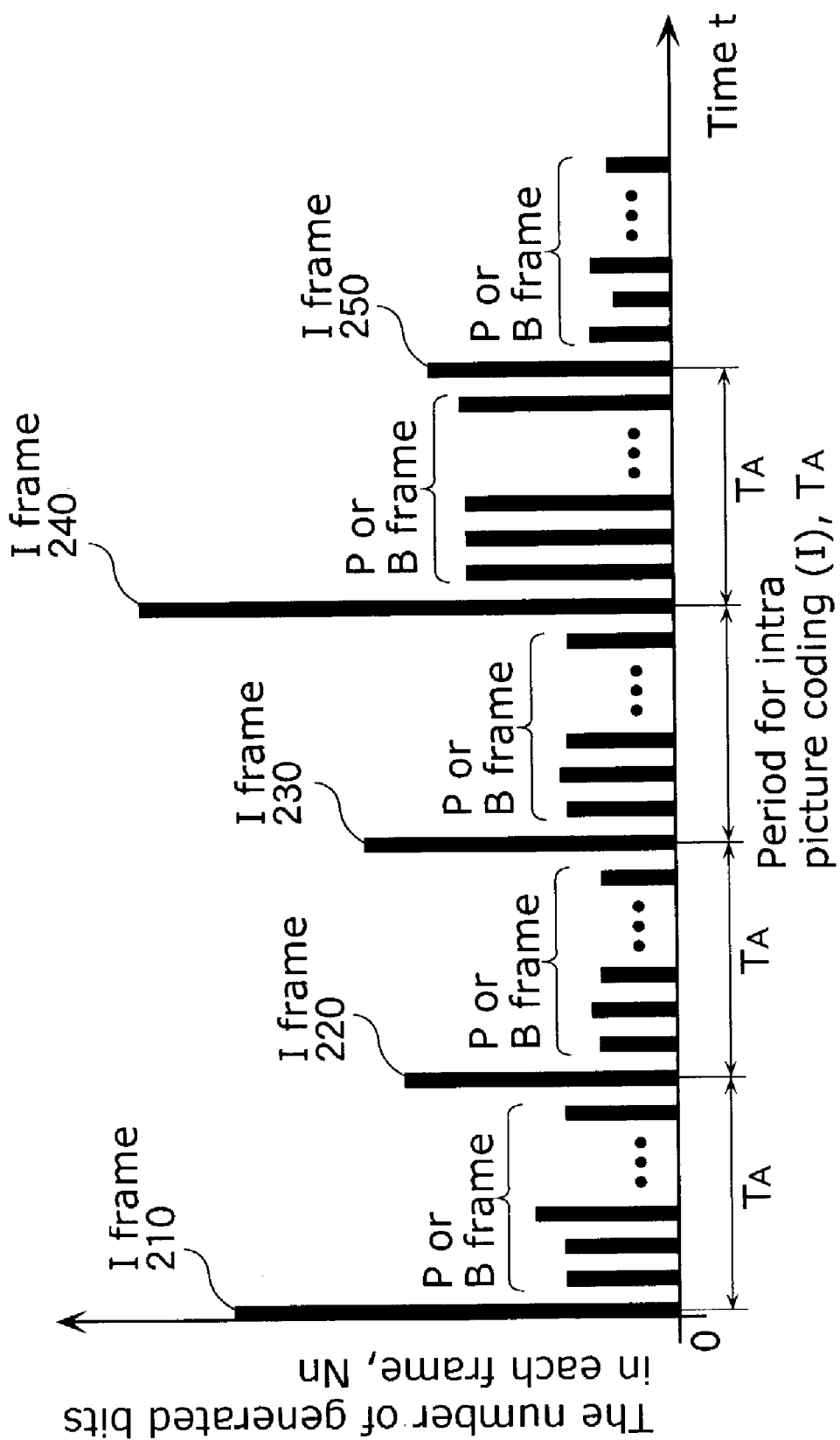
FIG. 9 is an illustration showing characteristics of the number of generated bits depending on picture types during general coding.

FIG. 9 is an illustration showing general characteristics of the number of generated bits depending on picture types for coding. As shown in FIG. 9, the number of generated bits, Nn, in a frame (P or B frame) for intra picture coding (P picture or B picture) is ordinarily less than the number of generated bits, Nn, in a frame (I frame 210~250) of an intra coded picture (I picture). Therefore it is possible to reduce fluctuations of the number of generated bits in each frame group by defining frames between an I frame and a next I frame as a frame group compared with the case that a frame group is defined by other definition (for example, the case that a frame group comprises every 15 frames regardless of a picture type). For information, it should be assumed for an example in FIG. 9 that a time period required for coding each frame group is TA, and a cycle is the same, for convenience sake.

Furthermore, only when above-mentioned I frame is the first or the last frame of a frame group, fluctuations of the number of bits in each frame can be reduced.

Figure 10:
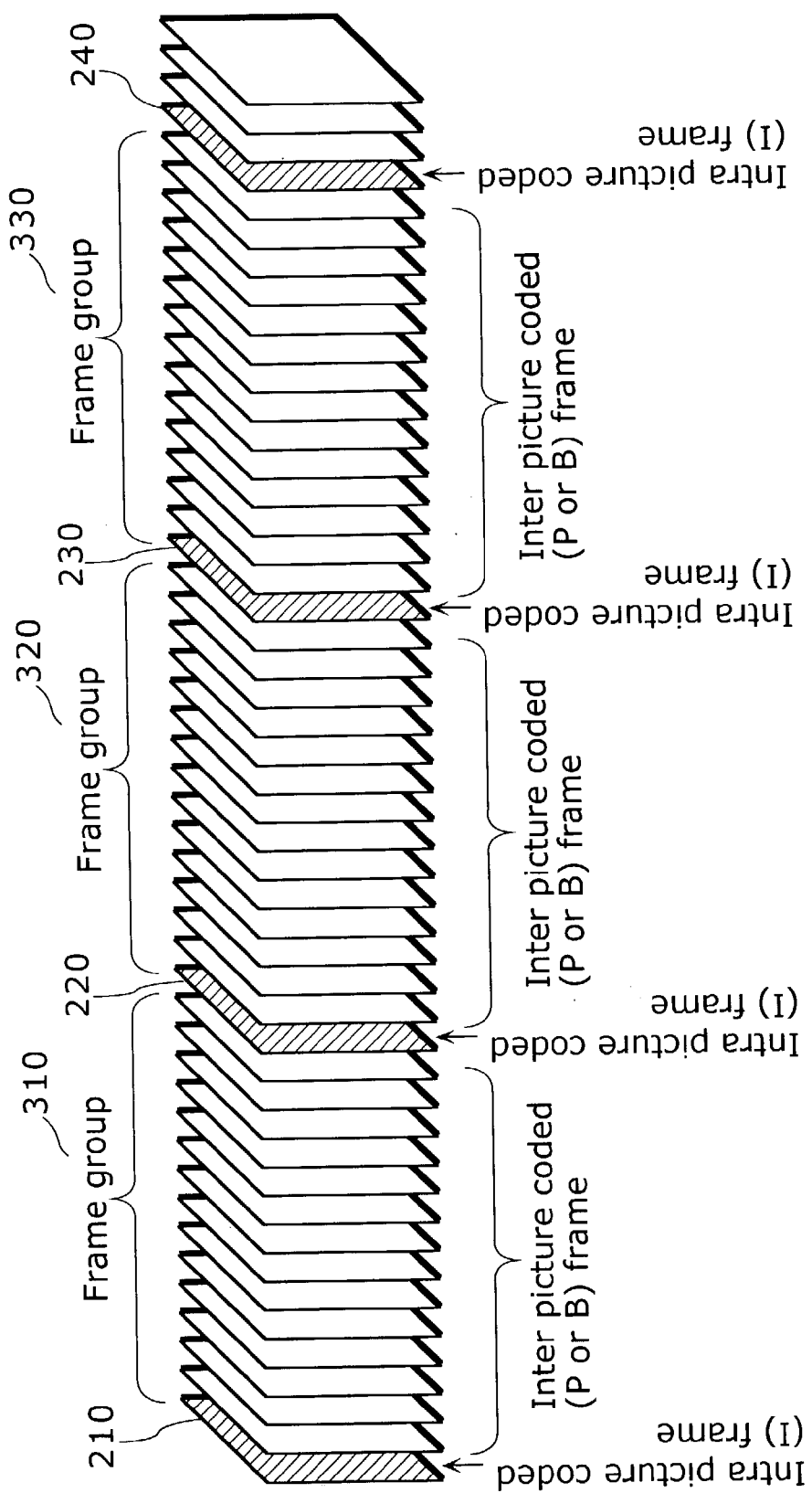
FIG. 10 is an actual example of the frame groups defined in FIG. 9.

FIG. 10 is an actual example of the frame groups defined in above FIG. 9. As shown in FIG. 10, it should be assumed that a frame group 310 is consisted of 15 frames from an intra picture coding (I) frame 210 to a next previous frame of an intra picture coding frame 220. It should be assumed that a frame group 220 and a frame group 230 are consisted of 15 frames each as well. In this case, the initial number of total bits allocatable to a frame group is predetermined (3600 bits, for instance). For information, the method for defining a frame group is not limited to FIG. 10.

Figure 11:
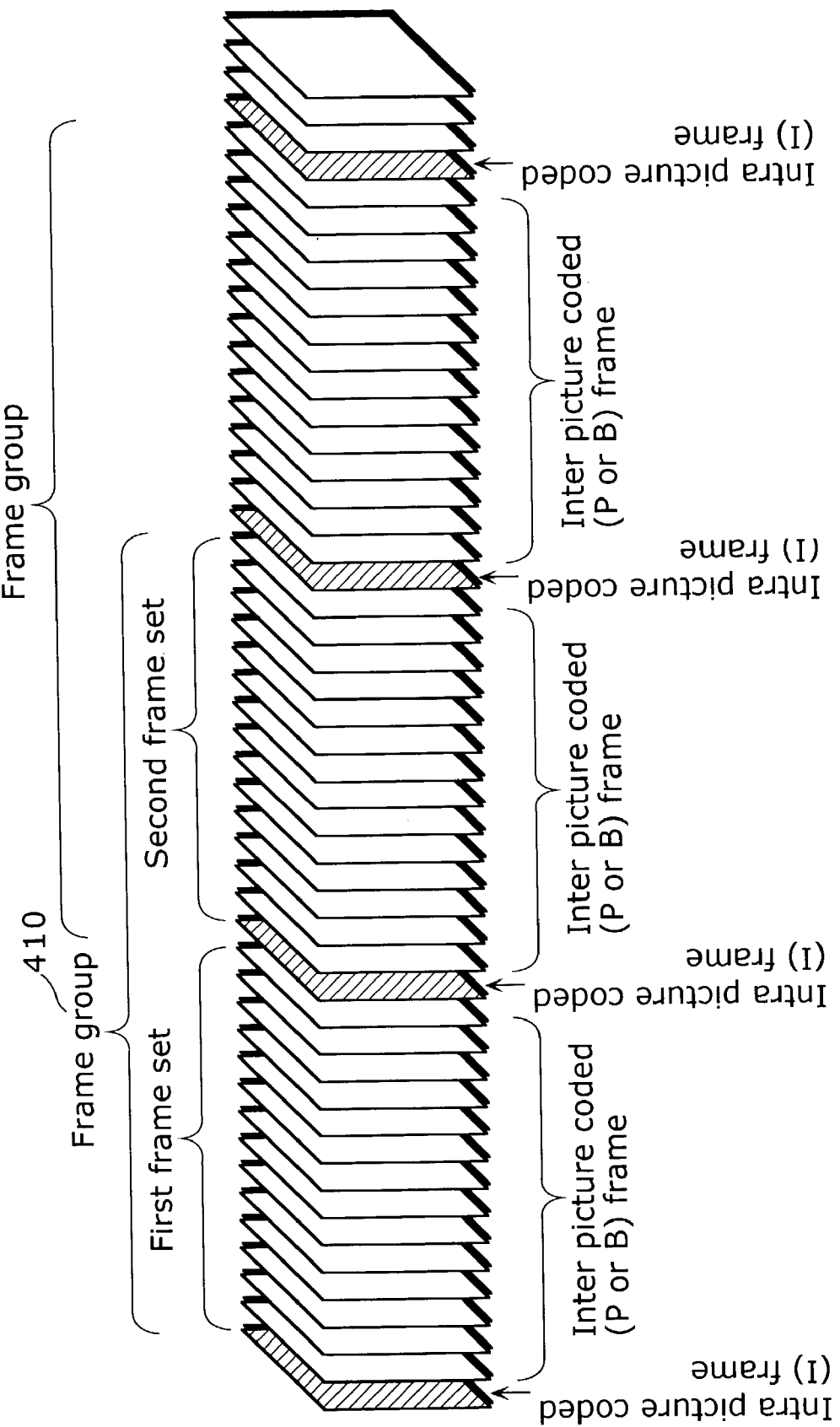
FIG. 11 is a variation of the frame groups defined in FIG. 9.

FIG. 11 is a variation of the frame groups defined in above FIG. 9. As shown in FIG. 11, a group of frames comprises the first frame set and the second frame set corresponding to two frame groups, 310 and 320, in above-mentioned FIG. 10 may be defined as a frame group 410. In this case, it should be assumed that the initial value of the total number of bits allocatable to the frame group 410 is 7200 bits (allocates 3600 bits to the first frame set and the second frame set respectively).

FIG. 12 is an illustration to indicate an effect of a configuration that a frame group comprises 2 frame sets as shown in above FIG. 11.

Figure 12A:
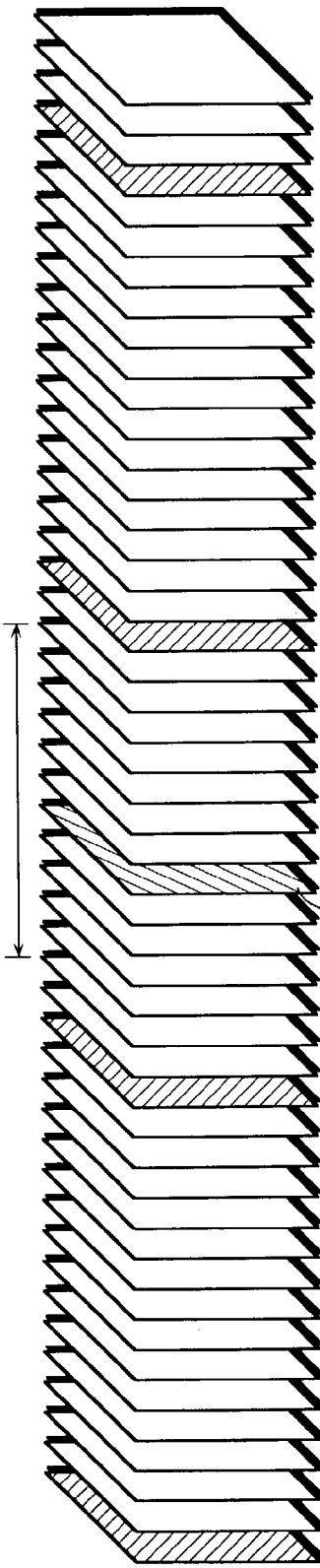
FIG. 12A is an illustration to indicate effect of a configuration that a frame group comprises 2 frame sets, as shown in above FIG. 11.

FIG. 12A shows that it is possible to reduce more fluctuations of a bit rate since the number of bits to be allocated to a next frame to be coded can be determined including the number of bits allocatable to the next second frame set even when a frame group includes pictures which are difficult to be coded. For example, it is assumed that 1000 bits are allocated to an entire frame group 410 as an initial value and 500 bits are provisionally allocated to the first frame set and the second frame set respectively. After that, control is performed for a next frame group 420 in order to allocate 800 bits (300 bits, remainder of a preceding frame group 410, +500 bits for the new second frame set) as an initial value even when 700 bits are used for actual coding in the first frame set.

Figure 12B:
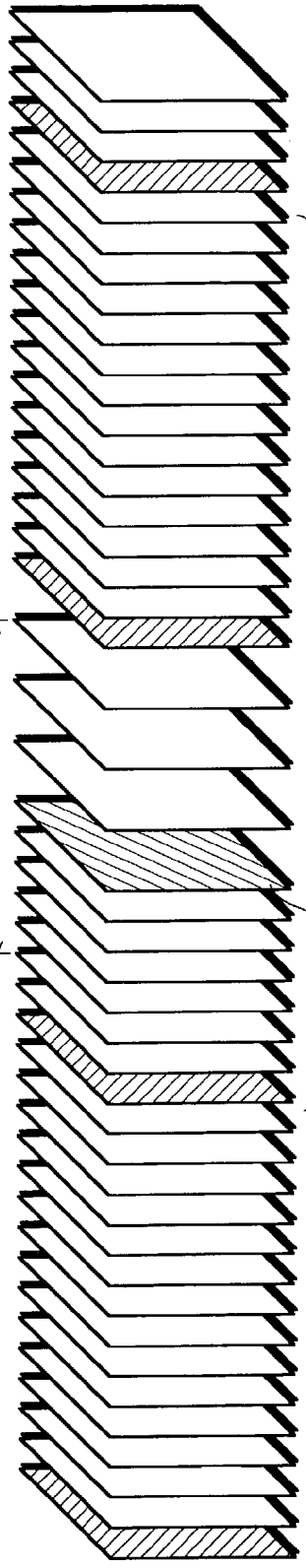
FIG. 12B is an illustration to indicate effect which is caused when a frame group is comprised of 2 frame sets, as shown in above FIG. 11, and a frame for coding is changed.

FIG. 12B shows that it is possible to prevent a bit rate value from rapid decrease (that is, a quantization step becomes suddenly coarse) using the same method as above FIG. 12A even when a frame rate should be changed because coding is further difficult.

FIG. 13 is a flowchart showing a process flow in the overall control unit 40 and the bit rate control unit 30 of the picture coding apparatus 10.

First, the rate control unit 30 receives the number of generated bits, Nn 1, from the variable length coding unit 107 (S701) and receives the frame rate value, Rf 21, from the frame thinning unit 20 (S702).

Next, the overall control unit 40 judges if a next frame is an I frame or not an I frame (S703). In this case, if the next frame is an I frame (S704: Yes), the number of allocatable bits, Na, a time period to be allocated, Ta, and the number of frames to be allocated, Nt, are initialized by the rate control unit 30 (S708~S710).

On the other hand, if the next frame is not an I frame (S704: No), the number of allocatable bits, Na, and the number of frames to be allocated, Nt, are updated by the rate control unit 30 (S705 and S706). In addition, the number of frames to be allocated, Nt, is truncated after decimal point to be an integer number by the rate control unit 30 (S707).

After that, the rate control unit 30 calculates the number of bits to be allocated, Nb, based on the number of allocatable bits, Na, and the number of frames to be allocated, Nt, (S711), and updates the time period to be allocated, Ta (S712). In this case, the time period to be allocated, Ta, is updated with considering the case the frame rate value, Rf 21, is changed in the midstream of a same frame group.

Thus the rate control unit 30 calculates a quantization step based on the number of bits to be allocated, Nb, and transmits it to the variable length coding unit 107 (S713).

The overall control unit 40 and the rate control unit 30 repeat above process until coding is completed (S701~S714).

FIG. 14 is an example showing change of a bit rate when coding is performed using the picture coding apparatus 10. According to the change of a bit rate shown in FIG. 14, the change of a bit rate shows downward trend since the number of allocatable bits is reduced compared with the conventional technology (above FIG. 5) due to the coefficient in the calculating unit 34 (0.8, for instance). Moreover, it is shown in FIG. 14 that the number of bits which is not less than the lower limit is selected in the calculating unit 34, and a quantization step, in which the number of bits after a coding is equal to the number of bits selected, is calculated. Furthermore, it is shown in FIG. 14 that since coding is performed according to the calculated quantization step and the number of generated bits is decided, a bit rate is also greater than the lower limit.

FIG. 15 shows that it is possible for the conventional technology (above FIG. 5) to prevent a bit rate from decreasing and to reduce degradation of quality of pictures between "t3 and t4", where a bit rate value is extremely small (that is, a quantization step is extremely coarse), however, use of a great number of bits for the first frame set affects the beginning of the second frame set (between "t4 and t6") (that is, a quantization step can not be diminished and a bit rate value remains small).

FIG. 16 is an example showing a state of bit rate fluctuations when a group of frames comprises 2 frame sets and a frame rate for coding is changed in the midstream of a frame group. In FIG. 16, a frame rate is changed from 15 [fps] to 7.5 [fps], however, the change of bit rate is same as the bit rate shown in above FIG. 14 (that is, in the case of FIG. 16, it can be assumed that the bit rate becomes same since coding using half the quantization step generates double the number of generated bits, and degradation in quality of pictures is reduced between "t3 and t4" as well)

Figure 1:
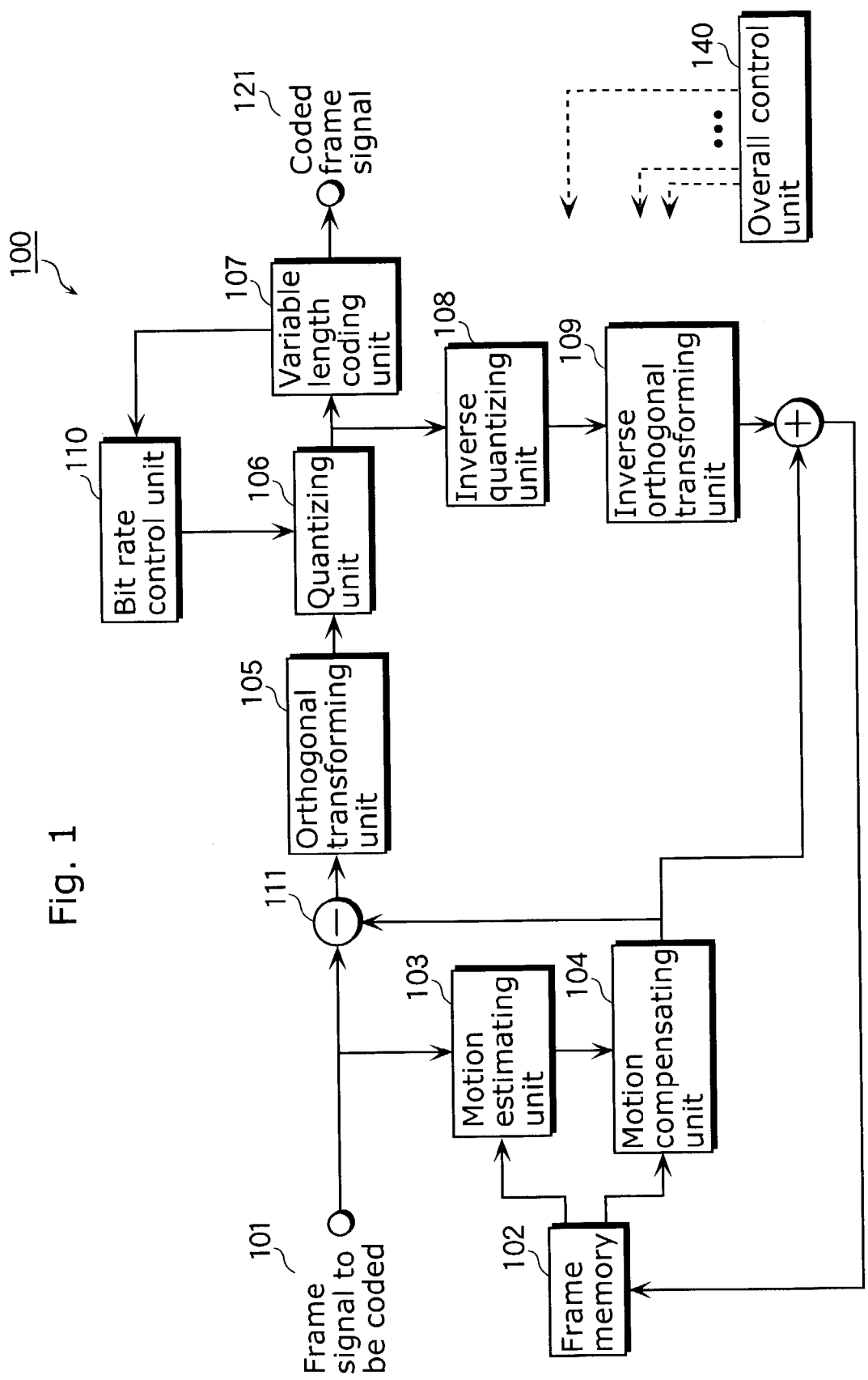
FIG. 1 is a block diagram showing a functional configuration of a picture coding apparatus employing a conventional variable frame rate method.
Figure 2:
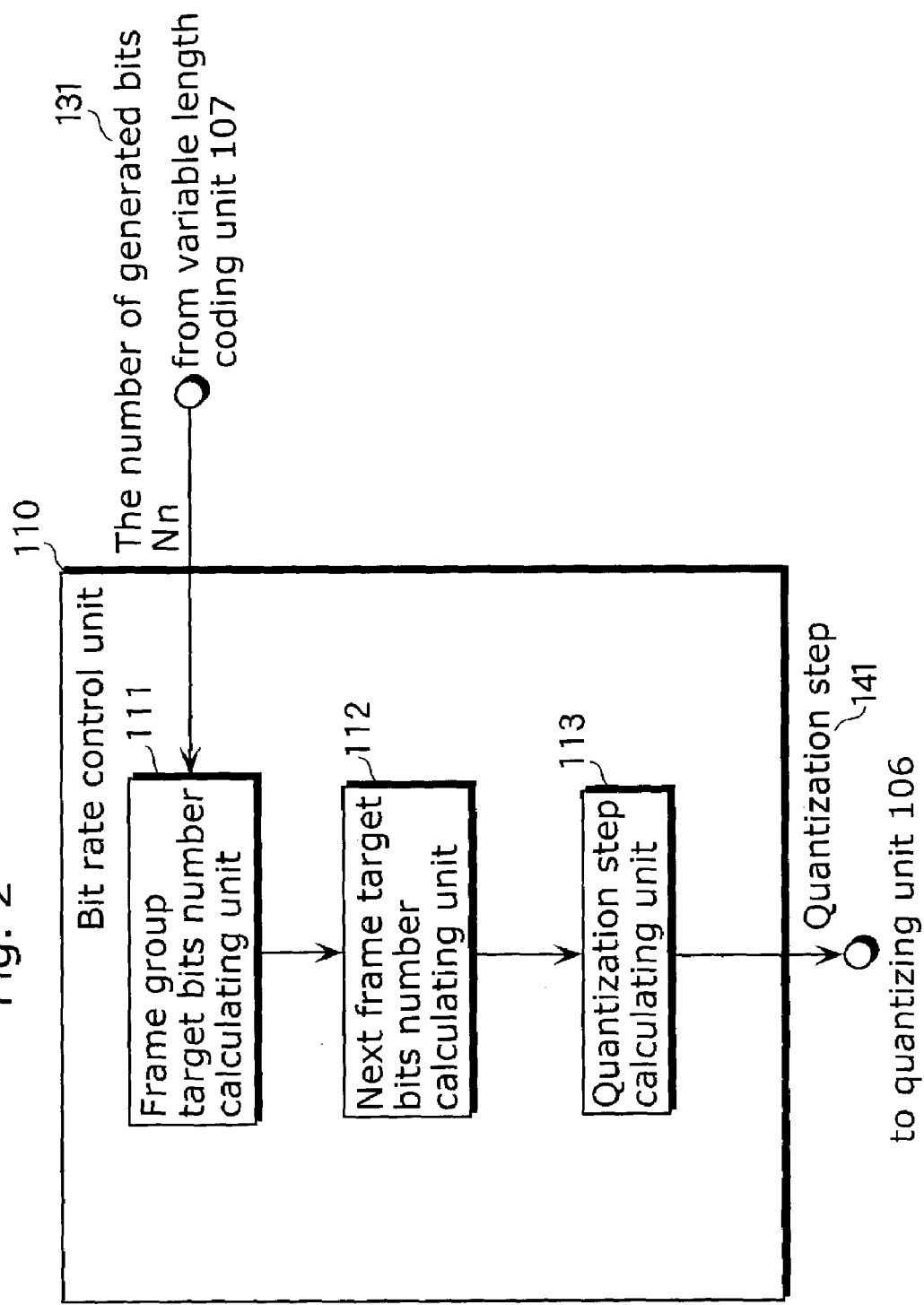
FIG. 2 is a block diagram showing a functional configuration of a bit rate control unit according to a conventional picture coding apparatus.
Figure 3:
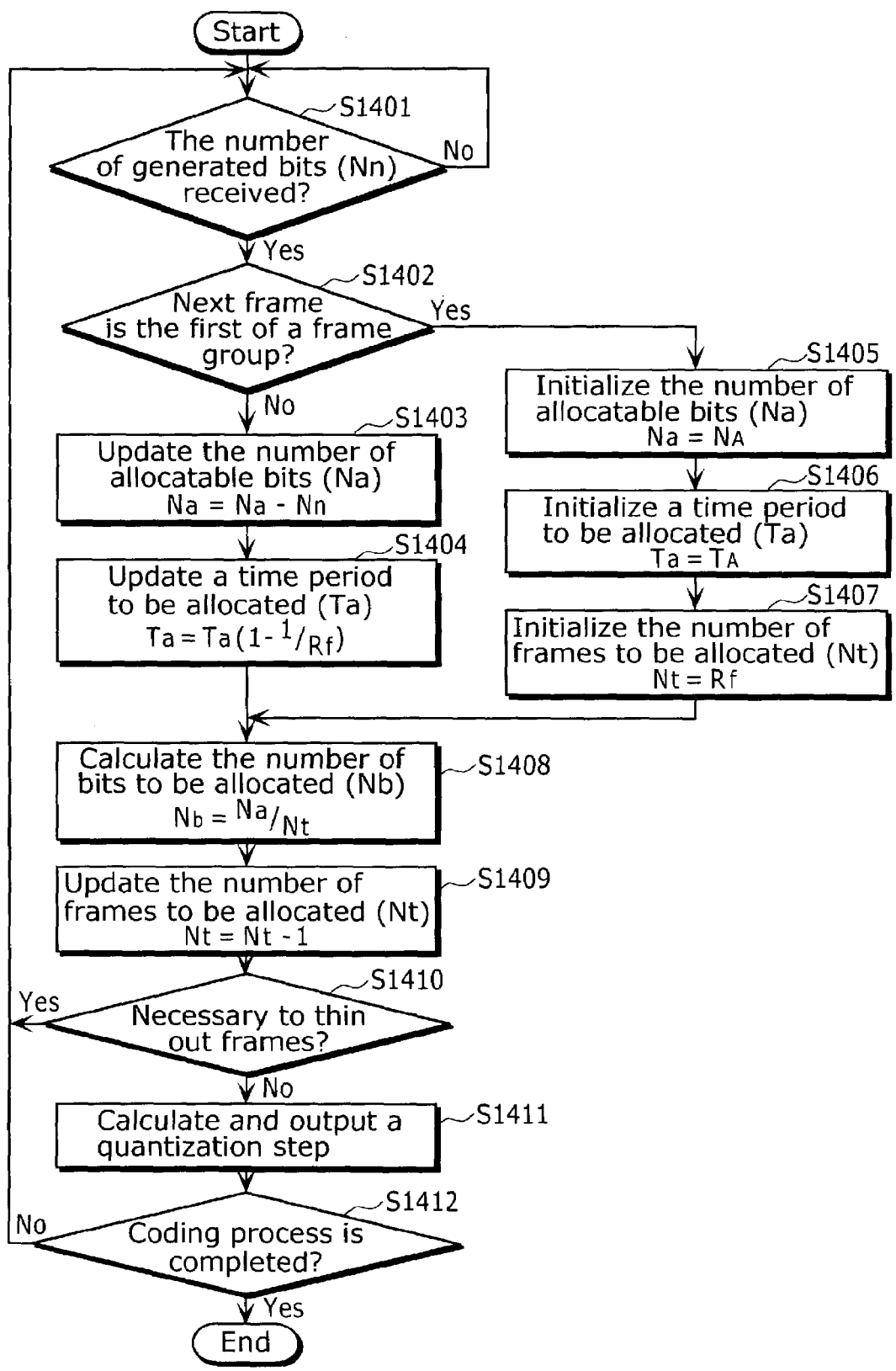
FIG. 3 is a flowchart showing process flow in an overall control unit and a bit rate control unit according to a conventional picture coding apparatus.
Figures 6A, 6B:
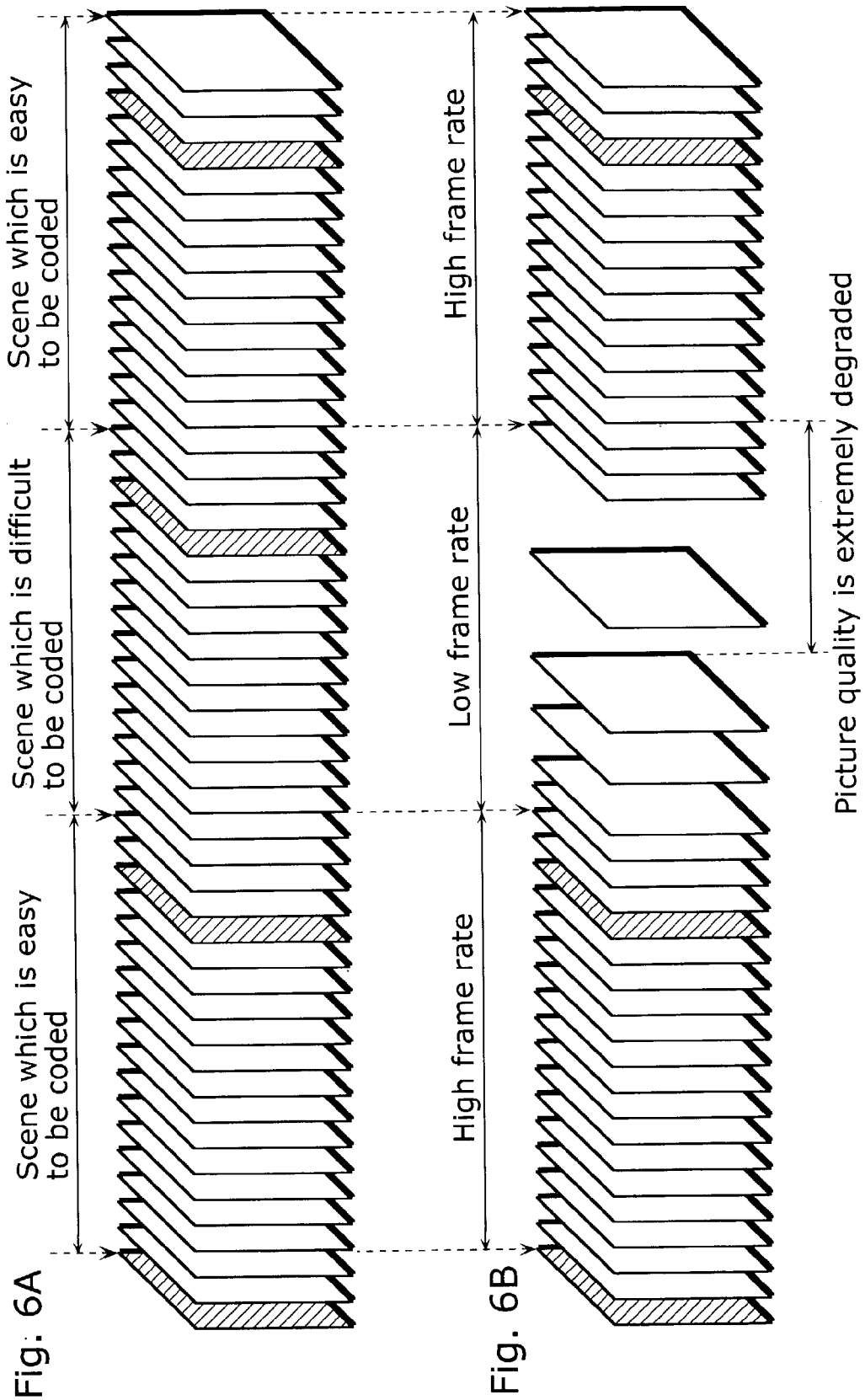
FIG. 6A is a configuration example of a frame group to indicate the second problem of the conventional technology.
FIG. 6B is an example of bit rate to indicate the second problem of the conventional technology.

FIG. 17 is an illustration showing an actual example of a calculation method for calculating the number of bits in the calculating unit 34 in above FIG. 8. In the example shown in FIG. 17, coding is performed at a frame rate of 15 [fps] for the coded frame signal inputted at 30 [fps]. In this example, the frame signal to be coded 101 to be inputted is indicated as "an input picture frame number 1701" and a coded frame signal 121 is indicated as "a frame group frame number 1702" as same as shown in above FIG. 6. A symbol "x" in columns of the frame group frame number 1102 and the number of generated bits, Nn 131, in FIG. 17 shows that coding is not performed for a corresponding frame of the input picture frame number 1701 but "thinning" is performed.

Moreover, the target value of the number of generated bits corresponding to an input picture frame number "9", (that is, a frame group frame number "5"), for example, is ((3600−1180)/11=220 bits) since the total number of bits already allocated is 1180 bits and the number of residual frames are "11". In addition, the average number of bits generated in preceding frames in the average frame bits number calculating unit 33 is calculated (1180/4=295 bits), and the average number of generated bits is multiplied by a coefficient (0.8, for instance) in the calculating unit 34, and the resulting number and the target number of bits are compared and a greater number is selected. As a result, the number of generated bits corresponding to the frame group frame number "5" is 236 bits.

On the other hand, the number of generated bits corresponding to an input picture frame number "13" (that is, a frame group frame number "6") is calculated based on the number of residual frames, "5", (using 7.5 [fps] as a frame rate value RF 21) since a frame in an input picture frame number "11" is thinned out (therefore, a frame rate value Rf 21is changed to 7.5 [fps]). Hence, the number of generated bits is (3600−1416)/5=436 bits since the calculated value is truncated after decimal point. Furthermore, the average number of generated bits on preceding frames in the average frame bits number calculating unit 33 is calculated (1416/5=383 bits), the average number of generated bits is multiplied by a coefficient (0.8, for instance) in the calculating unit 34, the resulting value and a target value of the above number bits, and the greater number is selected. As a result, the number of generated bits corresponding to the input picture frame number "13" is 436 bits.

Comparing the numbers of generated bits, Nn, in frame group frame numbers "5" and "6" respectively shown in FIG. 17 and FIG. 4 according to the conventional technology, it is found that the number of generated bits in the picture coding apparatus 10 according to the first embodiment (that is, above FIG. 17) is greater in both figures, and the greater number of bits can be allocated. In other words, coding to actualize higher quality pictures than the conventional technology is possible.

For information, 2 numbers are entered in columns of a frame group frame number corresponding to an input picture frame number "29" in above FIG. 17, and "(15)" is a predictive value for the frame group frame number 1102 when a frame rate is 15 [fps] at the point when an input picture frame number is "9", and "(10)" is a predictive value for the last frame group frame number 1102 when a frame rate is 7.5 [fps] at the point when an input picture frame number is "13".

By the way, the frame thinning unit 20 is provided and a bit rate is controlled based on a frame rate value, Rf 21, transmitted from the frame thinning unit 20 for the first embodiment, mentioned above, however, a frame rate value may be obtained from a unit other than the frame thinning unit 120.

Figure 18:
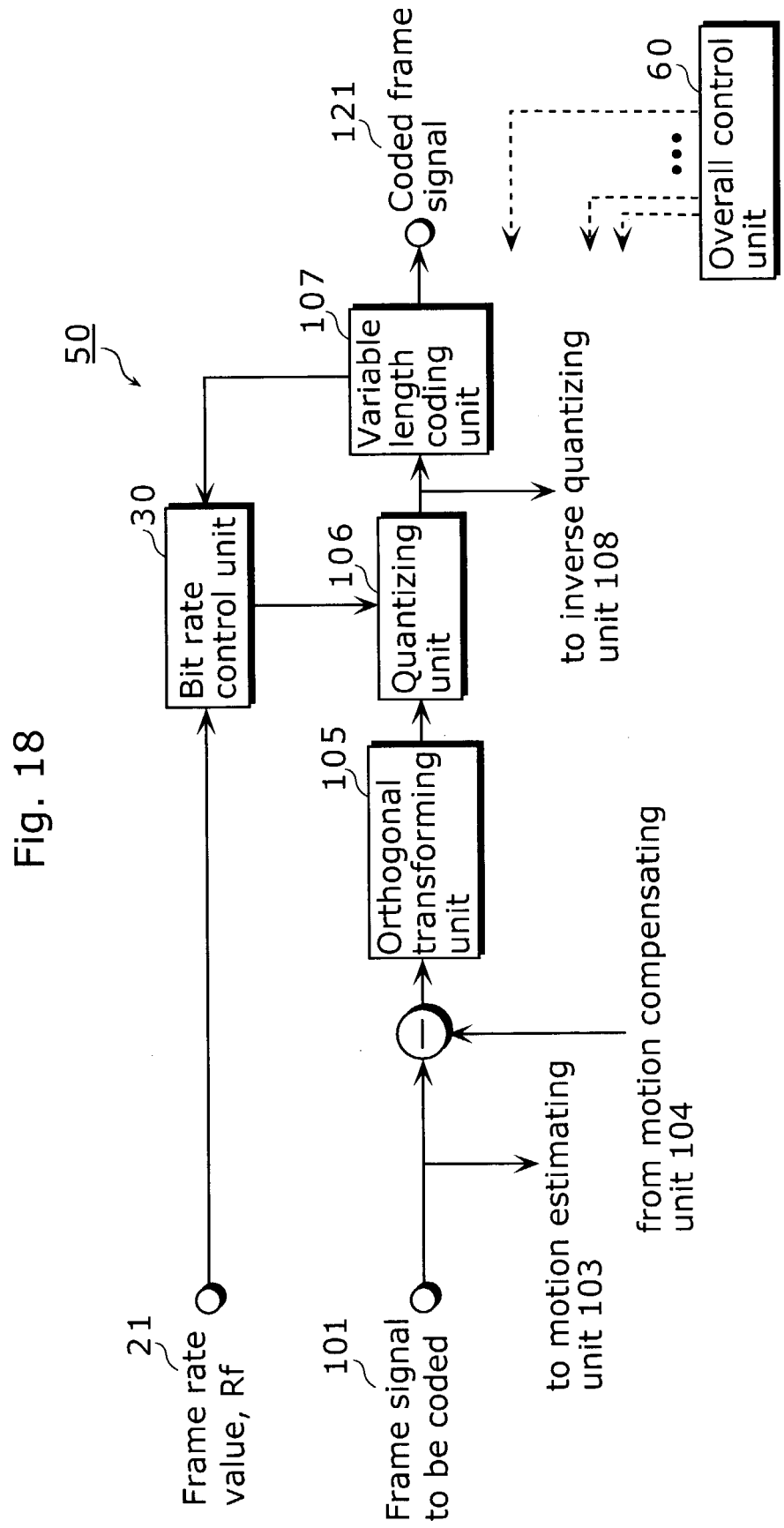
FIG. 18 is a block diagram showing a part of functional configuration related to a picture coding apparatus which is not equipped with a frame thinning unit and is formed to obtain a frame rate value, Rf, from other unit.

FIG. 18 is a block diagram showing a part of functional configuration related to a picture coding apparatus 50 which is not equipped with the frame thinning unit 20 shown in above FIG. 17 and is configured to obtain the frame rate value, Rf 21, from other unit. Differences between the picture coding apparatus 50 and the picture coding apparatus 10 in FIG. 7 are only that the picture coding apparatus 50 is not equipped with the frame thinning unit 20 but is equipped with an overall control unit 60 instead of the overall control unit 40.

In addition, a quantization step according to the first embodiment may be used instead of a quantization parameter since the quantization step according to the first embodiment corresponds uniquely to the quantization parameter.

As described above, it is possible to ensure equally high quality of pictures regardless of difficulty of coding and to prevent pictures from extreme awkwardness and degradation since the picture coding apparatus according to this embodiment determines the number of bits to be allocated with conforming to the change of frame rate for coding.

Furthermore, a bit stream coded using the picture coding apparatus shown in the above first embodiment can be decoded using a general method for coding pictures. In addition, a quantization step of each frame is changed for a stream coded according to the first embodiment in concordance with complexity of pictures, however, the change is not excessive and it is possible to keep the number of generated bits constant between a frame group including frames from an intra picture coding frame to an immediately preceding frame of an intra picture coding frame.

For information, a cycle required for coding each frame group is equalized as "TA", however, it is not limited to the case equalizing the cycle and a time period required for coding each frame group may be different.

Besides, it is configured for the above embodiment to multiply only the average number of bits calculated in the average frame bits number calculating unit by the specified coefficient (0.8, for instance), and to select the greater number comparing the resulting value and the target number of bits calculated in the next frame target bits number calculating unit, however, it may be configured to multiply both an average value and a target value by a specified coefficient and compare.

(Second Embodiment)

Figure 19:
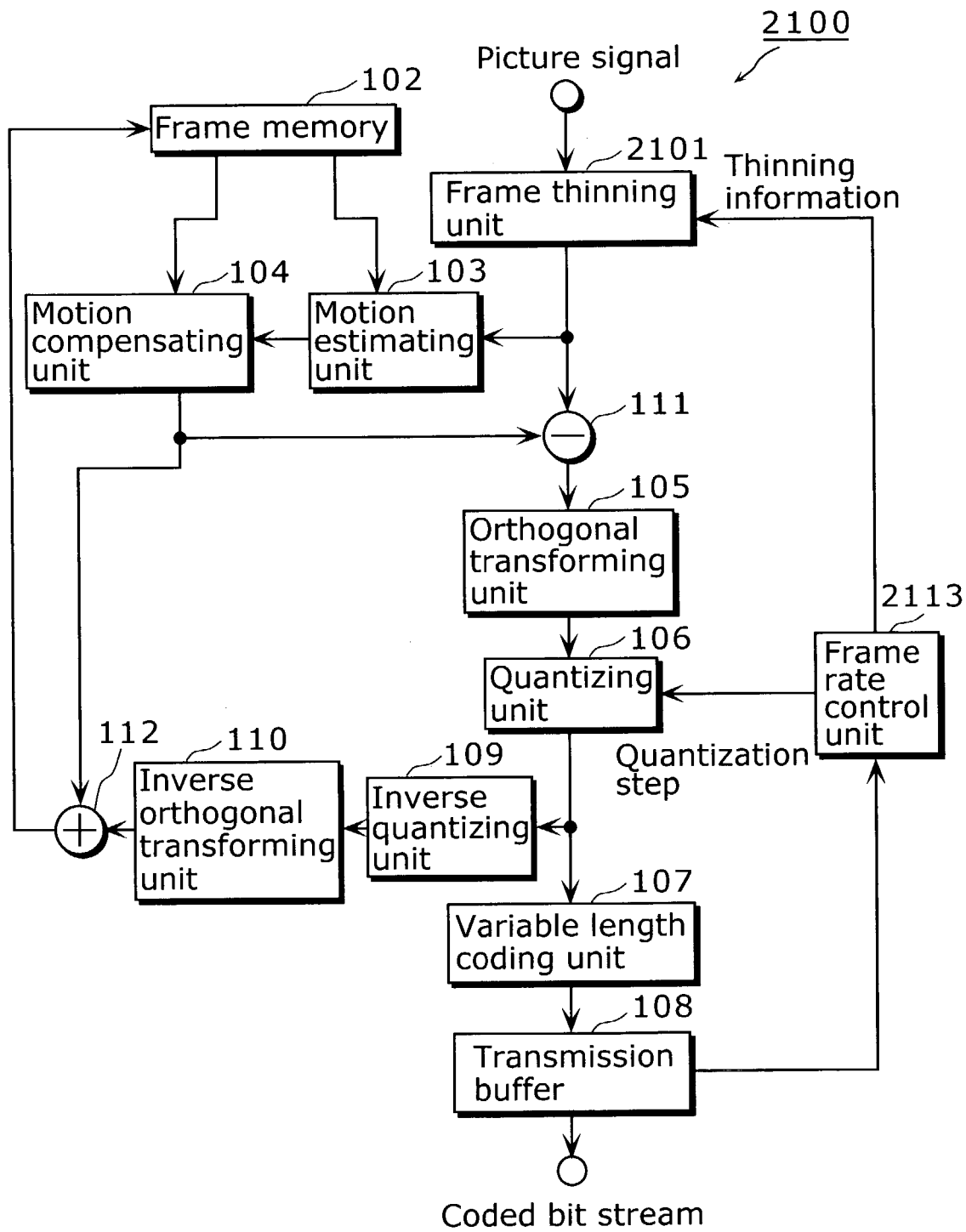
FIG. 19 is a block diagram showing a functional configuration of a picture coding apparatus according to the second embodiment.

FIG. 19 is a block diagram showing a functional configuration of a picture coding apparatus 2100 according to the second embodiment. The picture coding apparatus 2100 can suppress abrupt fluctuations of a bit rate and a frame rate, and perform coding with high quality pictures by controlling a quantization step and frame thinning while concerning a group of frames comprises double the conventional number of frames.

The picture coding apparatus 2100 is equipped with a frame thinning unit 104, a frame memory 102, a motion estimating unit 103, a motion compensating unit 104, an orthogonal transforming unit 105, a quantizing unit 106, a variable length coding unit 107, a transmission buffer 108, an inverse quantizing unit 109, an inverse orthogonal transforming unit 110, a difference calculator 112, an adder 112 and a frame rate control unit 2113.

The frame thinning unit 2101 performs a thinning processing for each frame of a picture signal inputted at reference a frame rate (30 Hz, for instance) following thinning information inputted from the frame rate control unit 2113, and outputs the thinned picture signal to the motion estimating unit 103 and the differential calculator 111. For example, when a value of thinning information inputted from the frame rate control unit 2113 to the frame thinning unit 101 is "1", an instruction to code without thinning is indicated, and when the value is "0", an instruction to code with thinning 1 frame is indicated. That is, the frame thinning unit 2101 outputs a frame inputted as a picture signal directly to the motion estimating unit 103 and the differential calculator 111 as a coded frame. On the other hand, a process to thin out an inputted frame (discards frames, for example) is performed when thinning information is "0".

The frame memory 102, which is implemented by such as RAM or a hard disk, is a memory unit for storing a picture data on a frame basis. Furthermore, the frame memory 102 stores a reference frame data which is a reference picture for a next inter picture prediction coding frame. The motion estimating unit 103 estimates a motion of a coded frame using the reference frame data stored in the frame memory 102 when an inputted coded frame is a frame for an inter picture prediction coding. The motion compensating unit 104 generates a motion compensating data corresponding to a motion estimated by the motion estimating unit 103. The mentioned motion compensating data is a data showing a motion vector showing a correspondence between blocks of a reference frame and a coded frame and a difference of picture signals between blocks shown by the motion vector.

The differential calculator 111 calculates difference from a motion vector based on a motion compensating data generated from a motion vector in a coded frame and the motion compensating unit 104 if a coded frame is a frame for which intra picture prediction coding is performed. On the other hand, the differential calculator 111 does not perform a process to calculate difference from the reference frame for an inputted picture signal, and outputs a picture signal to the orthogonal transforming unit 105 after performing intra picture prediction if a coded frame is the frame which performs an intra prediction coding.

The orthogonal transforming unit 105 orthogonally transforms a motion compensating data generated in the motion compensating unit 104 into data showing frequency components by such as DCT (Discrete Cosine Transform), and outputs the transformed result to the quantizing unit 106. The quantizing unit 106 quantizes data orthogonally transformed using a quantization step inputted from the frame rate control unit 2113, and outputs the quantized result to the variable length coding unit 107 and the inverse quantizing unit 109. The variable length coding unit 107 performs a variable length coding for data quantized in the quantizing unit 106 using such as Huffman code. Data for which a variable length coding is performed in the variable length coding unit 107 is stored in a transmission buffer 108 and outputted as a coding bit stream.

The transmission buffer 108 is a FIFO (First-In First-Out) memory implemented by such as RAM. The transmission buffer 108, for example, stores the total number of bits allocated to a frame group comprises multiple frames while monitoring the residual amount of data or free area inside the buffer, and transmits the residual amount of data in the transmission buffer 108 to the frame rate control unit 2113, when data for which a variable length coding is performed is transmitted to the transmission buffer 108, that is, when coding a picture signal included in a frame is completed.

An inverse quantizing unit 109 performs an inverse quantization for data quantized in the quantizing unit 106 in order to generate a predictive picture, and outputs to the inverse orthogonal transforming unit 110. The inverse orthogonal transforming unit 110 performs an inverse orthogonal transformation for data inversely quantized in the inverse quantizing unit 109. The adder 112 adds data inversely quantized in the inverse orthogonal transforming unit 110 to a motion compensating data generated in the motion compensating unit 104, and outputs to the frame memory 102. The residual amount of data inside the transmission buffer 108 is inputted from the transmission buffer 108 to the frame rate control unit 2113. The frame rate control unit 2113 calculates a quantization step corresponding to the residual amount of data inside the transmission buffer 108 and outputs it to the quantizing unit 106 while calculating a frame rate corresponding to the calculated quantization step, and determines thinning information, which indicates whether a next frame is thinned out or not thinned out, and inputs it to the frame thinning unit 2101. "The quantization step" mentioned here is a reference value (width) for quantizing frequency components of each frame, and is specified, for example, by natural numbers between "1" and "31" (it is called "a quantization parameter"). The quantization parameter is corresponded to a quantization step one to one, and it is defined that a greater quantization parameter is corresponded to a wider quantization step. Hereinafter, the quantization parameter is explained as "a quantization step".

Figure 20:
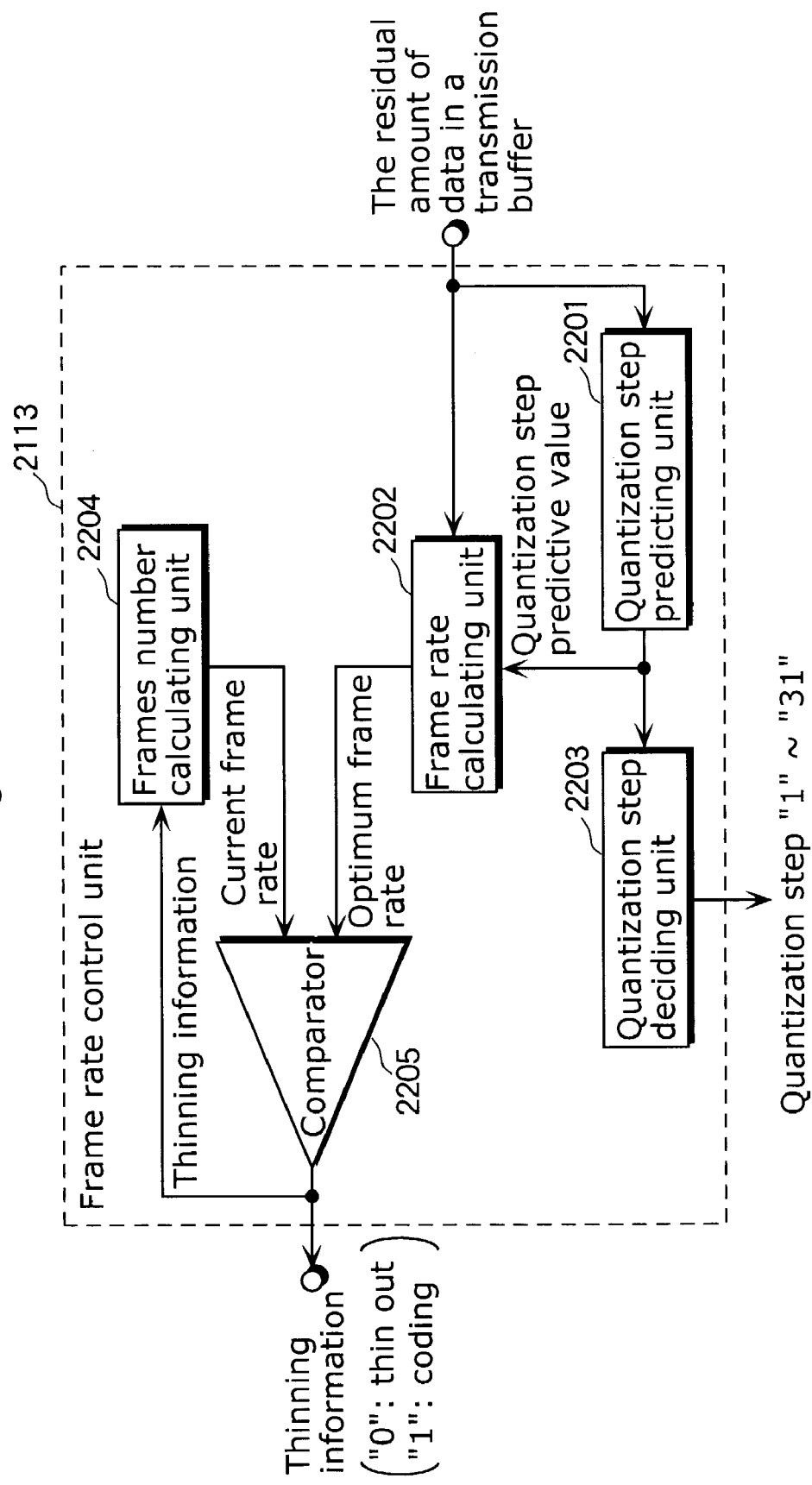
FIG. 20 is a block diagram showing the detailed functional configuration of a rate control unit in FIG. 19.

FIG. 20 is a block diagram showing the detailed functional configuration of the frame rate control unit 2113 in above-mentioned FIG. 19. The frame rate control unit 2113 is equipped with a quantization step predicting unit 2201, a frame rate calculating unit 2202, a quantization step deciding unit 2203, a frames number calculating unit 2204 and a comparator 2205. The quantization step predicting unit 2201 performs a specified calculation for a quantization step of this time point in concordance with the residual amount of data inputted from the transmission buffer 108, and calculates a quantization step predictive value and outputs it to the frame rate calculating unit 2202 and the quantization step deciding unit 2203. The quantization step deciding unit 203 selects the natural number closest to the quantization step predictive value inputted from the quantization step predicting unit 201 from the natural numbers between "1" and "31", and decides the selected natural number as a next quantization step. Particularly a rounding process such as round off, round down, or round up is performed when an inputted quantization step predictive value includes the value after decimal point. In this case, "1" is selected when the value is less than "1", and "31" is selected when the value exceeds "31".

The frame rate calculating unit 2202 calculates an optimum frame rate for coding a next frame based on the residual amount of data inputted from the transmission buffer 108, a quantization step predictive value inputted from the quantization step predicting unit 201 and the current frame rate. The frame number calculating unit 204 calculates the current frame rate based on thinning information outputted from the comparator 205. The comparator 205 compares an optimum frame rate, an output from the frame rate calculating unit 202, with the current frame rate, an output from the frame rate calculating unit 204, and outputs "1", which indicates not to thin out, as thinning information if an optimum frame rate is grater than the current frame rate. On the other hand, "0", which indicates to thin out, is outputted as thinning information if an optimum frame rate is less than the current frame rate.

Figure 21A:
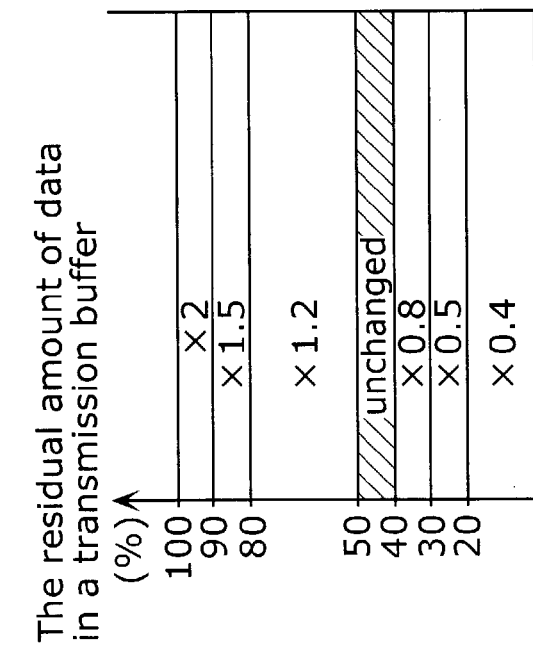
FIG. 21 is a block diagram to indicate function of a quantization step predicting unit in FIG. 20.
Figure 21B:
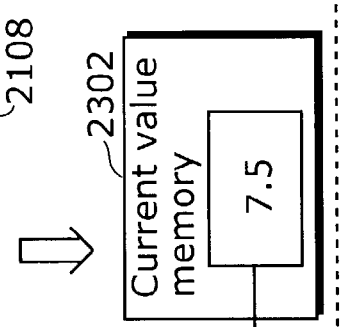

FIG. 21 is a block diagram to indicate a function of a quantization step predicting unit 201 in above-mentioned FIG. 20. FIG. 21A is an illustration diagrammatically showing a method of a quantization step prediction in the quantization step predicting unit 201. FIG. 21B is an illustration showing a predictive coefficient table 303 contained in the quantization predicting unit 201. The quantization step predicting unit 201 contains a current value memory 2302 shown in FIG. 21A and the predictive coefficient table 2303 shown in FIG. 21B. The current value memory 302 stores an initial value of a quantization step at the start of coding, and stores a quantization step predictive value calculated in the quantization step predicting unit 201 after starting coding. The residual amount of data and a predictive coefficient in the transmission buffer 108 are conformed and stored in the predictive coefficient table 303, and the quantization step predicting unit 201 calculates a quantization step predictive value for a next frame by multiplying a predictive coefficient corresponding to the residual amount of data inputted from the transmission buffer 108 by the current quantization step predictive value stored in the current value memory 302.

As shown in FIG. 21A and FIG. 21B, a predictive coefficient is "1.2" when the residual amount of data in the transmission buffer 108 is more than 50% but less than 80%, "1.5" when the amount is more than 80% but less than 90%, and "2" when the amount is more than 90% but less than 100%. Thus, the quantization step predictive value is set to increase its value for fewer free area in the transmission buffer 108 in order to reduce the amount of coded bits. Moreover, a predictive coefficient is set as "1" to keep a quantization step as it is when the residual amount of data in the transmission buffer 108 is more than 40% but less than 50%. On the other hand, a predictive coefficient is set to be "0.8" when the residual amount of data in the transmission buffer 108 is more than 30% less than 40%, "0.5" when the amount is more than 20% but less than 30%, and "0.4" when more than 0% but less than 20%. In other words, the predictive coefficient is set to increase the amount of bits in data to be coded for larger free area in the transmission buffer 108 (that is, the predictive coefficient is set to improve quality of pictures by quantizing finely using a small quantization step).

For example, if a quantization step predictive value in the current value memory 302 is "7.5" and the residual amount of data in the transmission buffer 108 is 75%, the quantization step predictive value in the current value memory 302 "7.5" is multiplied by a predictive coefficient "1.2" at a next frame, and the predictive value corresponding to the frame is "9". The current value memory 2302 is overwritten with the calculated quantization step predictive value "9" by the quantization step predictive unit 2201. The quantization step predictive value "9" is included in natural numbers between "1" and "31", therefore, it is determined as a quantization step corresponding to the relevant frame by the quantization step deciding unit 2203. If the residual amount of data in the transmission buffer 108 for a next frame is still 70% even after the relevant frame is quantized by the quantization step value "9", a quantization step predictive value "9" is multiplied by a predictive coefficient "1.2" and a next quantization step predictive value is "10.8". If the quantization step deciding unit 203 decides a quantization step with rounding off, a next frame is quantized by a quantization step "11". Thus, by setting a predictive coefficient, when the residual amount of data in the transmission buffer 108 becomes 50% or more, quality of a picture to be coded is getting gradually rough due to increase of a quantization step, and the amount of bits in data to be coded can be gradually reduced. On the other hand, when the residual amount of data in the transmission buffer 108 becomes less than 40%, the amount of bits in data is increased due to decrease of a quantization step, however, quality of a picture to be coded can be gradually improved.

Figure 22:
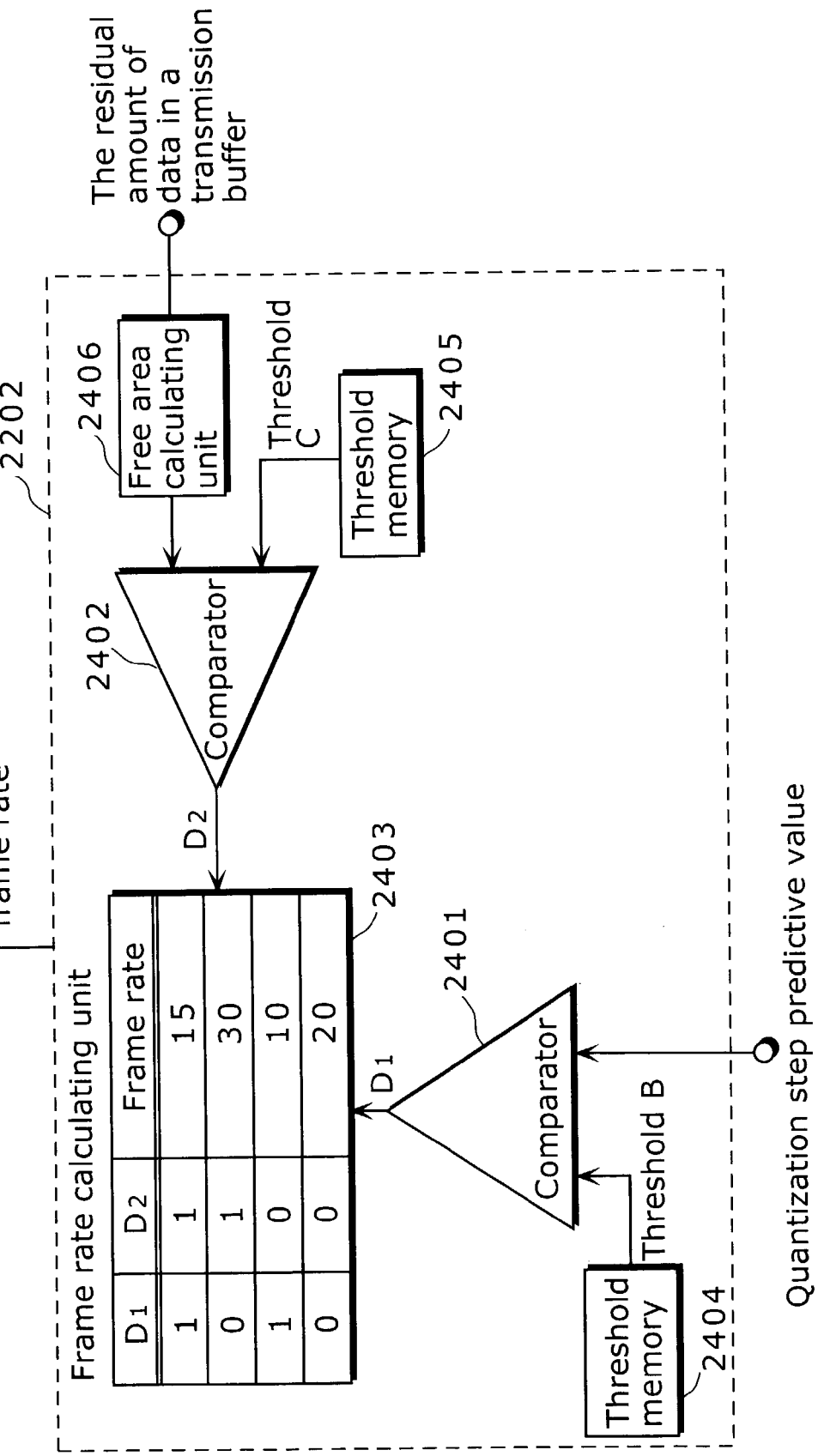
FIG. 22 is a block diagram to indicate function of a frame rate calculating unit in FIG. 20.

FIG. 22 is a block diagram to indicate a function of the frame rate calculating unit 2202 in above FIG. 20. The frame rate calculating unit 2202 is a unit which calculates an optimum frame rate based on the residual amount of data in the transmission buffer 108 and a quantization step predictive value, and includes a comparator 2401, a comparator 2402, a frame rate table 2403, a threshold memory 2404, a threshold memory 2405 and a free area calculating unit 2406. The threshold memory 2405 and the threshold memory 2406 are implemented by such as a latch circuit or RAM. The comparator 2401 is inputted with a quantization step predictive value, an output from a quantization step predicting unit 2201, and a threshold B stored in the threshold memory 2404. The comparator 2401 compares these two inputs, and, for example, outputs "1" as an output D1 when a quantization step predictive value exceeds the threshold B, and outputs "0" as an output D1 when a quantization step predictive value is below the threshold B. The comparator 2402 is inputted with free area in the transmission buffer 108 calculated in the free area calculating unit 2406 and a threshold C stored in the threshold memory 2405. The comparator 2402 compares these 2 inputs, and, for example, outputs "1" as an output D2 when free area in the transmission buffer 108 exceeds a threshold C, and outputs "0" as an output D2 when free area is below a threshold C. The frame rate table 2403 is a table showing an optimum frame rate corresponding to a combination of an output D1 from the comparator 2401 and an output D2 from the comparator 2402. The threshold memory 2402 stores a predefined threshold B of a quantization step predictive value. The threshold memory 2405 stores a predefined threshold C in the transmission buffer 108. The free area calculating unit 406 calculates the current free area in the transmission buffer 108 based on full data capacity in the transmission buffer 108 and the residual amount of data inputted from the transmission buffer 108.

Particularly, the frame rate calculating unit 2202 calculates an optimum frame rate corresponding to a frame to be coded in concordance with the frame rate table 2403. For example, when free area in the transmission buffer 108 exceeds a threshold C and a quantization step is less than a threshold B, that is, when there is room in the transmission buffer 108 although a quantization step is small, an optimum frame rate is determined to be maximal value (30 Hz, for example). On the other hand, when free area in the transmission buffer 108 is less than a threshold C and a quantization step predictive value exceeds a threshold B, that is, when there is not enough room in the transmission buffer 108 although a quantization step is increased, an optimum frame rate is determined to be minimum value (10 Hz, for example). In addition, if both free area in the transmission buffer 108 and a quantization step predictive value are greater than a threshold, or both are less than a threshold, an optimum frame rate is determined to be an intermediate value.

Figure 23A:
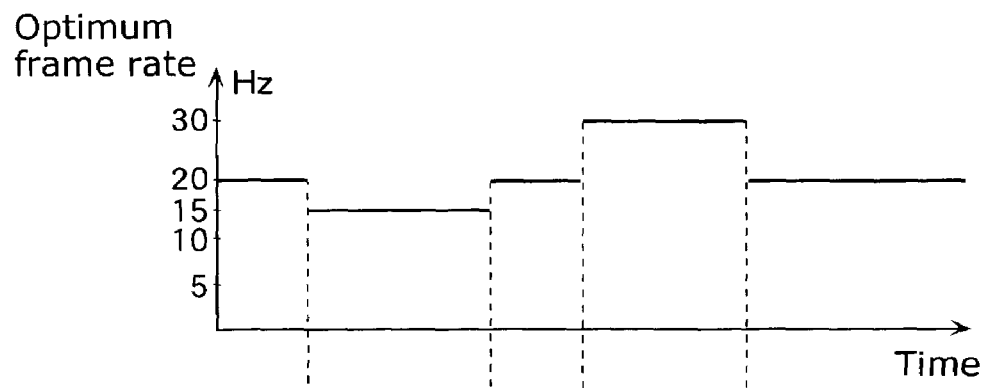
FIG. 23 is an illustration showing each input signal and output signal in the frame rate calculating unit in FIG. 22.
Figure 23B:
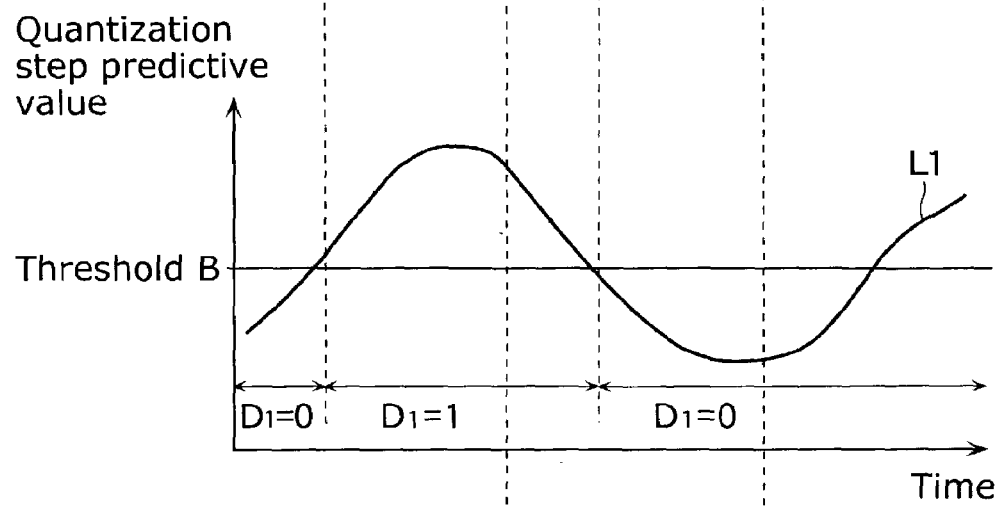
Figure 23C:
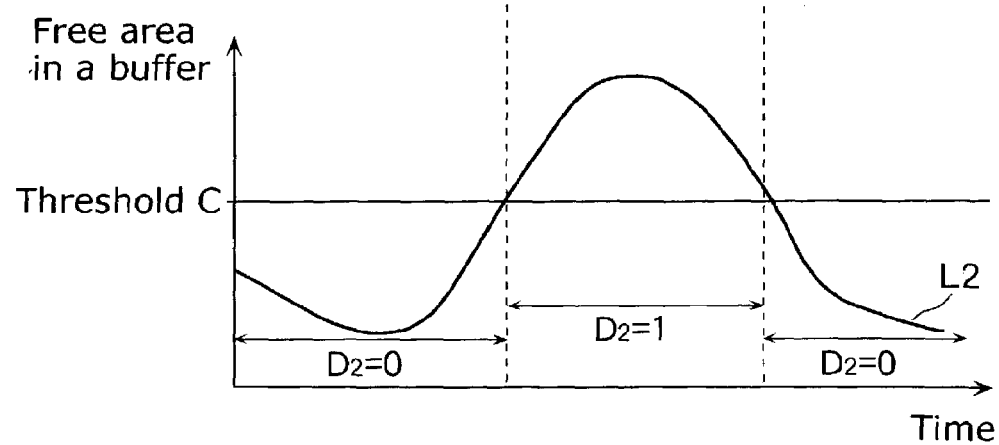

FIG. 23 is an illustration showing an example of each input signal and output signal in the frame rate calculating unit 2202 in above FIG. 22. FIG. 23A is an illustration showing an optimum frame rate, which is an output signal from the frame rate calculating unit 2202. FIG. 23B is an illustration showing a quantization step predictive value, which is one of input signals in the frame rate calculating unit 202. FIG. 23C is an illustration showing free area in the transmission buffer 108, which is another input signal in the frame rate calculating unit 202. To be precise, this free area is calculated by the free area calculating unit 2406 based on the inputted residual amount of data. A curve L1 in FIG. 23B shows that a quantization step predictive value changes with the passage of time, and a curve L2 in FIG. 23C shows time change of free area in the transmission buffer 108. As shown in FIG. 23B, the comparator 2401 outputs D1=0 while a quantization step predictive value is less than a threshold B, and outputs D1=1 if a quantization step predictive value exceeds a threshold B. In addition, the comparator 401 outputs D1=0 if a quantization step predictive value becomes less than a threshold B again. On the other hand, the comparator 2402 outputs D2=0 while free area in the transmission buffer 108 is less than a threshold C, and the comparator 2402 outputs D2=1 if free area exceeds a threshold C, as shown in FIG. 23C. Moreover, the comparator 2402 outputs D2=0 if free area is less than threshold C again.

Four types of frame rates are described in the frame rate table 2403 contained in the frame rate calculating unit 2202 corresponding to the following four combinations of values: a value of an output D1 from the comparator 2401 "0" or "1", and a value of an output D2 from the comparator 2402 "0" or "1". The frame rate calculating unit 2202 outputs 20 Hz as an optimum frame rate during D1=0 (a quantization step predictive value is small) and D2=0 (free area is small), as shown in FIG. 23A. On the other hand, when only a quantization step predictive value indicated by a curve L1 exceeds a threshold B, that is, while D1=1 (a quantization step predictive value is large) and D2=0 (free area is small), the frame rate calculating unit 2202 outputs 15 Hz as an optimum frame rate. Next, if both a quantization step predictive value and free area exceed a threshold, that is, while D1=1 (a quantization step predictive value is large) and D2=1 (free area is small), the frame rate calculating unit 2202 outputs 20 Hz as an optimum frame rate in order to control a quantization step to be small. In addition, if only a quantization step predictive value is less than a threshold, that is, while D1=0 (a quantization step predictive value is small) and D2=1 (free area is large), the frame rate calculating unit 202 outputs 30 Hz as an optimum frame rate. Thus, the frame rate calculating unit 202 gradually increases and decreases a frame rate corresponding to a quantization step predictive value and free area in the transmission buffer 108 respectively (here are four steps).

Figure 24A:
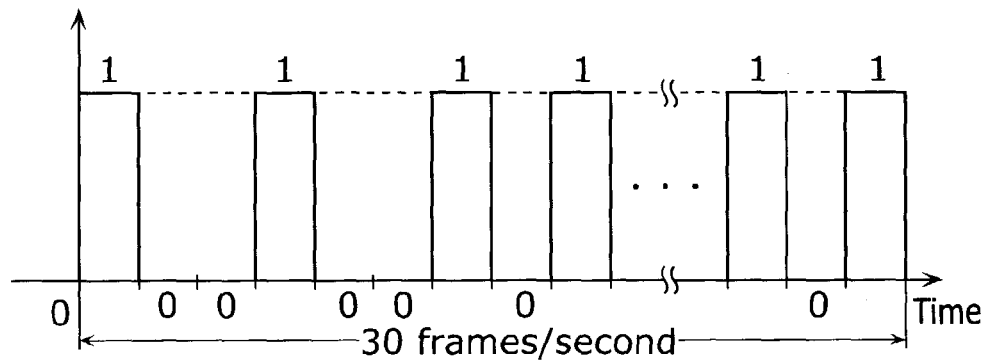
FIG. 24 is an illustration to show an operation of a frame number calculating unit in FIG. 20.
Figure 24B:
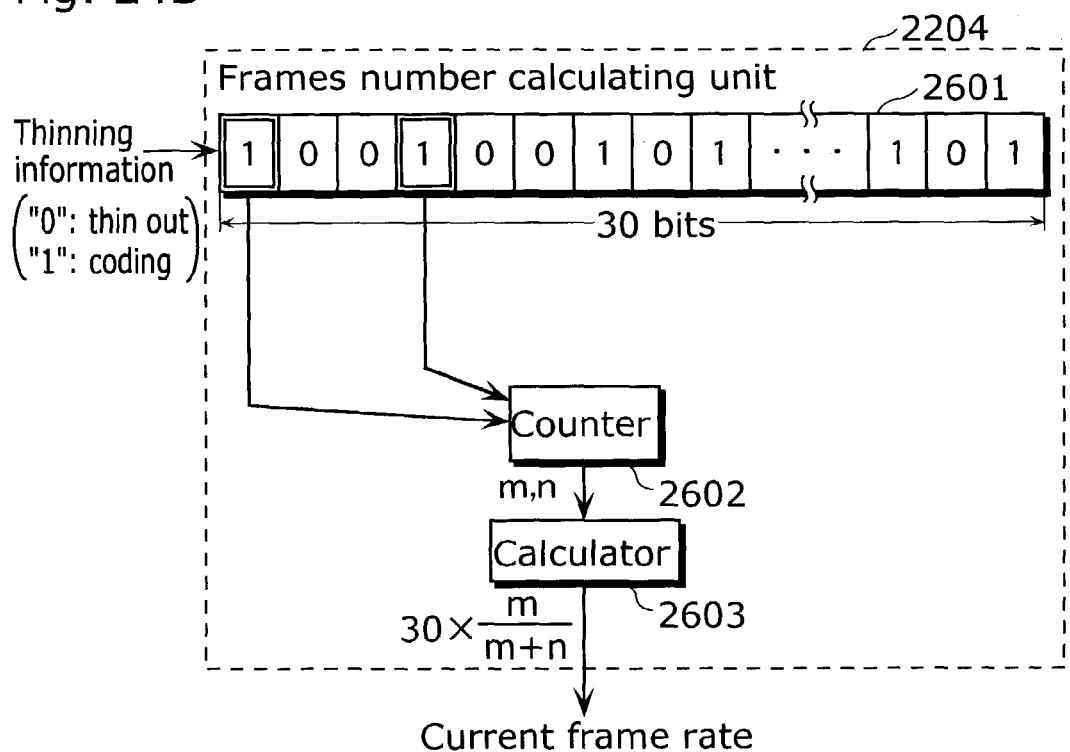

FIG. 24 is an illustration to show an operation of the frame number calculating unit 204 shown in above FIG. 20. FIG. 24A is an illustration showing an example of thinning information outputted from the comparator 2205. FIG. 24B is a block diagram showing detailed configuration of the frames number calculating unit 2204. As shown in FIG. 24A, the frames number calculating unit 2204 is inputted with thinning information outputted from the comparator 2205 at 30 Hz. This thinning information is binary signal of "0" or "1". Thinning information "0" indicates that the relevant frame is thinned out, and thinning information "1" indicates that the relevant frame is coded. The frame numbers calculating unit 2204 shown in FIG. 24B is a process unit or a circuit which calculates the current frame rate based on thinning information outputted from the comparator 2205, and outputs the calculation result at predetermined cycle (5 Hz, for instance). The frame numbers calculating unit includes a thinning information memory 2601, a counter 2602, and a calculator 2603. The thinning information memory 2601 is a memory unit, which is a FIFO (first_in first_out), and stores thinning information of 1 bit inputted at 30 Hz for the last 30 frames from current frame. The counter 2602 counts the number of frames m of which most recent thinning information in the thinning information memory is "1" at a predetermined cycle (5 Hz, for instance) and the number of frame n of which thinning information is "0", and resets values of m and n at next cycle (after ⅕ second, for instance). The calculator 2603 calculates "m/(m+n)" at the above predetermined cycle, and outputs the calculation result as a current frame rate. This enables the frame numbers calculating unit 2204 to calculate more adequate quantization step per 0.2 second when the frame numbers calculating unit 2204 calculates and outputs current frame rate 5 times per second, for example.

The comparator 2205 in the frame rate control unit 2113 compares the current frame rate calculated in the frame numbers calculating unit 2204 with an optimum frame rate calculated in the frame rate calculating unit 2202, and outputs "1" indicating an order to code as thinning information if the optimum frame rate is greater than the current frame rate. On the other hand, if an optimum frame rate is less than the current frame rate "0" indicating an order to thin out is outputted as thinning information. As a result, a frame rate of a coded frame is equal to an optimum frame rate calculated in the frame rate calculating unit 2202. In other words, the picture coding apparatus 2100 according to the second embodiment controls a quantization step depending on free area in the transmission buffer 108. Therefore, when the picture coding apparatus 2100 according to the second embodiment controls a quantization step so as to lessen time change of free area in the transmission buffer 108, that is, when it performs coding by increasing and/or decreasing the frame rate gradually according to the quantization step predictive value and free area in the transmission buffer, quality of pictures can be prevented from suddenly degrading.

Figures 25A, 25B:
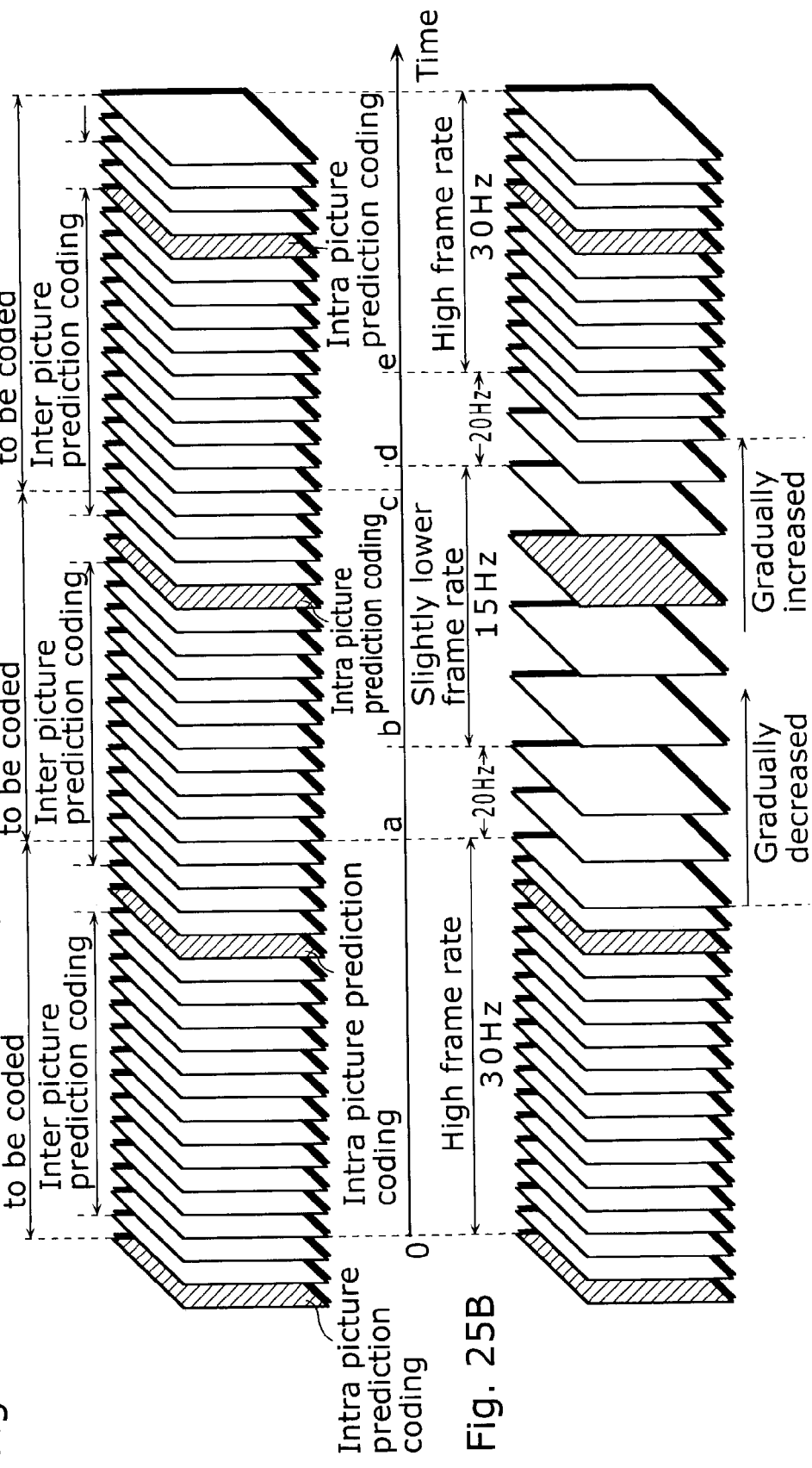
FIG. 25 is an illustration showing an input picture signal and a coded frame in a picture coding apparatus.

FIG. 25 is an illustration to indicate summary of an input picture signal and a coded frame in the picture coding apparatus 2100. FIG. 25A is an illustration showing each frame of a picture signal inputted to the picture coding apparatus 2100. As shown in FIG. 25A, a frame group 2604 comprises 2 frame sets for the picture coding apparatus 2100 as same as the case shown in FIG. 11 of the above-mentioned first embodiment, and the frame group 2604 is an unit when above quantization step and above mentioned quantization step and a frame rate are determined on this frame basis. FIG. 25B is an illustration showing each coded frame coded in the picture coding apparatus 2100.

As shown in FIG. 25A, picture signals inputted in the picture coding apparatus 2100 include scenes, some are easy to be coded and others are difficult to be coded, and the amount of generated bits in coded data for a scene which is easy to be coded is fewer. On the other hand, the amount of generated bits in coded data for a scene which is difficult to be coded is increased. For example, when a scene which is difficult to be coded is inputted to the picture coding apparatus 2100 at a time a, free area in the transmission buffer 108 becomes smaller since the amount of bits generated for coding the first frame of the scene which is difficult to be coded is large, and a quantization step predictive value is increased in the quantization step predicting unit 2201 in concordance with the free area. For example, a predicted quantization step predictive value is increased to 1.5 times as a quantization predictive value corresponding to an immediately preceding frame in a quantization step predicting unit 2201. Hence, the amount of bits generated for coding a next frame is decreased. As a result, the amount of bits generated for coding is not increased as the case coding using an initial quantization step, and free area in the transmission buffer 108 is not decreased rapidly. Therefore, a frame rate can be decreased gradually for the picture coding apparatus 2100 even when it is necessary to thin frames out substantially and continuously for the conventional technology.

If the residual amount of data in the above-mentioned transmission buffer 108 still falls and becomes below a threshold C, the frame rate calculating unit 202 changes an optimum frame rate to a frame rate at one step lower. For example, if coding is performed with a frame rate of 30 Hz till time a, the frame rate calculating unit 2202 changes an optimum frame rate to 20 Hz from a next frame. Thus, when free area in the transmission buffer is still small and a quantization step predictive value is further increased and exceeds a threshold B although a quantization step is increased and a frame rate is decreased, the frame rate calculating unit 2202 changes a next optimum frame rate to a one step lower rate. For example, if coding is performed at a frame rate of 20 Hz till time b, the frame rate calculating unit 2202 changes a next optimum frame rate to 15 Hz.

Thus, the picture coding apparatus 100 can decrease a frame rate more gently and gradually since it can calculate a quantization step predictive value in concordance with the amount of bits generated for coding and can reflect the quantization step predictive value in an optimum frame rate even when a scene which is difficult to be coded is inputted. On the other hand, for example, even if a scene which is difficult to be coded is shifted to a scene which is easy to be coded at time c, first, coding is performed with best-possible picture quality by decreasing a quantization step, and if there is still room inside the transmission buffer (a scene is easy to be coded), a frame rate is changed to one step higher and a frame rate can be increased more gently and gradually. For example, although a scene which is easy to be coded is inputted at a time c and a quantization step is increased, if there is still room in the transmission buffer 108, a frame rate is changed to one step higher, 20 Hz, at a time d, and when a quantization step becomes small enough at a time e, a frame rate is changed to one more step higher, 30 Hz. Thus, a frame rate can be increased more gently. As a result, when a picture signal coded in the picture coding apparatus 100 is decoded in a decoding apparatus, a scene can be reproduced without rapid roughness and rapid awkwardness in a picture even the scene is difficult to be coded. On the other hand, even if a scene is shifted to other scene which is easy to be coded, light and shade of a picture does not become suddenly smooth and a motion does not become suddenly even, and it is possible to reproduce a higher definition picture without giving human eyes unnaturalness.

As described above, the picture coding apparatus 2100 according to the second embodiment can perform coding with higher quality of pictures than conventional technology, can curb sudden decline (a lot of frames are skipped without coding), and can perform coding with smoother motion than conventional technology, while maintaining a bit rate during a specified time period (1 second, for example) constant by coding with lower quantization step when there is enough room in a buffer.

For information, the frame rate calculating unit 2202 calculates an optimum frame rate using the residual amount of data in the transmission buffer 108 and a quantization step predictive value in the quantization step predicting unit 2201 according to the above-mentioned embodiment, however, the present invention is not limited to the above case and it may be calculated using one of those values. Moreover, it is described that the frame rate calculating unit 2202 calculates optimum frame rates at 4 steps, 30 Hz, 20 Hz, 15 Hz and 10 Hz, using the frame rate table 2403 shown in above-mentioned FIG. 22, however, optimum frame rates are not limited to these values, and there is no need to be 4 steps. Furthermore, there is no need to calculate an optimum frame rate using such a frame rate table, and an optimum frame rate may be calculated, for example, by doubling the current frame rate when the residual amount in the transmission buffer is greater than a threshold C, and an and halving the current frame rate when the residual amount in the transmission buffer is less than a threshold C. Also, an optimum frame rate may be calculated by setting another threshold D (C<D) and doubling a current optimum frame rate when the residual amount of free area in the transmission buffer is greater than the threshold C, and halving a current frame rate when the residual amount in the transmission buffer is less than the threshold D. This enables to prevent an optimum frame from changing according to slight change of the residual amount of data in the transmission buffer in the each proximity of the thresholds C and D. Moreover, an optimum frame rate may be calculated for change of a quantization step predictive value using the same calculation. In addition, optimum frame rates are not limited to values such as half of the current frame rate and double the current frame rate. Same applies to a following embodiment.

Besides, the case that the quantization step predicting unit 2201 calculates a quantization step predictive using the predictive coefficient table 2303 shown in above FIG. 21 is indicated in the above-mentioned embodiment, however, a quantization step predicting method according to this invention is not limited to this case, and it may be calculated using a predefined function. Furthermore, quantization predictive coefficients in the predictive coefficient table 2303 are not limited to values, "2", "1.5", "1.2", "1", "0.8", "0.5" and "0.4". Same applies to a following embodiment.

For information, the frames number calculating unit 2204 according to the second embodiment is set to include the thinning information memory 2601 to store thinning information for the past 1 second (that is, for 30 frames), however, the present invention is not limited to this. Also, a calculation method for the current frame rate is not limited to the above calculation method and other method may be used. Same applies to a following embodiment.

Moreover, the residual amount of data in above transmission buffer may be replaced by an average bit rate. Same applies to a following embodiment.

Variations of the frame rate control units 2800, 3000 and 3400 in the above frame rate control unit 2113 are shown as follows. However, explanation for the same configurations as the above frame rate control unit 2113 is omitted and explanation for different points is given selectively in following variations.

Figure 26:
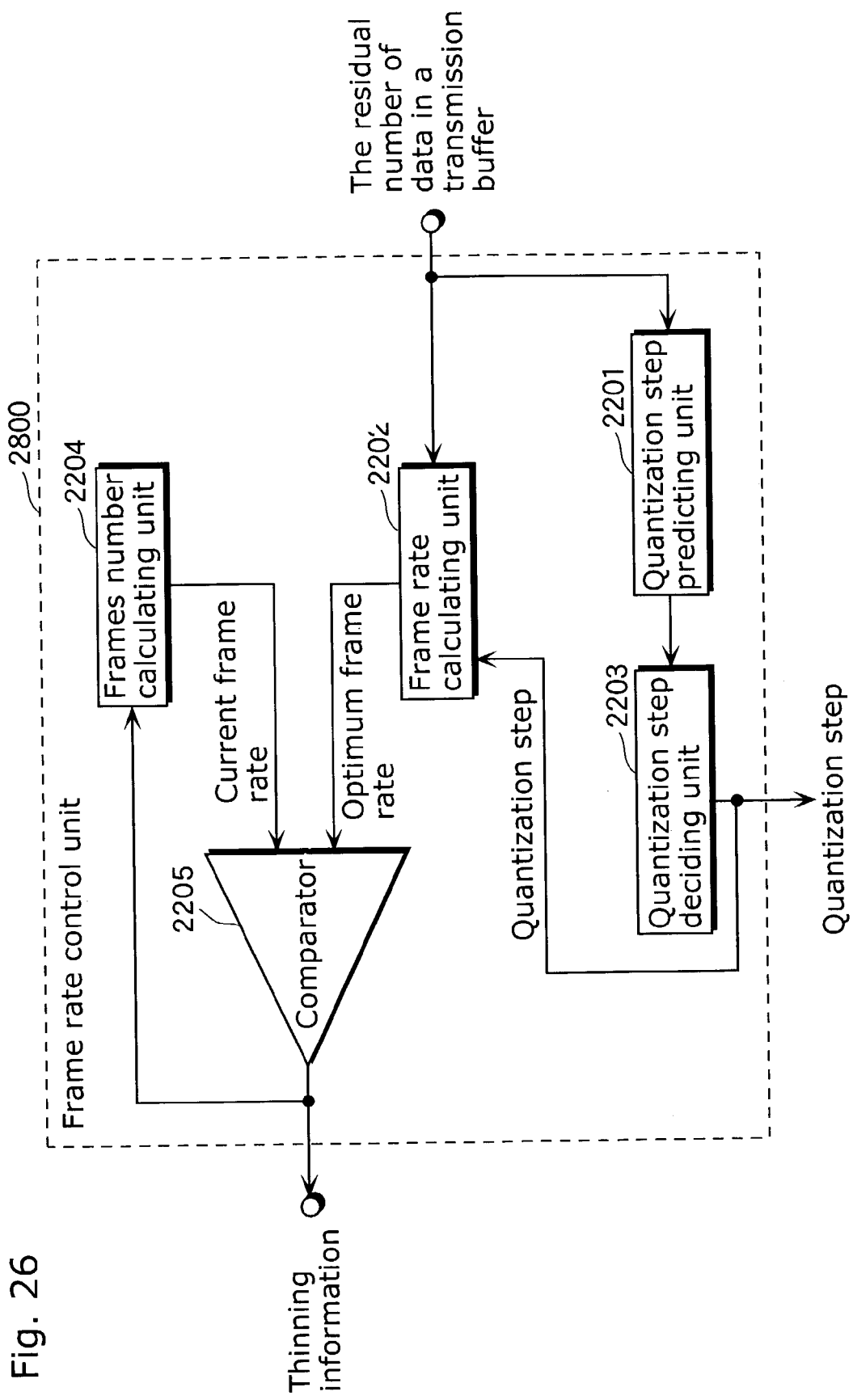
FIG. 26 is a block diagram showing a functional configuration of a frame rate control unit according to a variation.

FIG. 26 is a block diagram showing a functional configuration of the frame rate control unit 2800 according to a variation. The frame rate control unit 2800 is equipped with a quantization step predicting unit 2201, a quantization step deciding unit 2203, a frame rate calculating unit 2202, a frames number calculating unit 2204 and a comparator 2205. The difference between the frame rate control unit 2800 and the frame rate control unit 2113 shown in above FIG. 20 is that a quantization step decided in the quantization step deciding unit 2203 is inputted in the frame rate calculating unit 2202 instead of a quantization step predictive value in the quantization step predicting unit 2201.

Figure 27A:
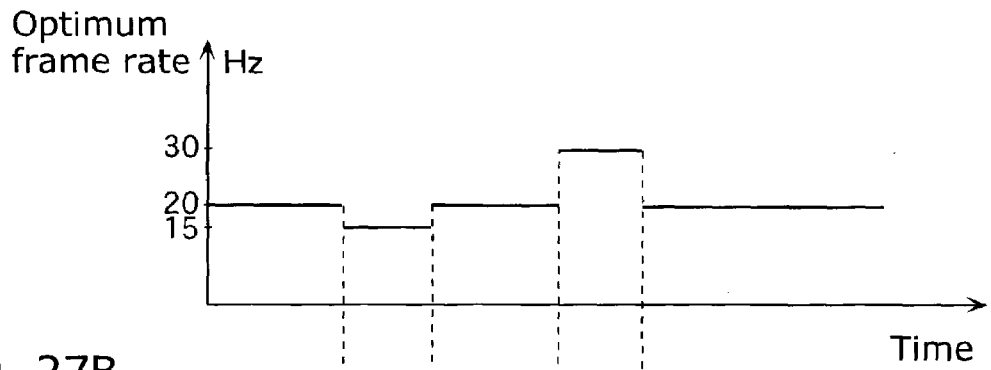
FIG. 27 is an illustration showing each input signal and output signal in the frame rate calculating unit in FIG. 26.
Figure 27B:
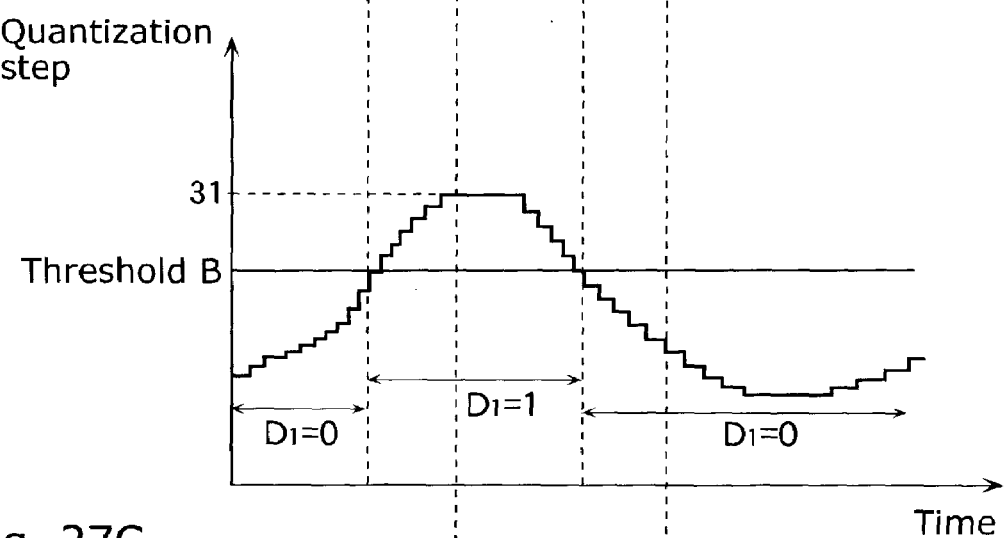
Figure 27C:
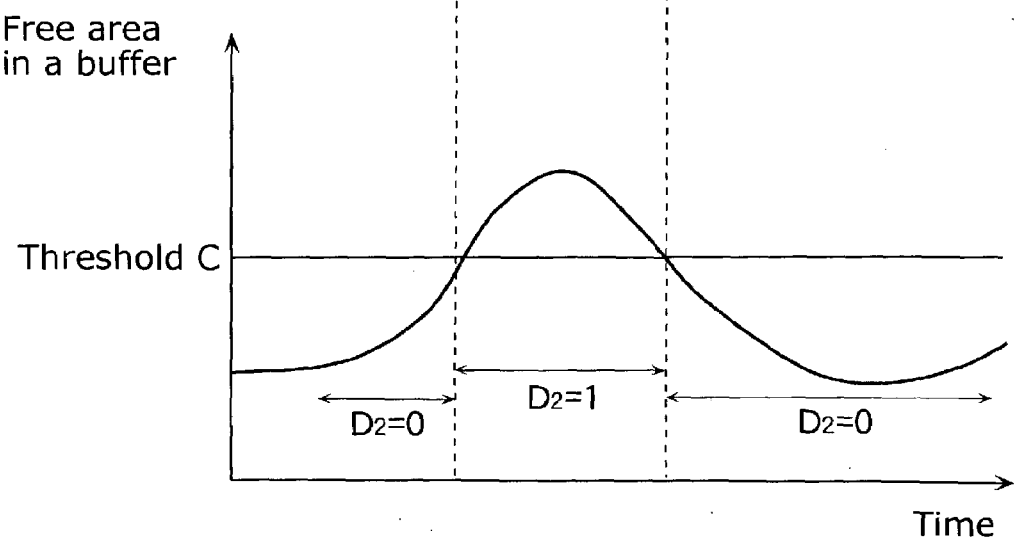

FIG. 27 is FIG. 27 is an illustration showing an example of each input signal and output signal in the frame rate calculating unit 2202 in above FIG. 26. FIG. 27A is an illustration showing an optimum frame rate which is an output signal from the frame rate calculating unit 2202. FIG. 27B is an illustration showing a quantization step which is one of input signals in the frame rate calculating unit 2202. FIG. 27C is an illustration showing free area in the transmission buffer 108, which is another input signal in the frame rate calculating unit 2202. The quantization step deciding unit 2203 decides an integral value between "1" and "31" based on a quantization step predictive value calculated in the quantization step predicting unit 2201, and outputs the decided value as a quantization step. Therefore, a quantization step inputted in the frame rate control unit 2800 is different from a quantization step predictive value, and is "31" at the maximum, as shown in FIG. 27B.

Thus, the frame rate calculating unit 2202 can calculate an optimum frame rate without significant deviation from the amount of bits generated from actual coding by calculating an optimum frame rate based on a quantization step, which is an output from the quantization step deciding unit 2203, instead of a quantization step predictive value.

Figure 28:
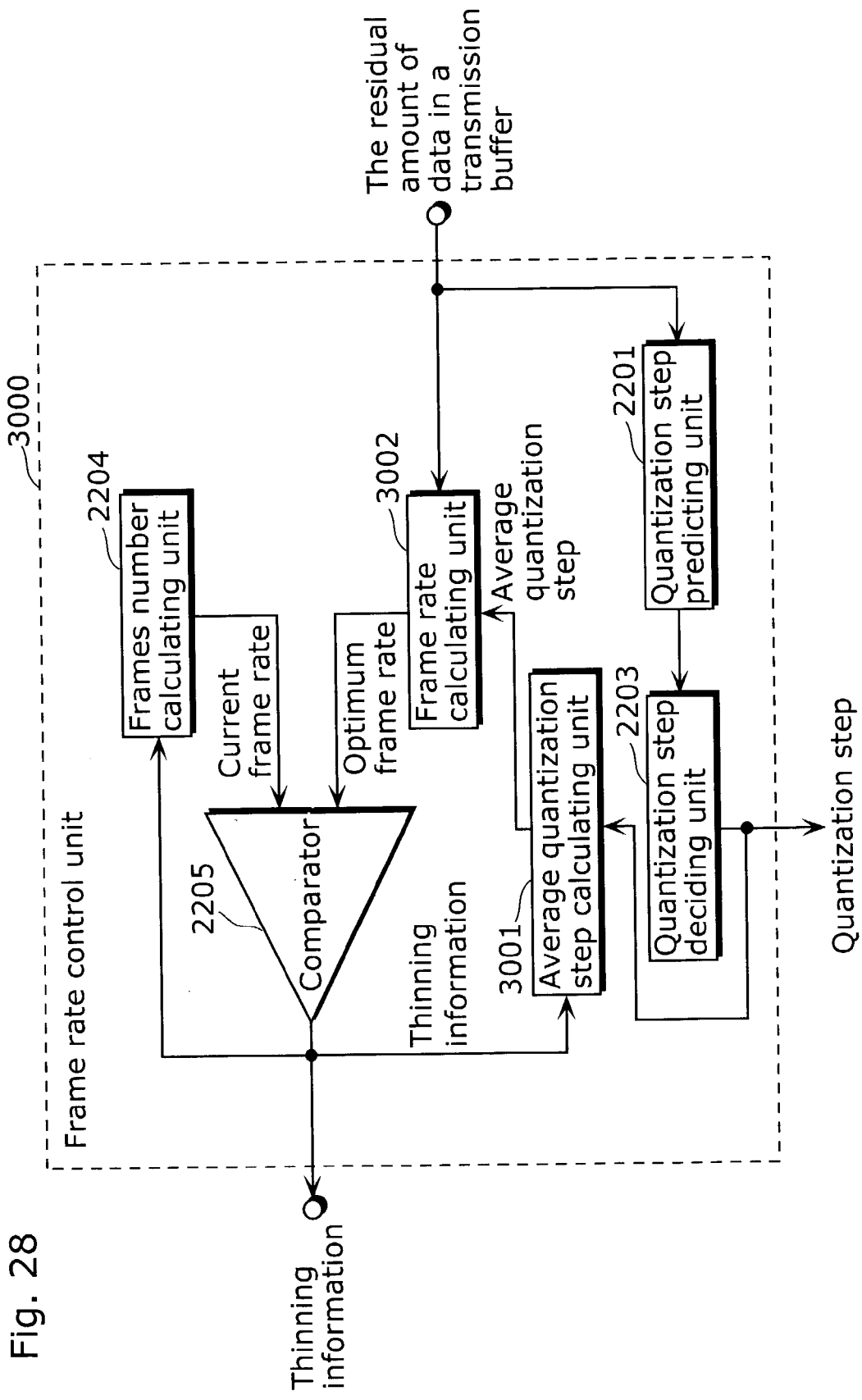
FIG. 28 is a block diagram showing a functional configuration of the frame rate control unit according to a variation.

FIG. 28 is a block diagram showing a functional configuration of the frame rate control unit 3000 according to a variation. The frame rate control unit 3000 calculates an average quantization step of frames previously coded based on a quantization step obtained in the quantization step deciding unit 2203, and calculates an optimum frame rate in the frame rate calculating unit 2202 based on the resulting average quantization step, and includes a quantization step predicting unit 2201, a quantization step deciding unit 2203, an average quantization step calculating unit 3001, a frame rate calculating unit 3002, a frames number calculating unit 2204 and a comparator 2205. The average quantization step calculating unit 3001 calculates an average value of a quantization step used for coding within the past 1 second. The frame rate calculating unit 3002 calculates an optimum frame rate based on the average value of quantization steps calculated in the average quantization step calculating unit 3001 and free space in the transmission buffer 108.

Figure 29:
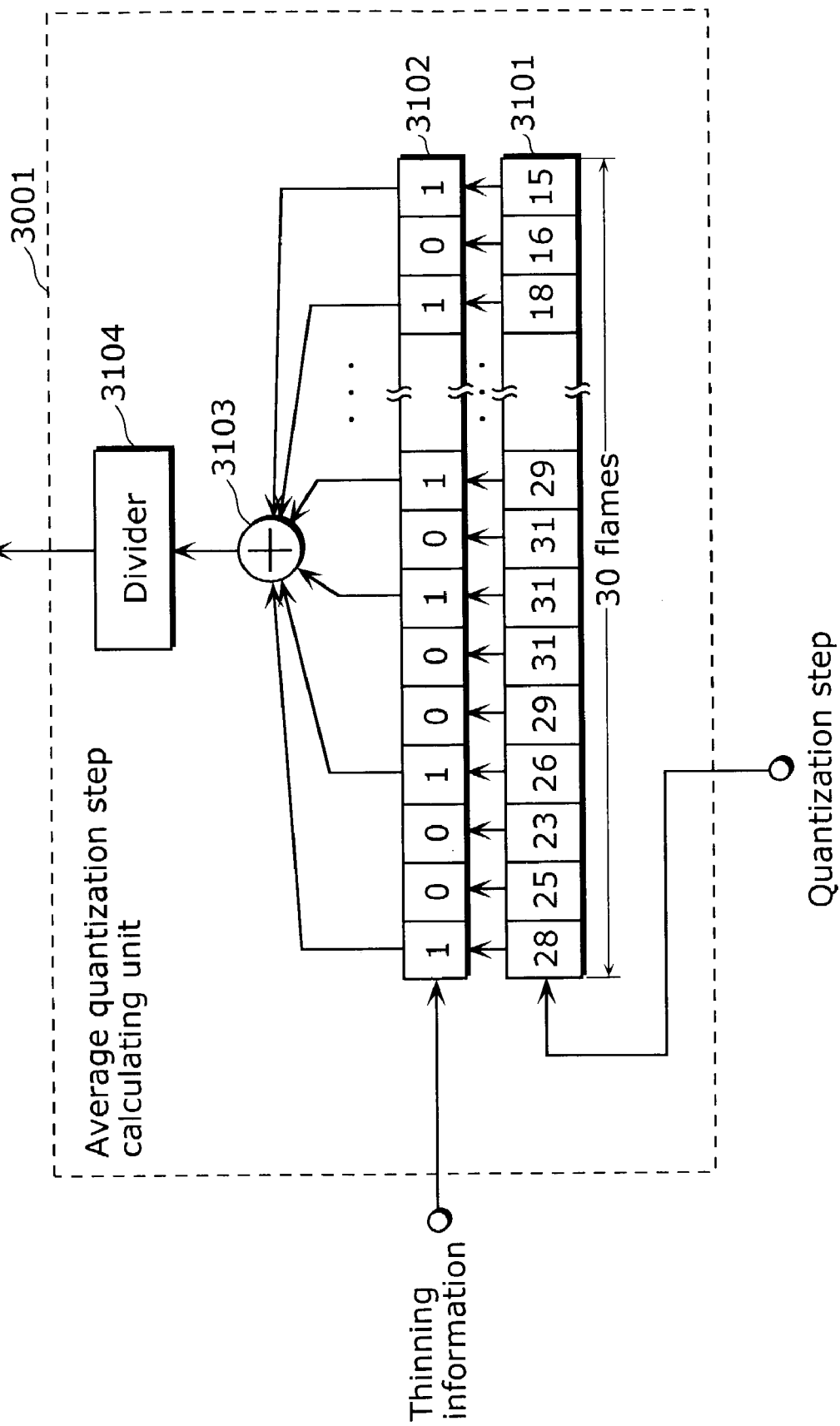
FIG. 29 is a block diagram showing a configuration of an average quantization step calculating unit in FIG. 28.

FIG. 29 is a block diagram showing a function of the average quantization step calculating unit 3001 in above-mentioned FIG. 28. The average quantization step calculating unit 3001 calculates an average of quantization steps for frames previously coded, and includes a quantization step memory 3101, a thinning information memory 3102, an adder 3103 and a divider 3104. The quantization step memory 3101 is a memory unit, which is a FIFO, and stores a quantization step, an output from the quantization step deciding unit 2203, for 30 frames within the last 1 second from the current frame. The thinning information memory 3102 is a memory unit, which is a FIFO, and stores thinning information outputted from the comparator 2205 corresponding to each frame (that is, for example, when there are 30 frames for 1 second, 30 bits in total) within the last 1 second from the current frame. The adder 3103 adds a multiplication result of thinning information corresponding to each frame and a quantization step (that is, sums quantization steps of all frames coded for last 1 second) and outputs it to the divider 3104. The divider 3104 calculates an average value of quantization steps by dividing a sum of quantization steps inputted from the adder 3103 by the number of frames coded for last 1 second.

Figure 30:
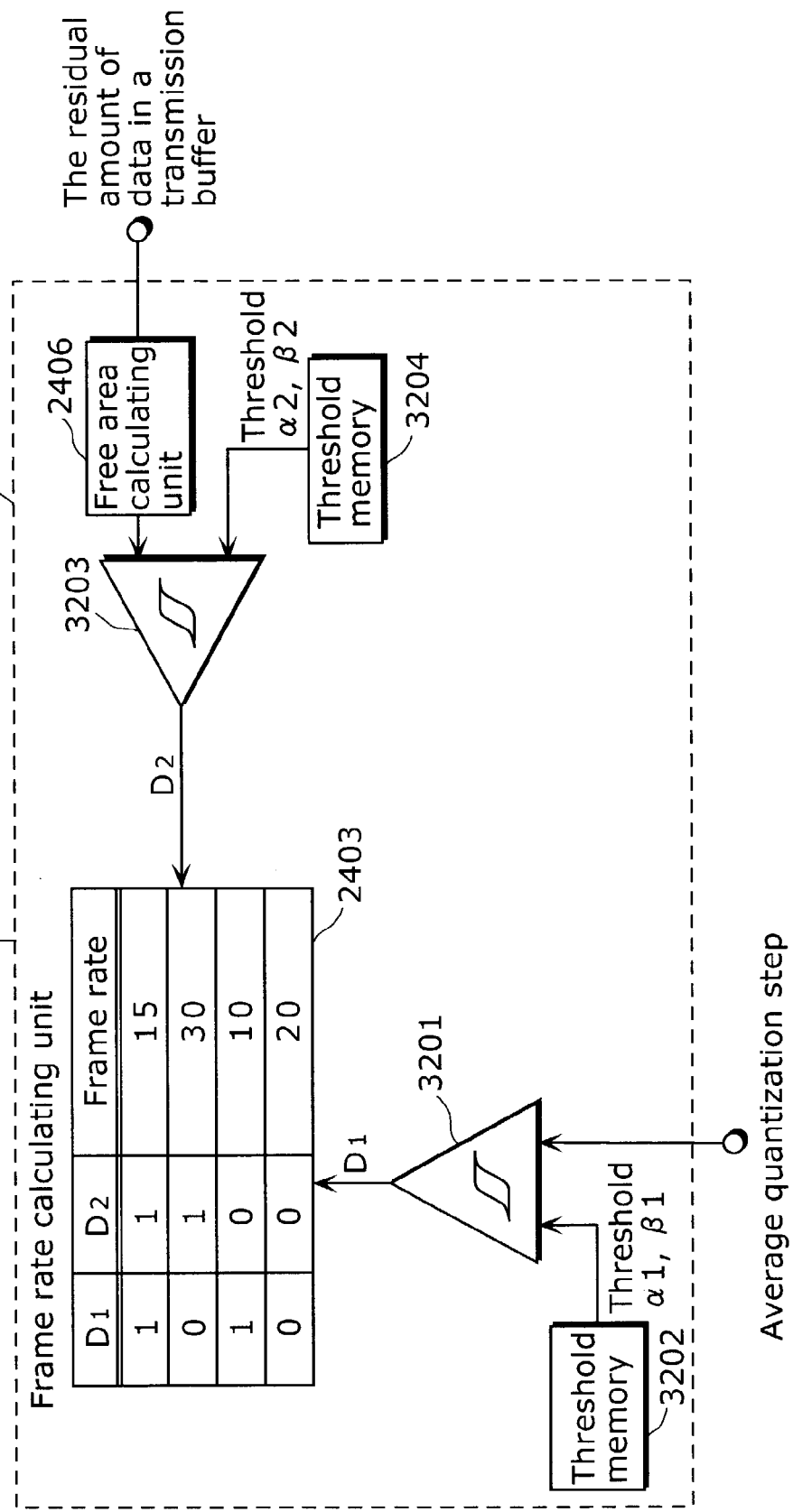
FIG. 30 is a block diagram showing a function of the frame rate calculating unit in FIG. 28.

FIG. 30 is a block diagram showing a function of the frame rate calculating unit 3002 in above-mentioned FIG. 28. The frame rate calculating unit 3002 contains the frame rate table 2403 shown in above-mentioned FIG. 22, and additionally contains a hysterisis comparator 3201, a threshold memory 3202, a hysterisis comparator 3203, a threshold memory 3204 and a free area calculating unit 2406. The hysterisis comparator 3201 is a comparator outputs D1=1 till an average quantization step is below a threshold $\beta 1$, and outputs D1=0 till an average quantization step exceeds a threshold $\alpha 1$ although an average quantization step exceeds a threshold $\beta 1$ after when thresholds $\alpha 1$ and $\beta 1$ ($\beta 1 < \alpha 1$) are inputted to one of input terminals and an average quantization step inputted to the another input terminal exceeds the threshold $\alpha 1$. The threshold memory 3202 is a latch circuit or a memory which stores a threshold $\alpha 1$ and a threshold $\beta 1$. The hysterisis comparator 3203 outputs D2=1 when thresholds $\alpha 2$ and $\beta 2$ ($\beta 2 < \alpha 2$) are inputted from the threshold memory 3204 to one of input terminals and free area in the transmission buffer 108, which is inputted to another input terminal, exceeds $\alpha 2$, and after that outputs D2=1 till free area in the transmission buffer 108 becomes less than $\beta 2$. The threshold memory 3204 is a latch circuit or a memory which stores thresholds $\alpha 2$ and $\beta 2$.

Figure 31A:
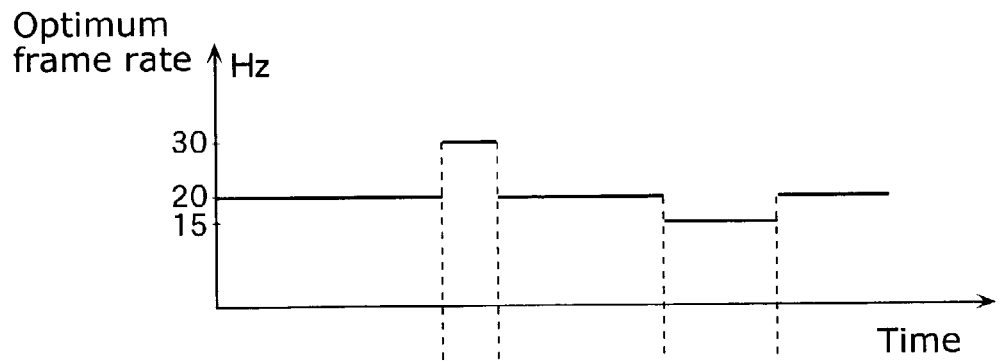
FIG. 31 is an illustration showing each input signal and output signal in the frame rate calculating unit in FIG. 28.
Figure 31B:
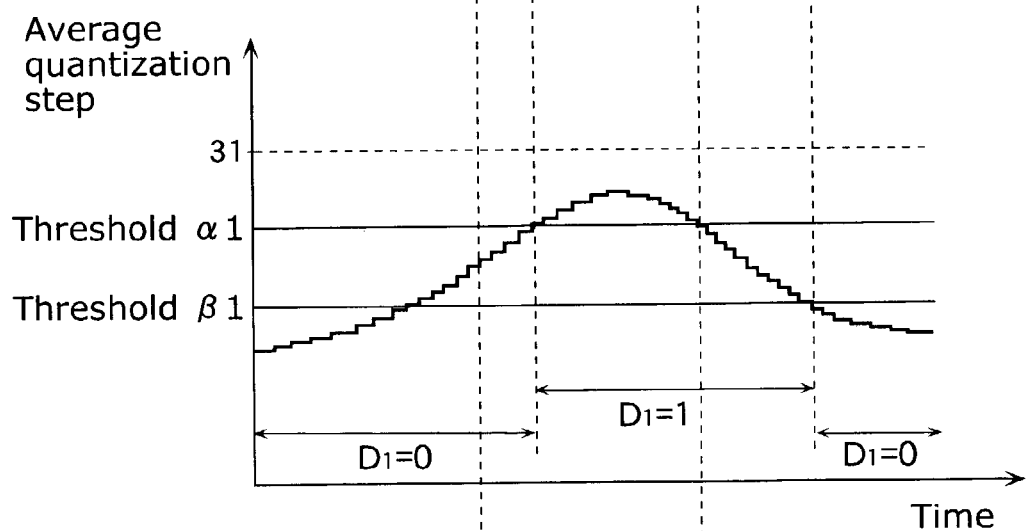
Figure 31C:
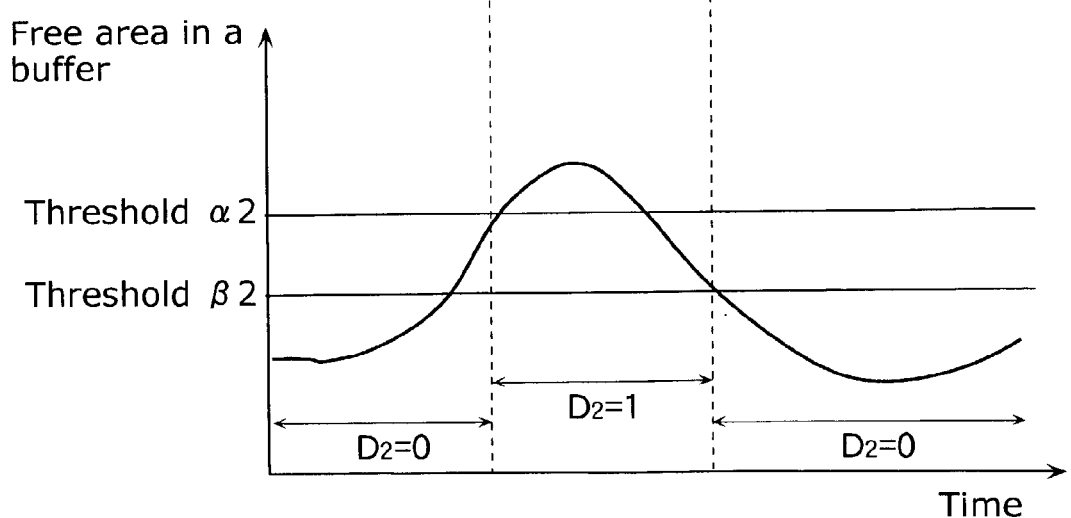

FIG. 31 is an illustration showing an example of each input signal and output signal in the frame rate calculating unit 3002 in above FIG. 28. FIG. 31A is an illustration showing an optimum frame rate, which is an output signal from the frame rate calculating unit 3002. FIG. 31B is an illustration showing a quantization step, which is one of input signals in the frame rate calculating unit 3002. FIG. 31C is an illustration showing free area in the transmission buffer 108, which is another input signal in the frame rate calculating unit 3002. As shown in FIG. 31B, a quantization step is a value between "1" and "31", however, it is not exclusively natural numbers as a quantization step in each frame, and rate of change is gradual and small. The method that the frame rate calculating unit 3002 calculates an optimum frame rate based on D1, an output from the hysterisis comparator 3201, and D2, an output from the hysteresis comparator 3202, is as explained before.

Thus, the frame rate control unit 3000 can prevent a frame rate from changing per frame by controlling a frame rate based on an average quantization step, an output from the average quantization step calculating unit 3001, instead of a quantization step predictive value when a value of a quantization step fluctuates in the proximity of thresholds.

For information, the above preferred embodiment shows an actual example of a calculation which averages quantization steps in frames coded for last 1 second, however, the present invention is not limited to this and quantization steps may be averaged for the last several seconds or last several to dozens of frames. Moreover, calculation may be evenly performed to average preceding quantization steps including frames which are not coded.

Figure 32:
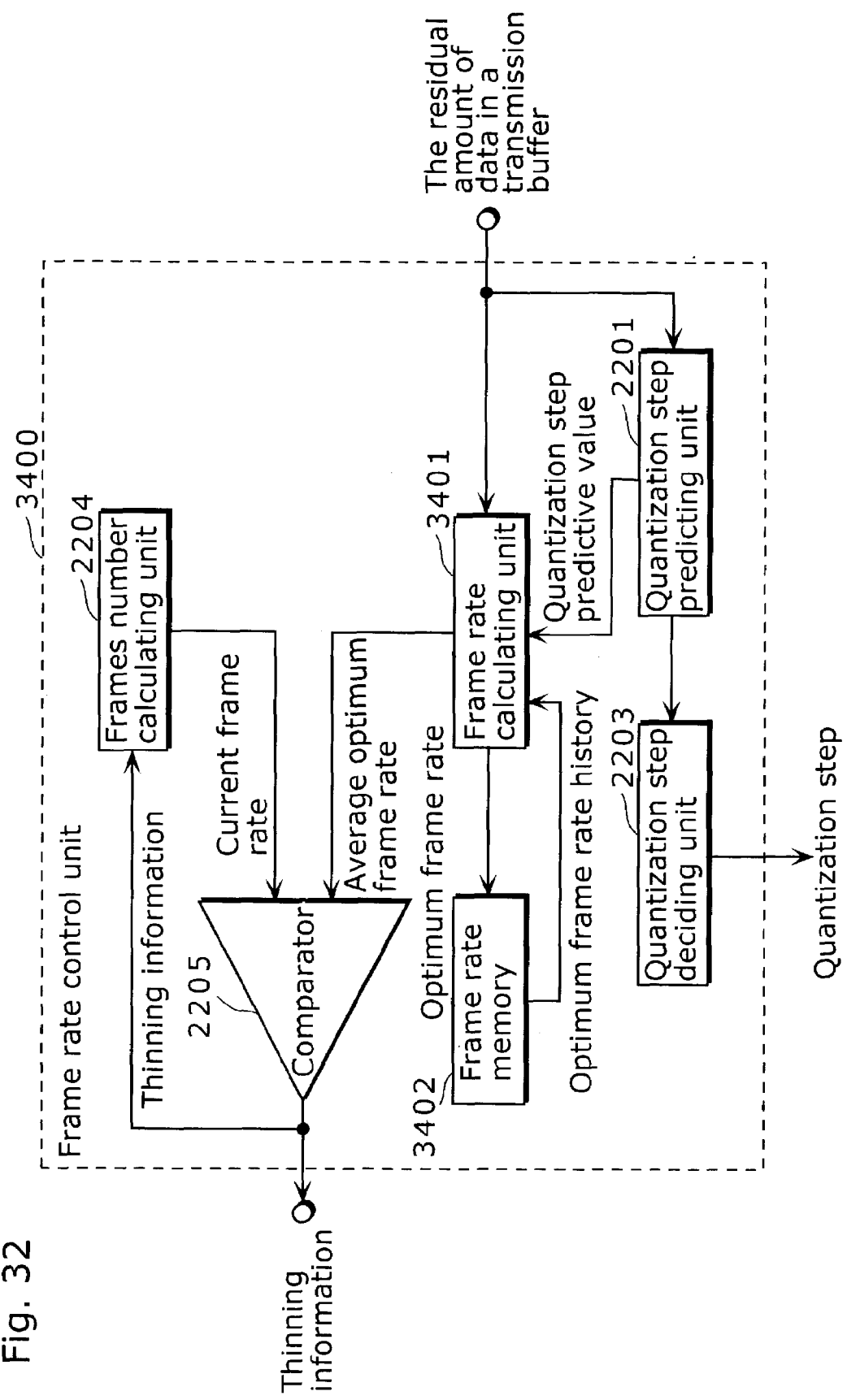
FIG. 32 is a block diagram showing a functional configuration of the frame rate control unit according to a variation.

FIG. 32 is a block diagram showing a functional configuration of the frame rate control unit 3400 according to a variation. The frame rate calculating unit 3401 in the frame rate control unit 3400 is equipped with a hysterisis comparator 3201 and a hysterisis comparator 3203 instead of the comparator 2401 and the comparator 2402, and calculates an optimum frame rate using same method as the frame rate calculating unit 202 according to the above embodiment 1, however, it additionally calculates an average of optimum frame rates calculated for the last 1 second and decides the calculated average frame rate as an optimum frame rate. The frame rate control unit 3400 includes a quantization step predicting unit 2201, a quantization step deciding unit 2203, a frame rate calculating unit 3401, a frame rate memory 3402, a frame rate number calculating unit 2204 and a comparator 2205. The frame rate calculating unit 3401 inputs D1, an output from the hysterisis comparator 3201, and D2, an output from the hysterisis comparator 3203, and calculates an optimum frame rate according to rule of a frame rate table 2403 (a truth value table). In addition, the frame rate calculating unit 3401 calculates an average value form a calculation result of preceding plural optimum frame rates.

The frame rate memory 3402 is a memory unit, which is a FIFO, and stores an optimum frame rate, the calculation result in the frame rate calculating unit 3401, for 30 frames within the last 1 second from the current frame.

Figure 33:
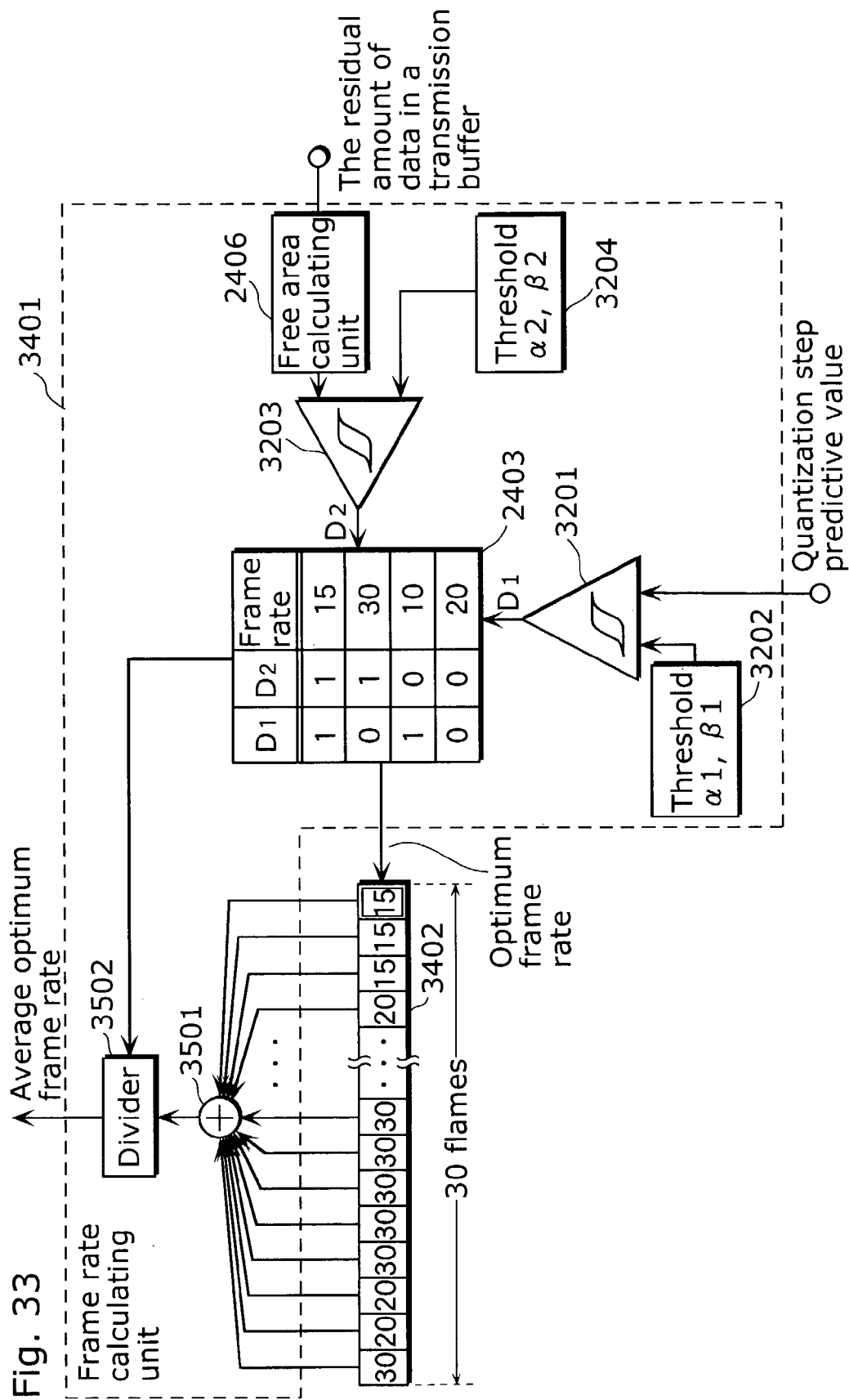
FIG. 33 is a block diagram to indicate functions of the frame rate calculating unit and the frame rate memory in FIG. 32.

FIG. 33 is a block diagram showing detailed configuration of the frame rate calculating unit 3401 and a frame rate memory 3402 in above-mentioned FIG. 32. The frame rate calculating unit 3401 contains the frame rate table 2403, and includes a hysterisis comparator 3201, a threshold memory 3202, a hysterisis comparator 3203, a threshold memory 3204, a free memory calculating unit 2406, an adder 3501 and a divider 3502. The frame rate calculating unit 3401 calculates an optimum frame rate according to the frame rate table 2403 based on an output D1 from the hysterisis comparator 3201, which is inputted with a quantization step predictive value from the quantization step predictive unit 2201, and an output D2 from the hysterisis comparator 3203, which is inputted with the residual amount of data in the transmission buffer 108, per frame of inputted picture signal, and outputs the calculated optimum frame rate at 30 Hz to the frame rate memory 3402. The adder 3501 adds each optimum frame rate in the frame rate memory 3402. The divider 3502 divides the value outputted from the adder 3501 by "30", and decides and outputs a frame rate which is the closest of optimum frame rates of 4 steps to the division result as an average optimum frame rate. This enables smoother control of frame rate in coding since an average optimum frame rate always changes sequentially through frame rates in between, like 30 Hz ->20 Hz ->15 Hz ->10 Hz.

Figure 34A:
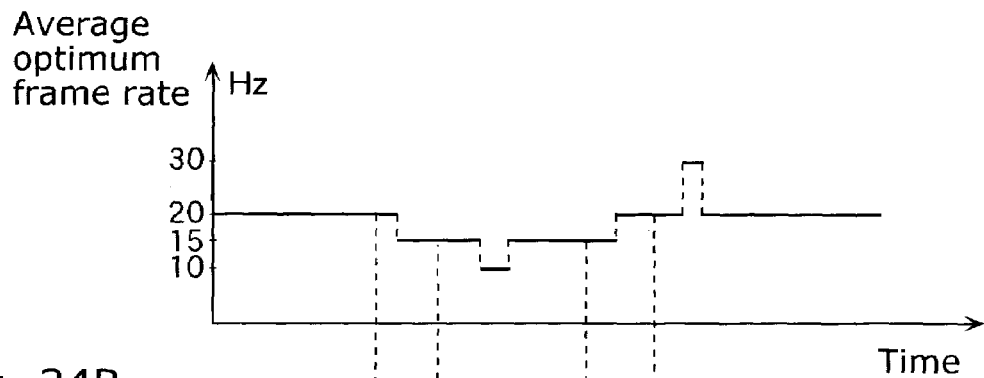
FIG. 34 is an illustration showing each input signal and output signal in the frame rate calculating unit in FIG. 32.
Figure 34B:
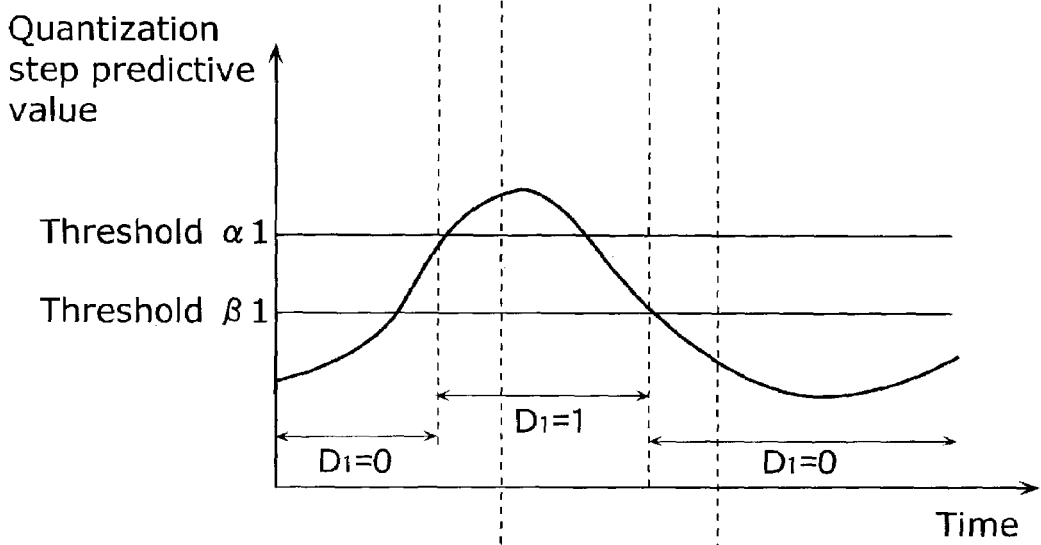
Figure 34C:
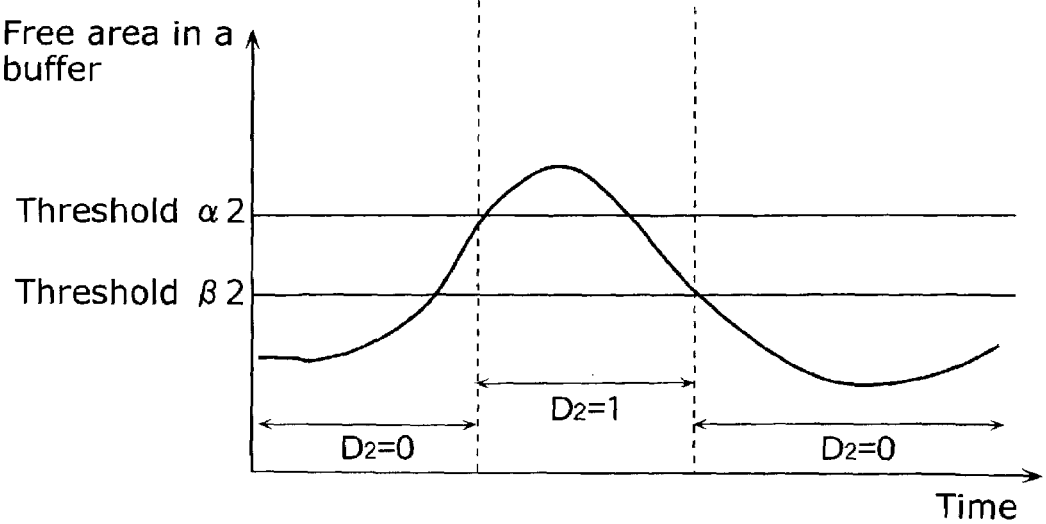

FIG. 34 is an illustration showing an example of each input signal and output signal in the frame rate calculating unit 3401 in above-mentioned FIG. 32. FIG. 34A is an illustration showing an average optimum frame rate which is an output signal from the frame rate calculating unit 3401. FIG. 34B is an illustration showing a quantization step predictive value, which is one of input signals in the frame rate calculating unit 3401. FIG. 34C is an illustration showing free area in the transmission buffer 108, which is another input signal in the frame rate calculating unit 3401. As shown in FIG. 34A, big change in a frame rate is controlled since an average optimum frame rate is averaged for 30 frames within the last 1 second from the current frame, and the closest value of an optimum frame rate to the average value is selected, and thus the coded result with smoother motion can be obtained.

For information, it is explained that the frame rate calculating unit 3401 calculates an average value of optimum frame rates is for 30 frames of preceding 1 second, however, the present invention is not limited to this, and the range of an optimum frame rate to be averaged may be for any seconds or any frames.

(Third Embodiment)

Figure 35:
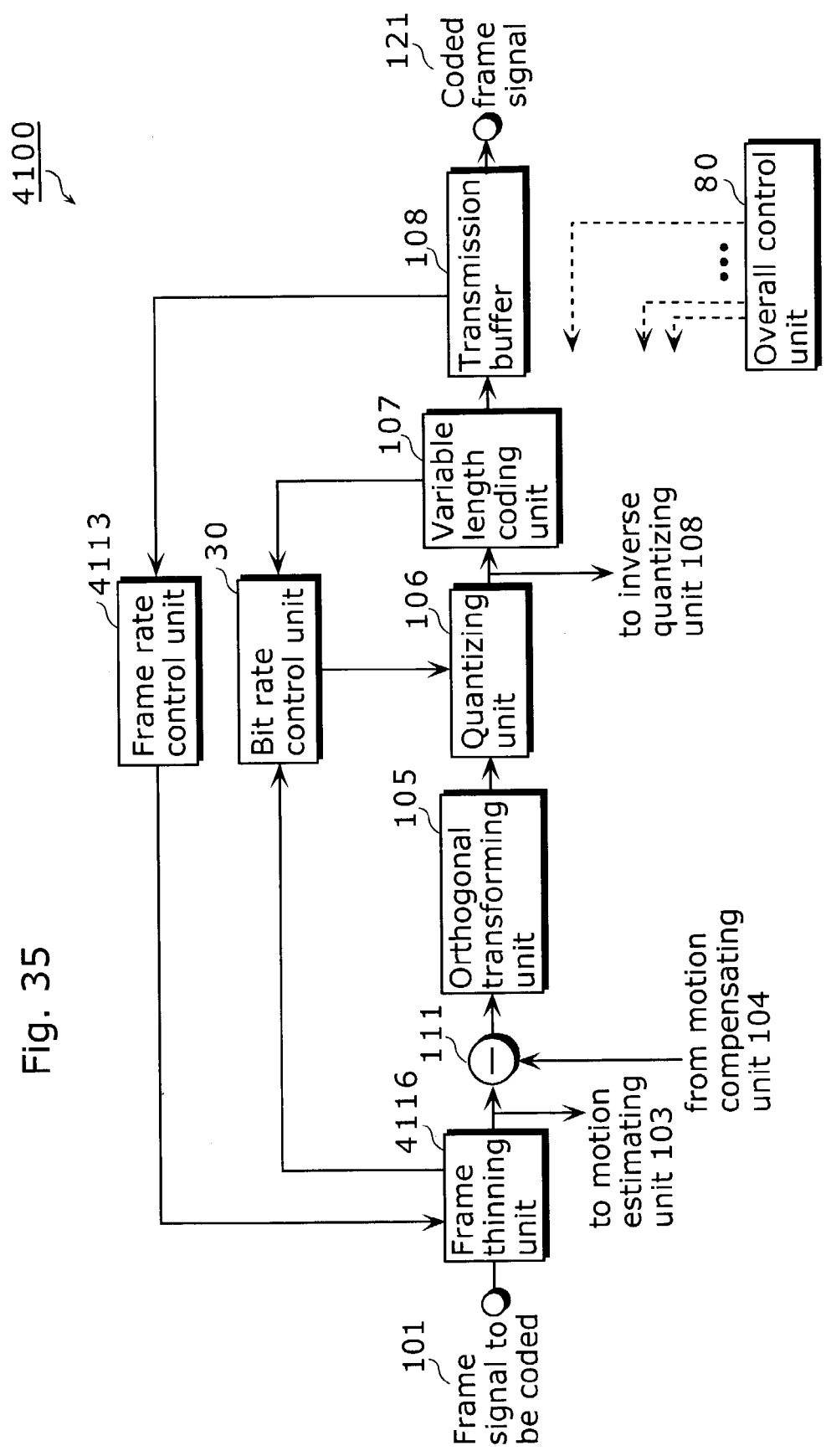
FIG. 35 is a block diagram showing a functional configuration of the picture coding apparatus according to the third embodiment.

FIG. 35 is a block diagram showing a functional configuration of a picture coding apparatus 4100 according the third embodiment. The picture coding apparatus 4100 actualizes more adequate coding using the variable bit rate method in the picture coding apparatus 10 according to the above-mentioned first embodiment and the variable frame rate method in the picture coding apparatus 2100 according to above-mentioned second embodiment.

As shown in FIG. 35, the picture coding apparatus 4100 has the same functional configuration as the picture coding apparatus 10 according to the above-mentioned first embodiment except for the transmission buffer 108, the frame rate control unit 4113, and the frame thinning unit 4116. In this connection, the same reference numbers are allocated and explanation is omitted for the same functional configuration as in the above-mentioned first embodiment or the second embodiment.

The frame rate control unit 4113 has only a function to generate thinning information of functions contained in the frame rate control unit 2113 of the picture coding apparatus 2100 according to the above-mentioned second embodiment.

The frame thinning unit 4116 receives thinning information from the frame rate control unit 4113, decides a frame rate, and informs the frame rate value at the point of decision to the bit rate control unit 30.

FIG. 36 is a block diagram showing a detailed functional configuration of the frame rate control unit 4113 in above-mentioned FIG. 35. As shown in FIG. 36, the configuration of the frame rate control unit 4113 is same as the configuration of the frame rate control unit 2113 according to the above-mentioned second embodiment (refer to the above-mentioned FIG. 20) except that the frame rate control unit 4113 does not include the quantization step predicting unit 2201 and the quantization step deciding unit 2202. Therefore, the frame rate control unit 4113 generates only thinning information based on the residual amount of data obtained from the transmission buffer 108, and transmits the thinning information to the frame thinning unit 4116.

Hence, the frame rate control unit 4100 according to the third embodiment can control a frame rate based on the residual amount in the transmission buffer, and can perform more preferred bit allocation based on the frame rate and the total number of bits allocated to a frame group.

(Fourth Embodiment)

In a following embodiment, methods to actualize the configuration of the picture coding apparatus according to the above-mentioned first, second and third embodiments as a step of picture coding program, and to implements equal functions to the above-mentioned picture coding apparatus as on a general computer system will be explained.

FIG. 37 is an illustration to explain a case that equal functions to the picture coding apparatus according to the above-mentioned first through third embodiments are actualized on a general computer system.

Figure 37A:
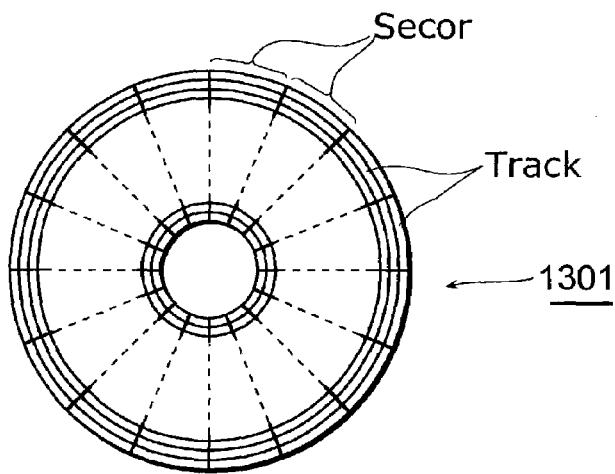
FIG. 37 is an illustration to indicate a storage medium which can store a program to perform the picture coding apparatus according to the first through third embodiments using a general computer system.
Figure 37B:
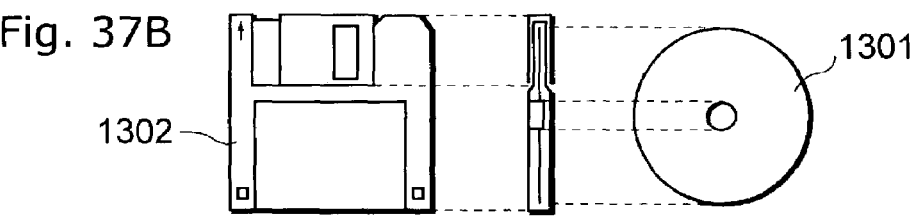

FIG. 37B shows an external view of the flexible disk viewed from the front, a sectional view of the configuration of the disk and the flexible disk, and FIG. 37A shows an example of physical format of the flexible disk, which is a body of a storage media.

A flexible disk 1301 is included in a case 1302, and multiple tracks are formed concentrically from outer to inner radius on the surface of the disk, and each track is divided into 16 sectors in angular orientation. Therefore, data, which is a picture coding program mentioned above, is stored in an allocated area on the above-mentioned flexible disk 1301 for the flexible disk storing the above-mentioned picture coding program.

Figure 37C:
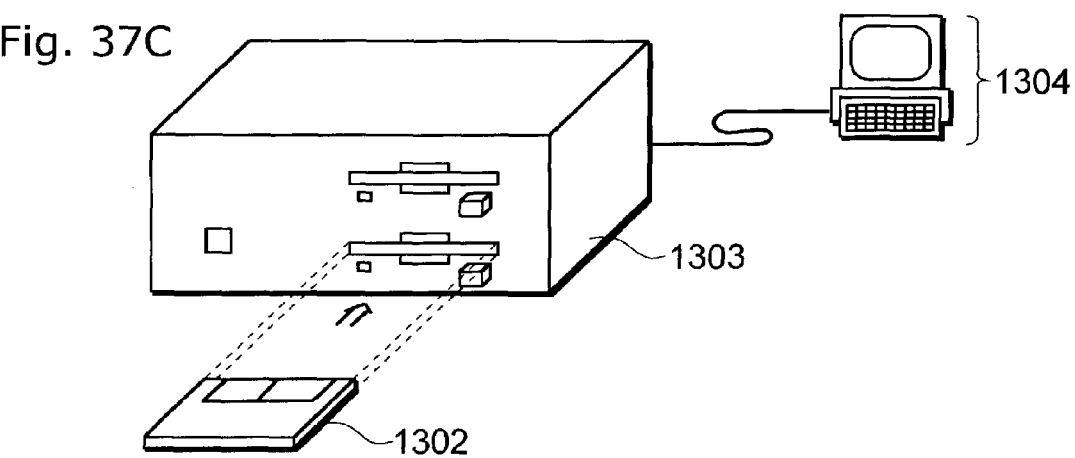

Moreover, FIG. 37C shows a configuration of a device to store and play the above described picture coding program on the flexible disk 1301. When above-mentioned picture coding program is stored on the flexible disk 1301, the data of the picture coding program is stored through a flexible disk drive 1303 from a computer system 1304. And when above coding or decoding device is established in a computer system using the program on the flexible disk 1301, the program is loaded from the flexible disk drive 1303 and forwarded to the computer system 1304.

For information, the explanation is given using a flexible disk as a data storage media, however, it is possible to actualize the above picture coding apparatus using media, which can store a program, such as an optical memory disk, an IC card and ROM cassette.

What is claimed is:

1. A picture coding apparatus for coding a picture signal inputted sequentially on a frame-by-frame basis, the picture coding apparatus comprising:
    a frame rate receiving unit operable to receive frame rate information indicating a cycle of the coding;
    a total bits number specifying unit operable to specify the total number of bits allocatable to a frame group including a plurality of frames;
    a frames number specifying unit operable to specify, based on the received frame rate information and the number of frames which are already coded, the number of frames which are not coded in the frame group;
    a target bits number calculating unit operable to calculate, based on the specified total number of bits and the specified number of frames, the target number of bits to be allocated to a frame to be coded next;
    a quantization step calculating unit operable to calculate, using the calculated target number of bits, a quantization step for the frame to be coded next; and
    a coding unit operable to perform quantization based on the calculated quantization step and to perform coding based on the quantization.

2. The picture coding apparatus according to claim 1, further comprising:
    an average value calculating unit operable to calculate an average number of bits definitely allocated for coding one of the frames of the frame group; and
    a computing unit operable to perform predetermined computing for the calculated target number of bits and the average number of the bits, and to specify a new target number of bits,
    wherein the quantization step calculating unit calculates the quantization step using the target number of bits specified by the computing unit.

3. The picture coding apparatus according to claim 2,
    wherein when the first frame of the frame group is a predetermined frame,
    wherein the total bits number specifying unit includes;
    a total bits number initializing unit operable to initialize the number of bits allocatable; and
    a total bits number updating unit operable to update by subtracting the number of bits determined to be allocated by the immediately preceding coding from the number of bits allocatable.

4. The picture coding apparatus according to claim 3,
    wherein the frames number specifying unit includes;
    a subject period specifying unit operable to specify a period required for coding frames which are not yet coded in the frame group;
    a period updating unit operable to update by subtracting the period required for the coding based on the received frame rate information at every coding a frame in the frame group; and
    a frames number calculating unit operable to calculate the number of frames based on the updated period required for the coding and the received frame rate information.

5. The picture coding apparatus according to claim 4,
    wherein the target bits number calculating unit calculates the target number of bits by dividing the total number of bits updated by the total bits number updating unit by the specified number of frames.

6. The picture coding apparatus according to claim 5,
    wherein the target bits number calculating unit further calculates a new target number of bits by multiplying the calculated target number of bits by a predetermined coefficient.

7. The picture coding apparatus according to claim 5,
    wherein the computing unit compares the calculated target number of bits with the average number of bits, and specifies a greater one of the calculated target number of bits and the average number of bits as the new target number of bits.

8. The picture coding apparatus according to claim 7,
    wherein the computing unit further compares a predetermined lower limit with the specified target number of bits and specifies a greater one of the predetermined lower limit and the specified target number of bits as the new target number of bits.

9. The picture coding apparatus according to claim 7,
    wherein the average value calculating unit further calculates a new average number of bits by multiplying the calculated average number of bits by a predetermined coefficient.

10. The picture coding apparatus according to claim 1,
    wherein the frame group includes a plurality of frame sets and forms a new frame group by adding sequentially a new frame set which is not yet coded after completing coding for a frame set,
    a frame included in the frame set is one of an I picture, a P picture, and a B picture in MPEG standard, and an order of respective pictures included in the frame set is same,
    the total bits number specifying unit further specifies the total number of bits allocatable to the new frame group and the number of bits allocatable in each frame set, every time an allocation of the number of bits is determined with coding the frame set in the frame group in consideration of a difference between the number of bits previously distributed to other frame set and the number of bits determined in the frame set,
    the frames number specifying unit further specifies, based on the received frame rate information and the number of frames which are already coded, the number of frames which are not yet coded in the other frame set, and
    the target bits number calculating unit further calculates, based on the number of bits allocatable to the other frame set and the specified number of frames, the target number of bits to be allocated to a frame to be coded next.

11. The picture coding apparatus according to claim 1, wherein the first frame in the frame group is a frame to be intra-picture coded.

12. The picture coding apparatus according to claim 1, wherein the last frame in the frame group is a frame immediately preceding of a frame to be intra-picture coded.

13. The picture coding apparatus according to claim 1, wherein the first frame in the frame group is a frame to be intra-picture coded, and a last frame in the frame group is a frame immediately preceding of a frame to be intra-picture coded.

14. The picture coding apparatus according to claim 1, further comprising:
  a storing unit operable to store data which is already coded but not yet transmitted; and
  a frame rate calculating unit operable to calculate, based on the amount of the data stored in the storing unit, a frame rate for a frame to be coded next,
  wherein the frame rate receiving unit receives the calculated frame rate information.

15. A picture coding method for coding a picture signal inputted sequentially on a frame-by-frame basis, the picture coding method comprising:
  a frame rate receiving step for receiving a frame rate indicating a cycle of the coding;
  a total bits number specifying step for specifying the total number of bits allocatable to a frame group including a plurality of frames;
  a frames number specifying step for specifying, based on the received frame rate information and the number of frames which are is already coded, the number of frames which are not coded in the frame group;
  a target bits number calculating step for calculating, based on the specified total number of bits and the specified number of frames, the target number of bits to be allocated to a frame to be coded next;
  a quantization step calculating step for calculating, using the calculated target number of bits, a quantization step for the frame to be coded next; and
  a coding step for quantizing based on the calculated quantization step and coding based on the quantization.

16. The picture coding method according to claim 15, further comprising:
  an average value calculating step for calculating an average number of bits determined to be allocated for coding one of the frames of the frame group; and
  a computing step for performing a predefined calculation for the calculated target number of bits and the average number of the bits, and specifying a new target number of bits number,
  wherein in the quantization step calculating step, the quantization step is calculated using the target number of bits specified by the computing step.

17. A computer readable medium storing a computer program for a picture coding apparatus for coding a picture signal inputted sequentially on a frame-by-frame basis, the program comprising:
  a frame rate receiving step for receiving a frame rate indicating a cycle of the coding;
  a total bits number specifying step for specifying the total number of bits allocatable to a frame group including a plurality of frames;
  a frames number specifying step for specifying, based on the received frame rate information and the number of frames which are already coded, the number of frames which are not coded in the frame group;
  a target bits number calculating step for calculating, based on the specified total number of bits and the specified number of frames, the target number of bits to be allocated to a frame to be coded next;
  a quantization step calculating step for deriving, using the calculated target number of bits, a quantization step for the frame to be coded next; and
  a coding step for quantizing based on the calculated quantization step and coding based on the quantization.

18. The program according to claim 17, further comprising:
  an average value calculating step for calculating an average number of bits determined to be allocated for coding one of the frames of the frame group; and
  a computing step for performing predefined calculation for the calculated target number of bits and the average number of the bits, and specifying a new target number of bits,
  wherein in the quantization step calculating step, the quantization step is calculated using the target number of bits calculated by the computing step.

19. A computer readable recording medium storing a computer program for a picture coding apparatus for coding a picture signal inputted sequentially on a frame-by-frame basis,
  wherein the program comprises:
  a frame rate receiving step for receiving a frame rate indicating a cycle of the coding;
  a total bits number specifying step for specifying the total number of bits allocatable to a frame group including a plurality of frames;
  a frames number specifying step for specifying, based on the received frame rate information and the number of frames which are already coded, the number of frames which are not coded in the frame group;
  a target bits number calculating step for calculating, based on the specified total number of bits and the specified number of frames, the target number of bits to be allocated to a frame to be coded next;
  a quantization step calculating step for calculating, using the calculated target number of bits, a quantization step for the frame to be coded next; and
  a coding step for quantizing based on the calculated quantization step and coding based on the quantization.

20. A computer readable recording medium storing a computer program for a picture coding apparatus for coding a picture signal inputted sequentially on a frame-by-frame basis,
  wherein the program comprises:
  a frame rate receiving step for receiving a frame rate indicating a cycle of the coding;
  a total bits number specifying step for specifying the total number of bits allocatable to a frame group including a plurality of frames;
  a frames number specifying step for specifying, based on the received frame rate information and the number of frames which are already coded, the number of frames which are not coded in the frame group;
  a target bits number calculating step for calculating, based on the specified total number of bits and the specified number of frames, the target number of bits to be allocated to a frame to be coded next;

an average value calculating step for calculating an average number of bits determined to be allocated for coding one of the frames of the frame group; and a computing step for performing predefined calculation for the calculated target number of bits and the average number of the bits, and specifying a new target number of bits, a quantization step calculating step for deriving, using the specified target number of bits, a quantization step for the frame to be coded next; and a coding step for quantizing based on the calculated quantization step, and coding based on the quantization.

21. A picture coding apparatus for coding a picture signal inputted sequentially on a frame-by-frame basis, the picture coding apparatus comprising:

a coding unit operable to a quantize frequency component in the picture signal on the frame-by-frame basis, and to code based on the quantized result;

a quantization width calculating unit operable to calculate, based on the total number of bits allocatable to a frame group including a plurality of frames and the number of bits already allocated, a quantization width of a frame to be coded next; and a frame rate calculating unit operable to calculate, based on the calculated quantization width, a coding frame rate showing a coding cycle for a frame to be coded next; and an input control unit operable to control, based on the coding frame rate, selection of the inputted picture signal inputted to the coding unit, wherein the coding unit quantizes an inputted picture signal using the quantization width.

22. The picture coding apparatus according to claim 21, further comprising:

a transmission buffer operable to store data coded in the coding unit, and to output specific amount of the stored coded data to outside, and wherein the quantization width calculating unit calculates, based on the amount of data not outputted and remained in the transmission buffer, the quantization width.

23. The picture coding apparatus according to claim 22, wherein the quantization width calculating unit, when the amount of code generated from the coding exceeds a predetermined amount, widens the quantization width for a frame to be coded next.

24. The picture coding apparatus according to claim 23, wherein the quantization width calculating unit comprising:

a comparing subunit operable to compare size of the amount of the code generated from the coding with a predetermined threshold;

a multiplying subunit operable to multiple the quantization width calculated for an immediately preceding frame by a predetermined coefficient greater than 1 when the amount the generated data exceeds the threshold; and a quantization width deciding subunit operable to decide, assuming that the multiplied result is a predictive value of a quantization width, a value closest to the predictive value from a range of predetermined value as a quantization width for a frame to be coded next.

25. The picture coding apparatus according to claim 24, wherein the quantization width calculating unit further calculates a quantization width to reduce the quantization width when the amount of codes generated from the coding is less than a predetermined amount.

26. The picture coding apparatus according to claim 25, wherein the multiplying subunit further multiplies the quantization width calculated for an immediately preceding inputted frame by a predetermined coefficient 1 or less when the amount of generated codes is less than the threshold as a result of the comparison.

27. The picture coding apparatus according to claim 25, wherein the multiplying subunit further multiplies the quantization width calculated for an immediately preceding inputted frame by a predetermined coefficient greater than 1 when the amount of generated codes exceeds the threshold.

28. The picture coding apparatus according to claim 24, wherein the quantization width calculating method further comprises:

a coefficient table storing subunit operable to previously store a coefficient table in which a coefficient, which is set to widen the quantization width when the amount of codes generated from the coding becomes greater, is corresponded to the amount of generated codes; and a second multiplying subunit operable to multiply, based on the coefficient table, the quantization width calculated for a frame inputted immediately preceding by the coefficient corresponding to the amount of generated codes, and wherein the quantization step deciding subunit decides, assuming that the multiplied result in the second multiplying subunit is a predictive value, a quantization width for a frame to be coded next.

29. The picture coding apparatus according to claim 24, wherein the quantization width calculating method calculates a quantization width for a frame to be coded next by multiplying the quantization width used to quantize in a most recent frame by the coefficient.

30. The picture coding apparatus according to 24, wherein the frame rate calculating method increases a coding frame rate for a frame to be coded next when the predictive value of the quantization width exceeds a predetermined threshold.

31. The picture coding apparatus according to claim 30, wherein the frame rate calculating unit calculates a coding frame rate for a frame to be coded next by multiplying a current coding frame rate by the predetermined coefficient greater than 1 when the predictive value of the quantization width exceeds the threshold.

32. The picture coding apparatus according to claim 30, wherein the frame rate calculating unit further decreases the coding frame rate for a frame to be coded next when the predictive value of the quantization width is less than the threshold.

33. The picture coding apparatus according to claim 31, wherein the frame rate calculating unit further calculates the coding frame rate by multiplying the current coding frame rate by the predetermined coefficient less than 1 when the predictive value of the quantization width is less than the threshold.

34. The picture coding apparatus according to claim 24, wherein the frame rate calculating unit increases a coding frame rate for a frame to be coded next when the decided quantization width exceeds the predetermined threshold, and decreases a coding frame rate for a frame to be coded next when the decided quantization width is less than the threshold.

35. The picture coding apparatus according to claim 24,
wherein the frame rate calculating unit comprises a quantization width averaging subunit operable to average the decided quantization width,
wherein the rate calculating unit increases a coding frame rate for a frame to be coded next when the average value of the quantization width exceeds the predetermined threshold, and decreases a coding frame rate for a frame to be coded next when the average value of the quantization width is less than the threshold.

36. The picture coding apparatus according to claim 21, wherein the frame rate calculating unit further calculates a coding frame rate newly calculated by multiplying the calculated coding frame rate by the predetermined coefficient less than 1, when the amount of codes generated from the coding exceeds a predetermined threshold.

37. The picture coding apparatus according to claim 21, wherein the frame rate calculating unit further calculates the coding frame rate newly calculated by multiplying the calculated the coding frame rate by the predetermined coefficient greater than 1, when the amount of codes generated from the coding is less than a predetermined threshold.

38. The picture coding apparatus according to claim 21, wherein the input control unit further comprises a frame rate averaging subunit operable to calculates an average value of a coding frame rate calculated in the frame rate calculating unit,
wherein the input control unit controls, based on the average value calculated in the frame rate averaging subunit, selection of the picture signal to be inputted.

39. A computer readable medium storing a computer program for a picture coding apparatus for coding a picture signal inputted sequentially on a frame-by-frame basis, the program comprising:
a coding step for quantizing a frequency component in the picture signal on the frame-by-frame basis, and coding based on the quantized result;
a quantization width calculating step for calculating, based on the total number of bits allocatable to the frame group and the number of bits already allocated, a quantization width of a frame to be coded next;
a frame rate calculating step for calculating, based on the calculated quantization width, a coding frame rate showing a coding cycle for a frame to be coded next; and
an input control step for controlling, based on the coding frame rate, selection of the picture signal inputted to the coding unit,
wherein in the coding step, an inputted picture signal is quantized using the quantization width.

40. A memory medium operable to be read by a computer storing a computer program for a picture coding apparatus for coding a picture signal on a frame-by-frame basis,
wherein the program comprises:
a coding step for quantizing frequency component in the picture signal on the frame-by-frame basis, and coding, based on the quantized result;
a quantization width calculating step for calculating, based on the total number of bits allocatable to the frame group and the number of bits already allocated, a quantization width of a frame to be coded next;
a frame rate calculating step for calculating, based on the calculated quantization width, a coding frame rate showing a coding cycle for a frame to be coded next; and
an input control step for controlling, based on the coding frame rate, selection of the picture signal inputted to the coding unit,
wherein in the coding step, an inputted picture signal is quantized using the quantization width.

41. A picture coding method for coding a picture signal inputted on a frame-by-frame basis, the picture coding method comprising:
a coding step for quantizing frequency component in the picture signal on the frame-by-frame basis, and coding based on the quantized result;
a quantization width calculating step for calculating a quantization step, based on the total number of bits allocatable to the frame group and the number of bits already allocated, for a frame to be coded next;
a frame rate calculating step for calculating a coding frame rate showing a coding cycle, based on the calculated quantization width, for a frame to be coded next; and
an input control step for controlling, based on the coding frame rate, selection of the picture signal inputted, to the coding unit,
wherein in the coding step, an inputted picture signal is quantized using the quantization width.

* * * * *

UNITED STATES PATENT AND TRADEMARK OFFICE
CERTIFICATE OF CORRECTION

PATENT NO. : 7,151,856 B2  Page 1 of 1
APPLICATION NO. : 10/420806
DATED : December 19, 2006
INVENTOR(S) : Kyoko Uchibayashi et al.

It is certified that error appears in the above-identified patent and that said Letters Patent is hereby corrected as shown below:

<u>Column 27</u>
Line 35, "which are is already" should read --which are already--.

Signed and Sealed this

Tenth Day of April, 2007

JON W. DUDAS
*Director of the United States Patent and Trademark Office*